Feb. 20, 1973    R. C. GILBERG ET AL    3,717,750
INPUT CONTROL LOGIC FOR A CODE READING SYSTEM
Filed Dec. 7, 1971    16 Sheets-Sheet 1
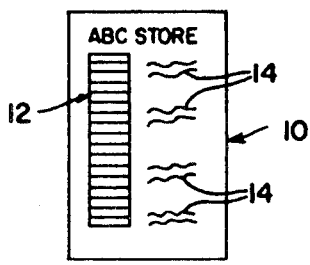
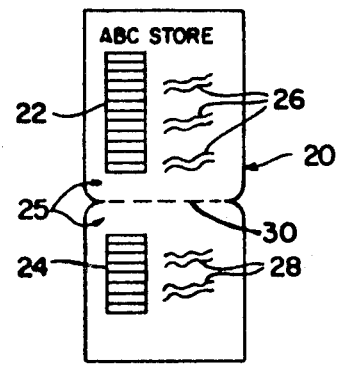
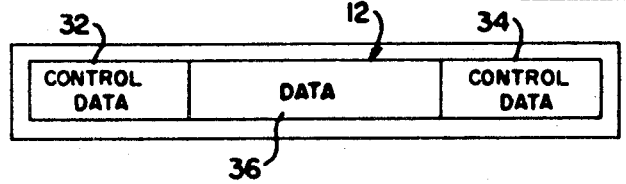
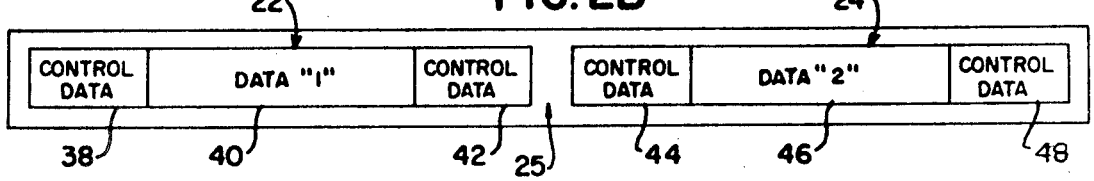
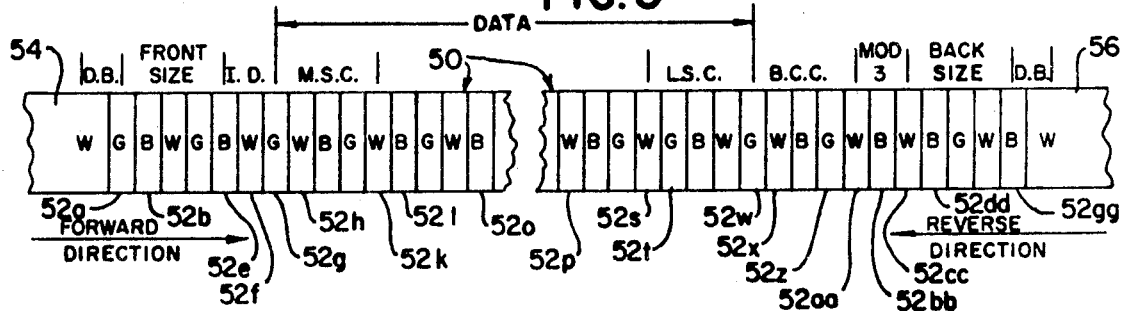
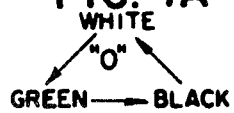

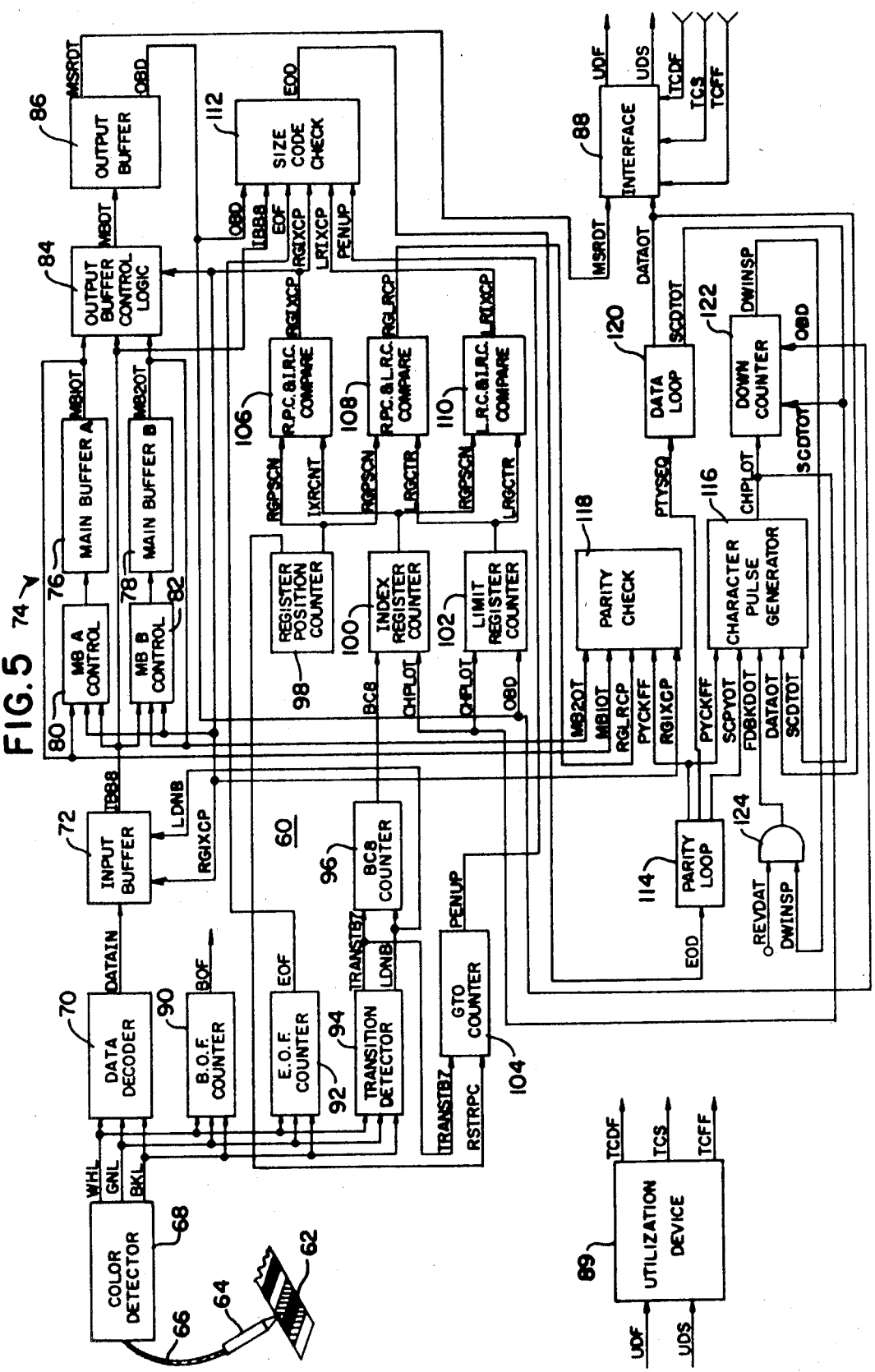

Feb. 20, 1973  R. C. GILBERG ET AL  3,717,750
INPUT CONTROL LOGIC FOR A CODE READING SYSTEM
Filed Dec. 7, 1971  16 Sheets-Sheet 3
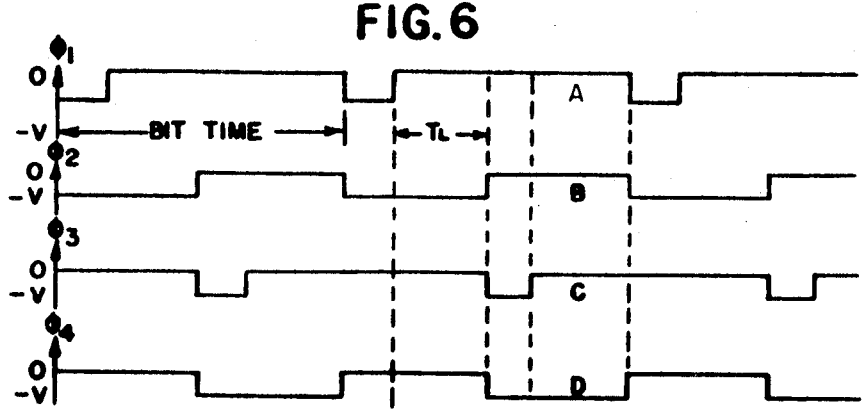
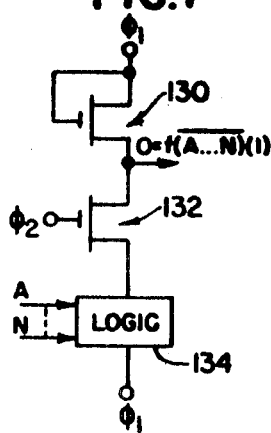
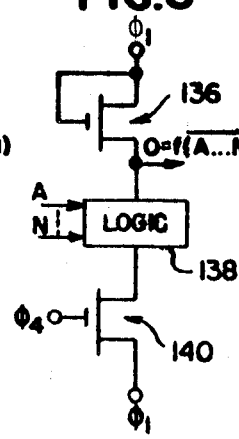
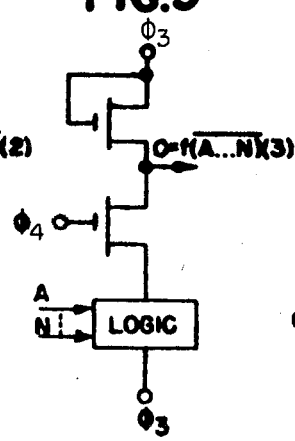
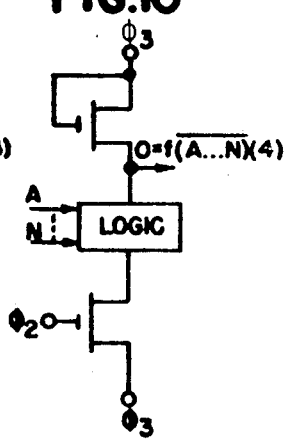
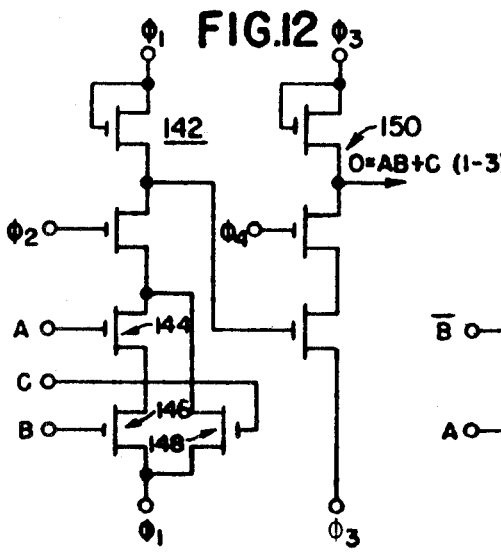
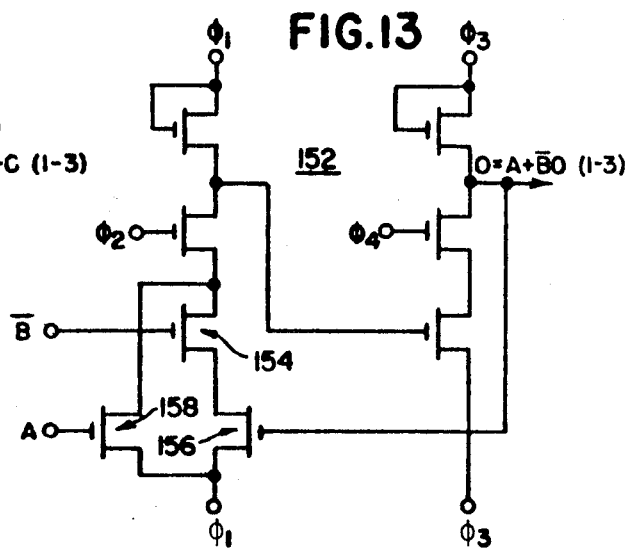
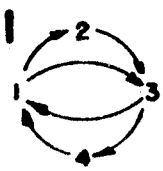

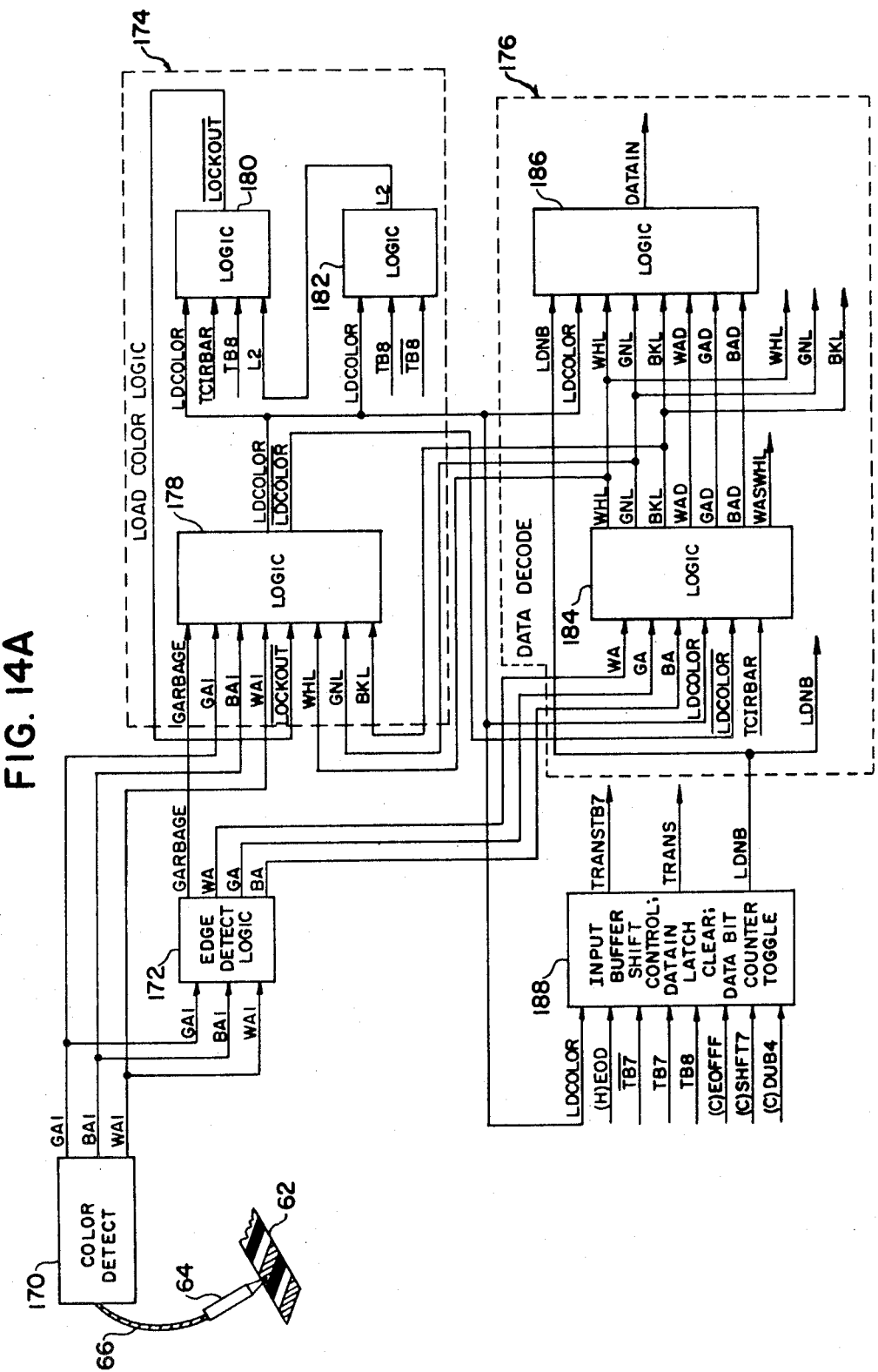

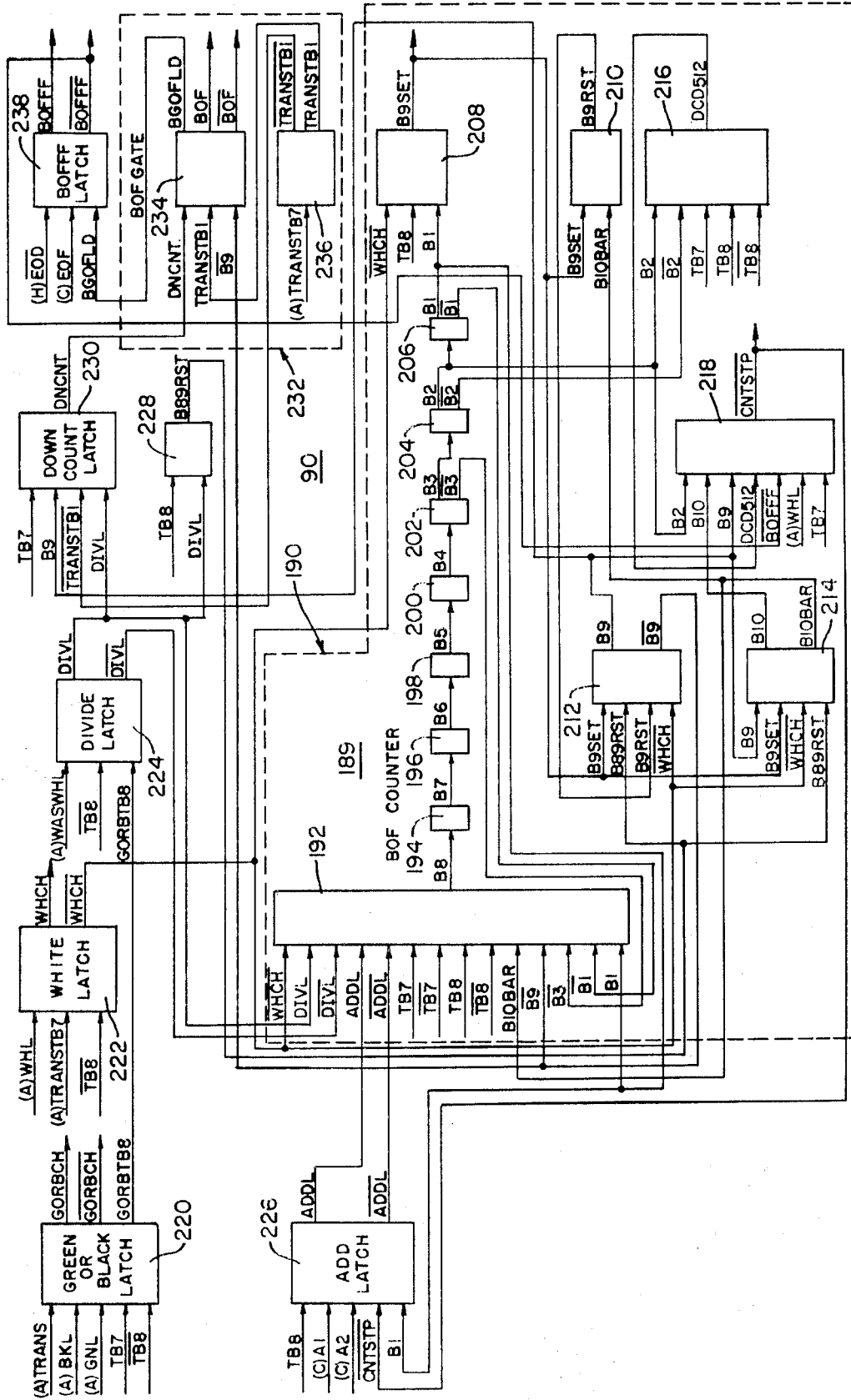

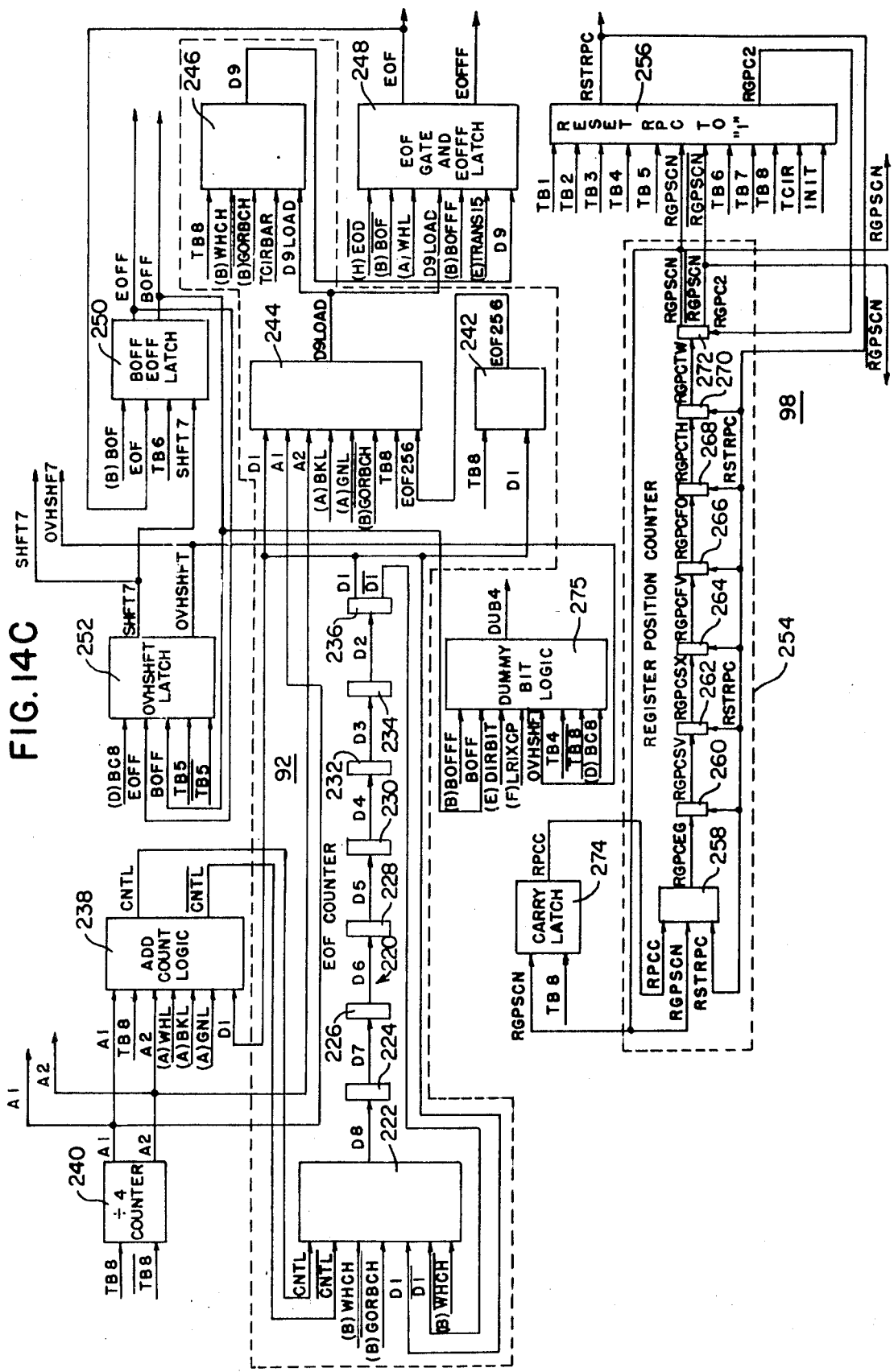

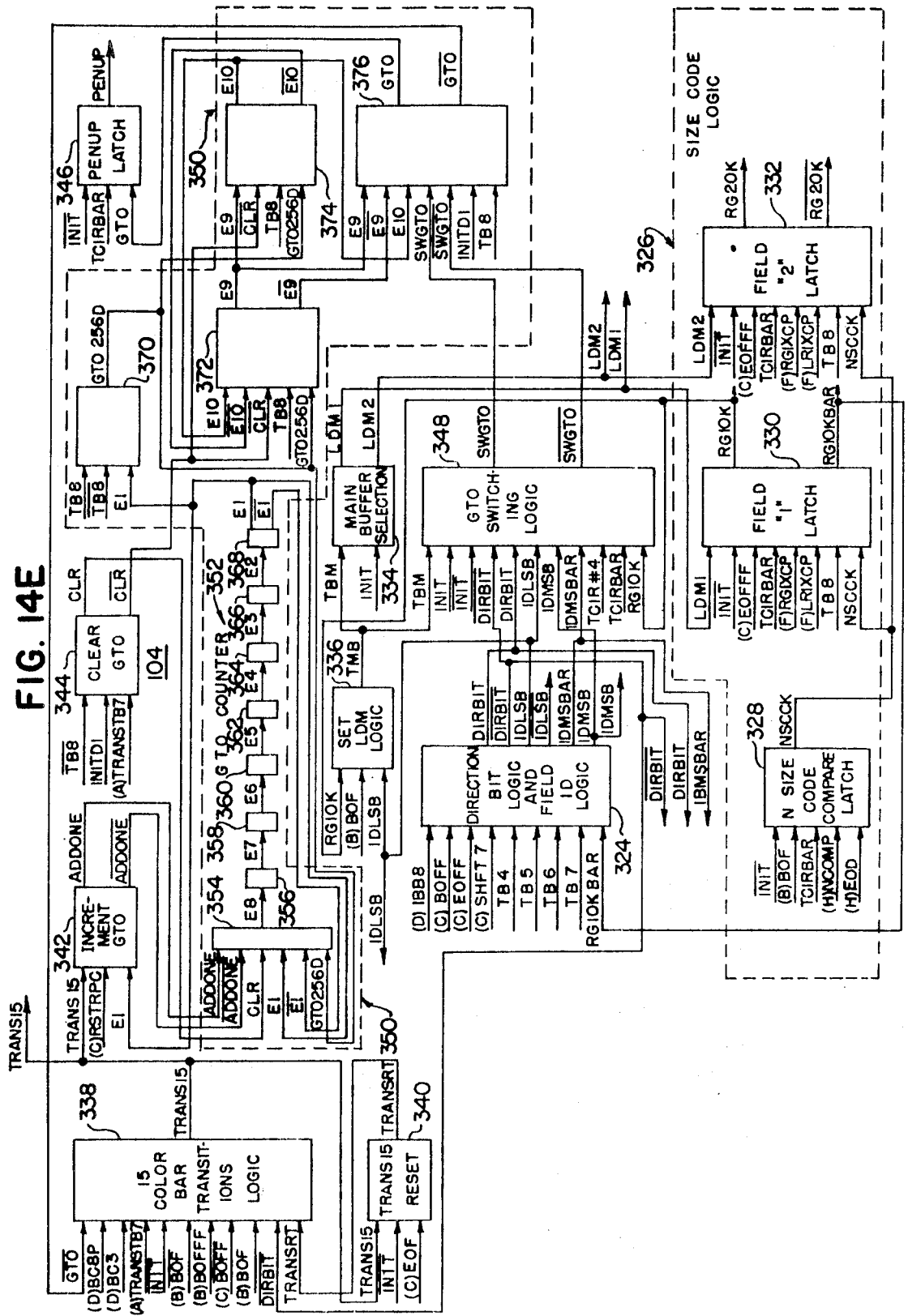

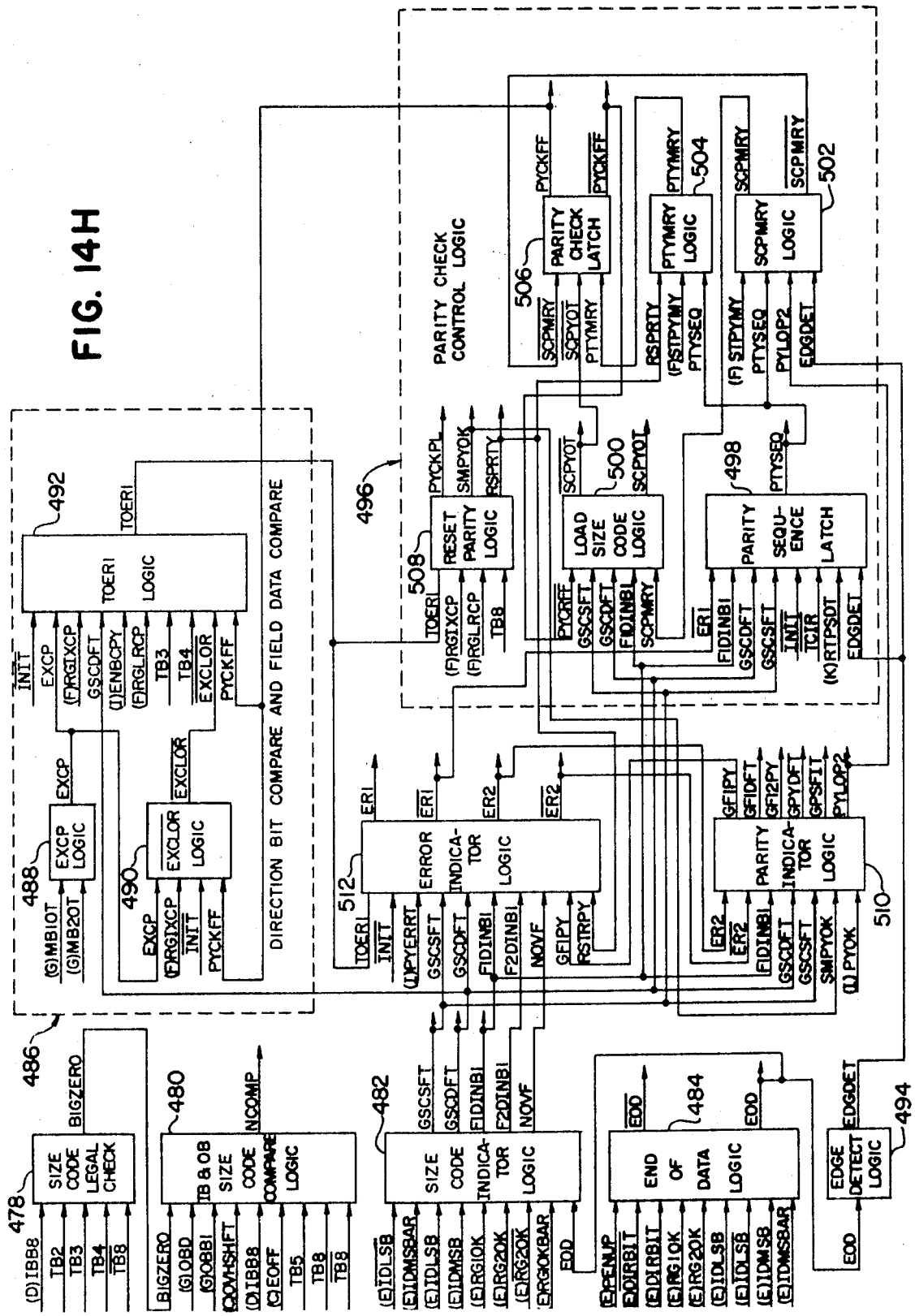

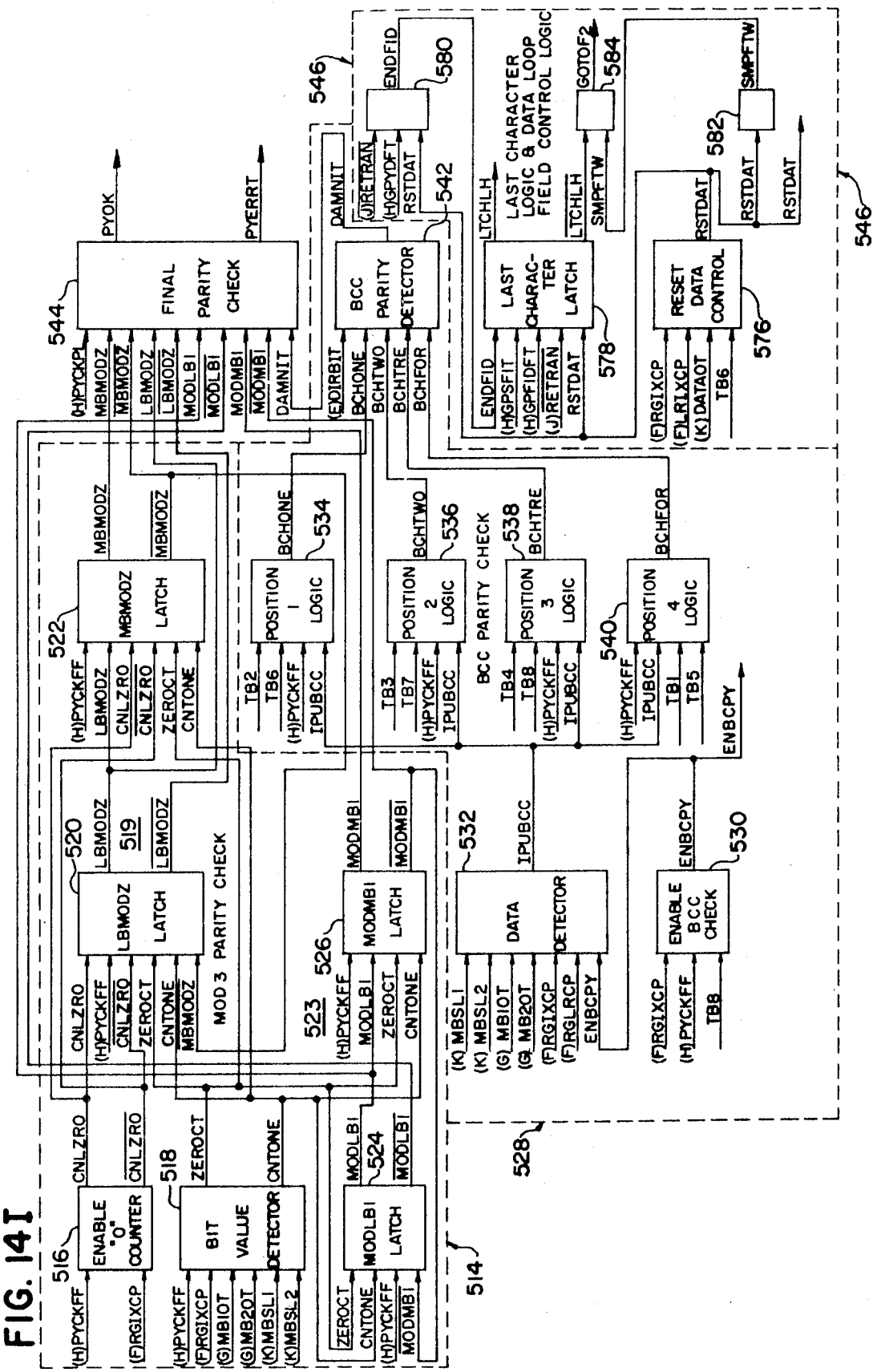

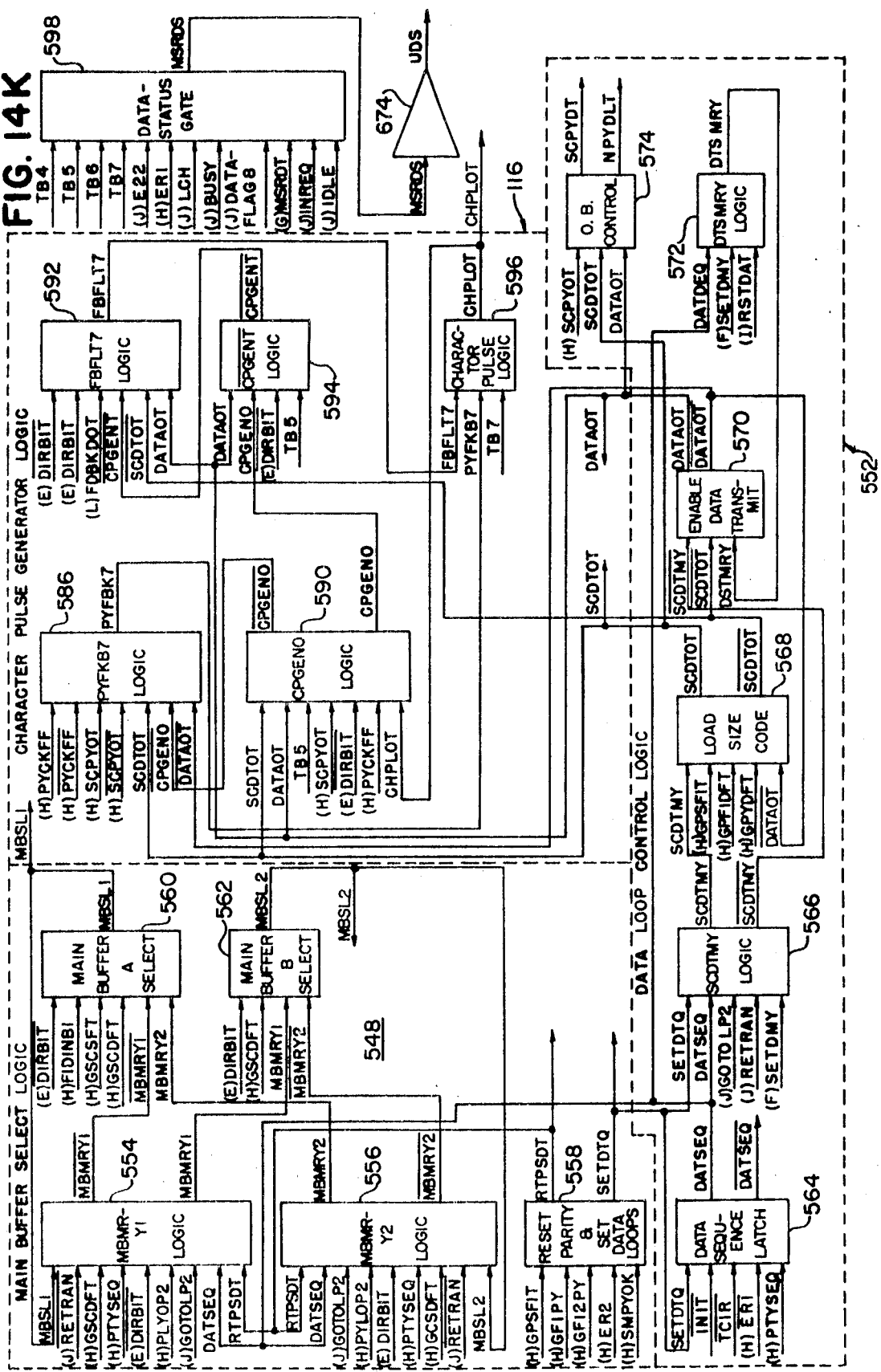

United States Patent Office

3,717,750
Patented Feb. 20, 1973

3,717,750
INPUT CONTROL LOGIC FOR A CODE READING SYSTEM
Robert C. Gilberg, Dayton, James P. Donohue, Fairborn, and Ramesh S. Patel, Kettering, Ohio, assignors to The National Cash Register Company, Dayton, Ohio
Filed Dec. 7, 1971, Ser. No. 205,543
Int. Cl. G06k 7/12
U.S. Cl. 235—61.11 E     10 Claims

ABSTRACT OF THE DISCLOSURE

A system for processing a color bar code read optically from a coded medium is disclosed. The system includes logic for determining the binary code from color signals and storage means for temporarily storing the binary code. Logic is also provided which allows the reading of a double field tag and which checks the parity and the size of the captured message. Further, logic is provided for transmitting the captured message to a utilization device.

Figure 14D:
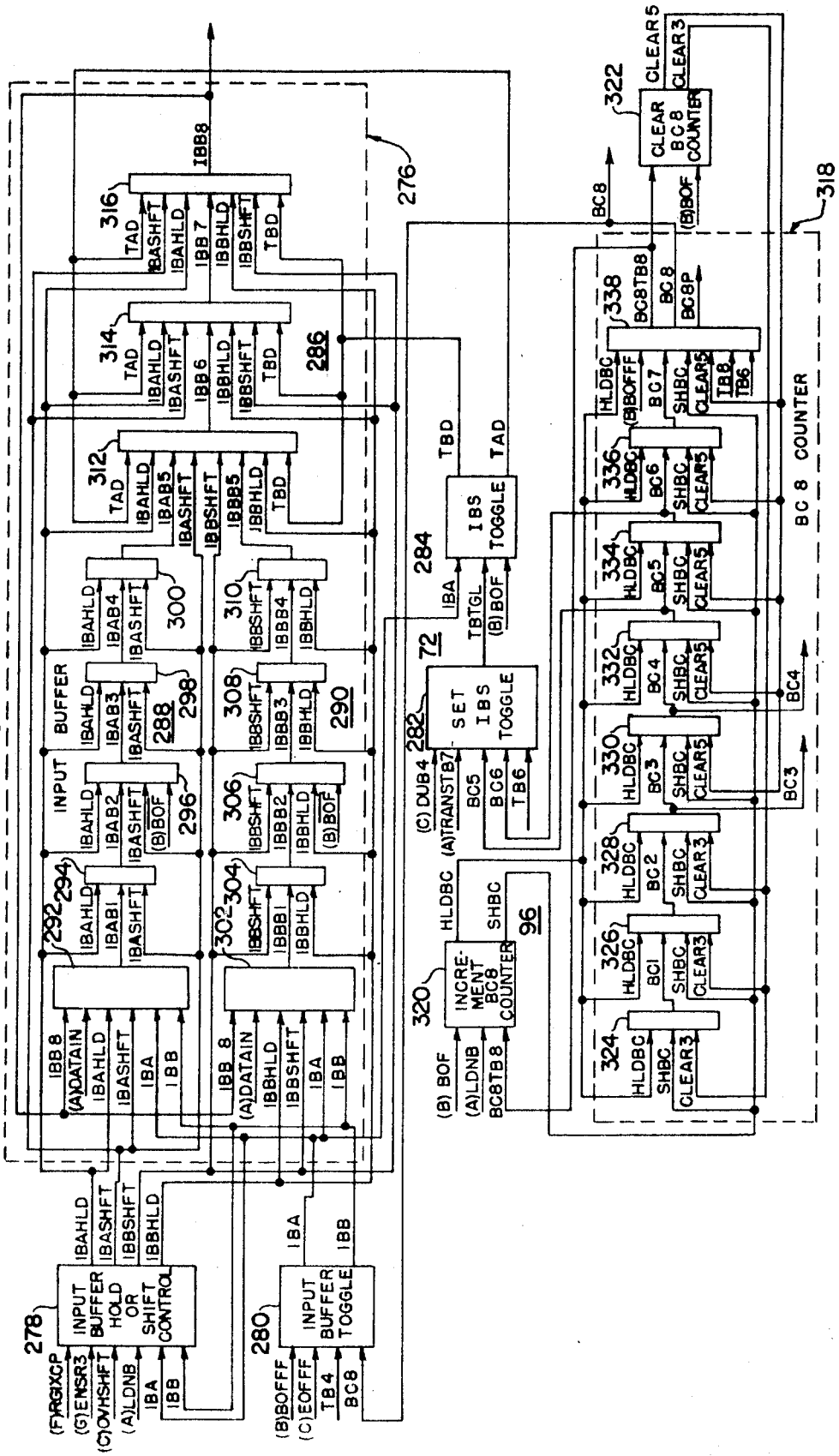

This invention relates to code detecting apparatus and more particularly to apparatus for detecting the code manifested by a series of three or more colored bars placed contiguously along a given path.

In today's world of business, it has become necessary to automatically input information into a desired business machine. To effect this desire, a compact code is attached to a medium and scanned by appropriate reading apparatus. The medium may, for instance, be a retail price tag, a credit card, a bank ledger card, or any other desired item useful for containing information. The coded information may include the price and the article inventory number in case of a retail price tag, or an account number in the case of a credit card or bank ledger card.

One type of code utilizes a series of contiguous colored bars of three or more different colors where each bar has a bar of a different color on each side thereof. The transition from one color to another color in this code represents a binary bit, and the binary bits of all transitions represent the desired information. The binary bits may be grouped by fours so that each group represents one decimal number. A more complete description of this code is given in United States patent application Ser. No. 837,850, now Pat. No. 3,671,722 filed June 30, 1969, by John B. Christie, and a reader for this code is described in United States patent application Ser. No. 837,514, now Pat. No. 3,637,993 filed June 30, 1969, by John B. Christie, Dzintars Abuls, and Wilfridus G. van Breukelen, both of which applications are assigned to the present assignee.

When a coded tag is being used, it is essential that the encoded information be accurately read. In this regard, the tag includes control information such as a size code and parity information which is read by reading apparatus. Thereafter, logic in the reading apparatus checks the data against the size code and parity information to insure that the data is accurate.

When reading the above code it is desirable to store it in groups of two four bit characters. However the number of desirable control information bits may not fit into the two four bit character scheme. Thus, it is necessary to provide the necessary input control logic to compensate for this.

In accordance with one preferred embodiment of this invention, there is provided in a code reading system for reading a coded medium detecting means for providing a series of bits, one at a time, in response to the code, each successive M bits provided constituting a character of bits, bit counting means responsive the the occurrence of each bit of the series for providing a first signal after each character of bits occurs, and input buffer means responsive to the application thereto of the series of bits for storing the bits applied thereto until a character of bits is stored thereby. There is further provided position counting means for continually counting from one to L, index counting means responsive to said first signal for being incremented each time the first signal occurs, and comparing means for providing a second signal whenever the counts of the position counting means and the index counting means are equal. Finally, there is provided main storage means for storing a character of bits applied thereto in a position thereof defined by the count existing in the index counting means, at the time the character of bits is applied thereto, the character of bits applied to the main storage means being applied from the input buffer means upon command of the second signal.

A detailed description of one preferred embodiment of this invention is hereinafter given with reference being made to the following figures, in which:

FIG. 1A shows a single field color bar tag;
FIG. 1B shows a double field color bar tag;
FIG. 2A shows the general layout of a single field tag;
FIG. 2B shows the general layout of a double field tag;
FIG. 3 shows a specific layout of the color bars in a field of a color bar tag;
FIG. 4A and 4B show code detecting charts;
FIG. 5 shows a general block diagram of the reading apparatus for reading the color bar tags shown in FIGS. 1A and 1B;
FIG. 6 shows the four phase clock signals used in operating the logic circuits of the present invention;
FIGS. 7 through 10 show, respectively, a "1," "2," "3," and "4" gate used as the building block logic elements of the present invention;
FIG. 11 is a chart showing which gate of FIGS. 7 through 10 ian drive which other gate;
FIGS. 12 and 13 are examples of how logic circuits can be built for given logic equations;
FIGS. 14A through 14L show a detailed block diagram of the reading apparatus of FIG. 5; and
FIGS. 15A and 15B show the position of dummy bits placed in the memory during the reading of the color bar tag.

Referring now to FIG. 1A, there is shown a typical single field tag 10 which can be used in a retail store. Tag 10 includes data field 12 consisting of a plurality of colored bars placed contiguous to one another. The bars may be of three different colors, such as green, black, and white, and the background color of tag 10 may be white. In practice, the data field is printed by printing the green and black bars and leaving a space for the white bars. A printer for printing the tag 10 is described in United States patent application Ser. No. 51,073, filed June 30, 1970, by Donald E. Landis and entitled "Color Bar Printer." Tag 10 also includes several series of human readable printing 14, which manifests the essential information contained in the data field 12. This is provided so that the customer knows the price and also so that the information can be entered manually in the event of an equipment breakdown.

FIG. 1B shows a typical double field tag 20, which includes two color bar coded data fields 22 and 24 separated by an area 25. Data field 22 may include inventory control information such as department number, class number, stock keeping unit (s.k.u.) number, size, color, and so forth. This information is printed as human readable printing 26 to the side of data field 22. Data field 24 may include the price information, which is manifested by human readable printing 28. Data field 24 and printing 28 can be detached from tag 20 along perforations 30 in the event of a price change, and a new data field and associated printing manifesting the new price can be affixed to complete tag 20 with the proper price information, or the price may be inserted manually, if desired.

Data fields 12, 22, and 24 may be scanned with a pen-like device which is described in detail in the above-noted Christie et al. United States patent application and which provides a signal indicative of the color of the bar then being scanned. These color signals are processed by logic circuitry to obtain the desired information, which is then transmitted to a utilization device, such as the retail sales terminal described in United States patent application Ser. No. 71,971, now Pat. No. 3,686,367, filed Sept. 14, 1970, by James E. Zachar and Walter E. Srode, Jr., and entitled "Retail Terminal," which is assigned to the present assignee.

Referring now to FIG. 2A, there is shown the general coded layout of data field 12 of single field tag 10. Data field 12 includes front and back control data portions 32 and 34 and data portion 36. Front control data portion 32 includes a single direction bit, a four bit size code, and a two bit tag identification code. Back control data portion 34 includes a single direction bit, a four bit size code, a two bit MOD3 parity code, and a four bit block check code (B.C.C.) parity code. Data portion 36 may contain from 2 through 28 even numbers only (four bit binary coded decimal B.C.D.) characters.

FIG. 2B shows the general coded layout of the data fields 22 and 24 of double field tag 20. Data field 22 contains front control data portion 38, data "1" portion 40, and back control data portion 42, and data field 24 contains front control data portion 44, data "2" portion 46, and back control data portion 48. Area 25 is between back control data portion 42 and front control data portion 44. Front control data portions 38 and 44 contain a single direction bit, a four-bit size code, and a two-bit identification code. Back control data portions 42 and 48 contain a single direction bit, a four-bit size code, a two-bit MOD3 parity code, and a four-bit B.C.C. parity code. Data "1" portion 42 and data "2" portion 46 contain from 2 to 28 even numbers only) four-bit B.C.D. characters.

FIG. 3 shows an example of a data field 50, which includes a plurality of individual color bars 52a–52gg each contiguous with one another. Field 50 may be either field 12 or one of fields 22 or 24. Each of the bars 52 is labeled either "W," "G," or "B" to indicate whether they are a respective white, green, or black bar. On the left and right of data field 50 are larger white areas 54 and 56, which are part of the background of the tag. If field 50 is one of the fields of a double field tag, one of the areas 54 or 56 will be area 25 shown in FIGS. 1B or 2B. The colors of the bars 52a–52gg are so arranged that no bars of the same color are adjacent to each other.

In coded tags, such as those shown in FIG. 1 through 3, it is desirable that the coding be capable of being scanned in either direction; that is, from top to bottom, or from bottom to top, in the case of FIG. 1, and from right to left or from left to right in the case of FIGS. 2 and 3. To accomplish this in the code of FIG. 3, the leftmost bar 52a is green, and the rightmost bar 52gg is black. A forward direction scan is defined when data field 50 is scanned from green bar 52a to black bar 52gg (left to right in FIG. 3), and a reverse direction scan is defined when data field 50 is scanned from black bar 52gg to green bar 52a (right to left in FIG. 3). Logic within the reader (to be hereinafter explained in detail) will look at the first binary bit detected and provide a signal indicative of the direction scanned.

Before a discussion of the coding layout of FIG. 3 in detail, it is necessary to understand the code itself. For this, reference is made to FIGS. 4A and 4B, where two code decipher charts are shown. The color bar code is a transition code; that is, the transition from one color to another color represents a binary digit (bit) of either "1" or "0." Specifically, as shown by FIG. 4A, transitions from white to green, green to black, and black to white represent "0" bits, and, as shown by FIG. 4B, transitions from white to black, black to green, and green to white represent "1" bits.

Referring again to FIG. 3, it is seen that the first transition in a forward direction scan is from white background area 54 to green bar 52a, and this represents a "0" bit. On the other hand, the first transition in a reverse direction scan is from white background area 56 to black bar 52gg, and this represents a "1" bit. Since the first bar 52a will always be green and the last bar 52gg will always be black, the first bit detected represents the direction of the scan. It should be noted that the bit values determined in a reverse scan will be in opposite order and the complement of the bit values obtained while scanning in the forward direction. For instance, the last bit detected in a forward direction scan will be a "0" bit due to the black bar 52gg to white background area 56 transition, whereas this transition occurs first and represents a "1" bit for a reverse direction scan.

For brevity hereinafter with respect to FIG. 3, the coding format of data field 50 will be described as being scanned in the forward direction, it being understood that for a reverse direction scan oppositely ordered complementary bits are provided. Bars 52b–52e form the front size code and are selected so that the transitions to those bars will give the complement of one more than the number of eight-bit characters in the data portion, with the most significant bit of the front size code being scanned first. It should be noted that each eight-bit character includes two four-bit B.C.D. digits. Thus, the number of four-bit B.C.D. characters will be (2N−2), where N is the size code number which is defined by the complement of the front size code.

The bars 52f and 52g form an identification code (I.D.) to indicate whether a single field tag, such as the tag 10, or a double field tag, such as the tag 20, is being scanned. If the transitions to these bars produce the binary code "0–0," a single field tag is being scanned; if the transitions to these bars produce the binary code "0–1" (most significant digit first), the first data field of a double field tag is being scanned; and if the transitions to these bars produce the binary code "1–1," the second data field of a double field tag is being scanned. For a reverse direction scan, these binary codes will be reversed and complemented.

Next, the data contained in the data field is scanned by determining the transitions to bars 52h through 52w. As previously mentioned, each four successive bars constitute a B.C.D. character, and there are (2N−2) B.C.D. characters of data, where N is the number in the size code, arranged most significant character first, with each B.C.D. character being arranged least significant bit first.

After the data of the data field 50 is detected, bars 52x–52aa are scanned, and the transitions to these bars provide the four-bit B.C.C. parity code. The B.C.C. parity code is determined by adding the "1" bits in each significant position of each B.C.D. character, and dividing this sum by two, the remainder being the B.C.C. code. For example, for the four B.C.D. characters "0–1–0–0,"

"0-0-1-1," "1-0-0-1," and "0-1-1-0" (least significant digit first), the B.C.C. code is calculated as follows:

$$
\begin{array}{r}
0\text{--}1\text{--}0\text{--}0 \\
0\text{--}0\text{--}1\text{--}1 \\
1\text{--}0\text{--}0\text{--}1 \\
0\text{--}1\text{--}1\text{--}0 \\
\hline
\end{array}
$$

adding the "1" bits: 1 2 2 2
dividing each sum by 2:   ÷2
quotient: 0-1-1-1
remainder (B.C.C.): 1-0-0-0

Thus, the B.C.C. Parity code is "1-0-0-0."

After the B.C.C. parity code has been detected, a two-bit MOD3 parity code is detected by finding the transition to bars 52*bb* and 52*cc*. These two bits will insure that the last bar 52*gg* will be black in addition to affording a second parity check. The MOD3 parity code is determined by counting the total number of "1" bits and "0" bits in the entire data field, excluding the MOD3 parity code, dividing each of these sums by 3, and adding a sufficient number of "1" bits as the MOD3 parity code to make the remainders equal. For example, if in a data field there are twenty "1" bits and twelve "0" bits, the MOD3 code is calculated as follows:

divide "0" total by 3: 20/3=6, remainder 2
divide "1" total by 3: 12/3=4, remainder 0
remainder difference: 2

Thus, two "1" bits are needed to make the remainders equal, so the MOD3 parity code will be "1-1."

Following the MOD3 parity code is the back size code, which is determined by the transition to bars 52*dd* through 52*gg*. In the case of the back size code, the true values of the bits are scanned, least significant bit first. Thus, the back size code is in opposite order and complementary to the front size code. This results in the second through fifth bits of the code being the same regardless of whether the data field is scanned in a forward or a reverse direction. The final bit in the data field 50 will be the direction bit defined by the transition from bar 52*gg* to background area 56, and this will be the same as the original direction bit defined by the transition from background area 54 to bar 52*a*.

Referring now to FIG. 5, a generalized block diagram of the Color Bar Reader 60 is shown. A color bar field 62 is scanned by an optical pen-shaped probe 64. Light rays indicative of the color then being scanned are transmitted through a fiber optic bundle 66 to Color Detector Circuit 68. Color Detector Circuit 68 provides three pulse shaped signals which indicate the color then being scanned. If a white color bar is scanned, the WHL signal is a logic "0" signal, and the GNL and BKL signals are logic "1" signals. Similarly, if a respective green or black color bar is being scanned, the respective GNL or BKL signals are logic "0," and the other two signals are logic "1" signals. A detailed description of the probe 64, the fiber optic bundle 66, and the Color Detector Circuit 68 is given in the above-mentioned Christie et al. United States patent application.

The three color signals WHL, GNL, and BKL are applied to Data Decoder Means 70, which provides a DATAIN signal, which is the binary coded signal of the code in data field 62. The DATAIN signal is applied to Input Buffer Means 72, and, after eight bits have been applied thereto, the RGIXCP signal becomes logic "1" and causes the eight bits in Input Buffer Means 72 to be transferred as the IBB8 signal to character position one of the Main Buffer Means 74.

Main Buffer Means 74 includes a 136-bit Main Buffer A76 and a second 136-bit Main Buffer B78, each of which has respective control circuits MBA Control Means 80 and MBB Control Means 82 associated therewith. For a single field tag, or the first scanned field of a double field tag, the information detected is stored in Main Buffer A76, and, for the second scanned field of a double field tag, the information detected is stored in Main Buffer B78. The term first scanned field is defined to be data field 22 in FIG. 2B for a forward direction scan and data field 24 for a reverse direction scan. The term "second scanned field" is defined to mean field 24 for a forward direction scan and field 22 for a reverse direction scan.

Upon command of the RGIXGP signal, an eight-bit character is shifted from Main Buffer Means 74 through Output Buffer Control Logic 84 and Output Buffer Means 86 to Interface Means 88. Interface Means 88 Interfaces the Reader 60 with an appropriate Utilization Device 89, such as the Terminal Control Unit shown in the above-cited Zachar et al. United States patent application and further described in United States patent application Ser. No. 72,084, filed Sept. 14, 1970, by Ralph D. Haney et al. and entitled "Digital Processor," which is assigned to the present assignee. Before Interface Means 88 transmits any data to Utilization Device 89, the data must be checked to insure its accuracy. For this, the remainder of Reader 60 is provided.

The WHL, GNL, and BKL signals from Color Detector Circuit 68 are also applied to a Beginning Of Field (BOF) Counter Means 90, and End Of Field (EOF) Counter Means 92 and Transition Detector Means 94. BOF Counter Means 90 counts the time the WHL signal is logic "0" and compares this time to the time the next GNL or BKL signal is logic "0." If it turns out that the GNL or BKL signal time is less than one fourth the WHL signal time, the BOF signal becomes a logic "1." This indicates that a transition from the white background color to the first bar has occurred. Similarly, EOF Counter Means 92 counts the time a BKL or a GNL signal is logic "0" and compares this time to the time the immediately subsequent WHL signal (if any) is logic "0." If the WHL signal is logic "0" four times as long as the previous GNL or BKL signal, the EOF signal becomes logic "1." This indicates that the last transition of the data field has occurred.

Every time a color transition occurs and a DATAIN bit is provided, Transition Detector Means 94 provides an LDNB signal and a TRANSTB7 signal, and these signals are applied to BC8 Counter Means 96. The LDNB signal is also applied to Input Buffer Means 72 to enable the DATAIN bit to be applied thereto. BC8 Counter Means 96 increments its count from one to eight each time the LDNB signal occurs and the count therein at any time equals the number of bits stored in Input Buffer Means 72.

In addition to BC8 Counter Means 96, four other counters are included in Reader 60. These are Register Position Counter Means 98, Index Register Counter Means 100, Limit Register Counter Means 102, and Gross Time Out (GTO) Counter Means 104. Register Position Counter Means 98 is a free-running counter which continually counts from one to seventeen. It is used to keep track of the information in Main Buffer Means 74. Index Register Counter Means 100 works in conjunction with Register Position Counter Means 98 to load and unload data into and out of Main Buffer Means 74. It is incremented by each BC8 pulse provided from BC8 Counter Means 96. Limit Register Counter Means 102 is used in conjunction with Index Register Counter Means 100 to compare the length of the data, to add four dummy bits into Input Buffer Means 72, and to detect the end of data. It is used in conjunction with Register Position Counter Means 98 to detect the end of message and initiate the parity check. The size code from Output Buffer Means 86 is applied to Limit Register Counter Means 102 and stored therein for future reference. GTO Counter Means 104 is a switchable counter which provides a PENUP signal either if probe 62 scans the same color for either one fourth of a second or one second, depending upon whether a color bar, or area 25, shown in FIGS. 1B and 2B, is being scanned. It is incremented by the RSTRPC signal provided from Register Position Counter Means 98 and reset by each TRANSTB7 pulse from Transition Detector Means 94, The PENUP signal is provided one fourth of a second after the last transition in case a bar is being scanned and after one second in case area 25 of a double field tag is being scanned. The switchability of GTO Counter Means 104 is controlled by the size code and the ID code in the first scanned data field.

Register Position Counter and Index Register Counter (R.P.C. and I.R.C.) Compare Means 106 provides an eight-bit-long RGIXCP signal every time the count in Register Position Counter Means 98 equals the count in Index Register Counter Means 100. This signal allows the data transfer between Input Buffer Means 72 and Main Buffer Means 74 and between Main Buffer Means 74 and Output Buffer Means 86. Register Position Counter and Limit Register Counter (RPC & LRC) Compare Means 108 provides an RGLRCP pulse signal whenever the count in Register Position Counter Means 98 equals the count in Limit Register Counter Means 102. Limit Register Counter and Index Register Counter (LRC & IRC) Compare Means 110 provides an LRIXCP signal whenever the count in Limit Register Counter Means 102 equals the count in Index Register Position Counter Means 98.

After the entire data field has been scanned, it is necessary to provide an End of Data (EOD) signal. This signal is provided after two size code checks have been performed by Size Code Check Means 112. The first size code check is comparing the first size code detected with the second size code detected and is accomplished as follows. After the first eight bits are detected and stored in Input Buffer Means 72, they are transferred to both Main Buffer Means 74 and Output Buffer Means 86, causing the first detected size code to be stored in Output Buffer Means 86. After the last data bit is detected from the tag and the EOF signal becomes logic "1," the second detected size code is in Input Buffer Means 72. At this time, the size codes in both Input Buffer Means 72 and Output Buffer Means 86 are applied to Size Code Check Means 112 as the OBD and IBB8 signals and compared with one another. The second size code check is performed by also applying the OBD signal to Limit Register Counter Means 102, so that the size code is also stored therein. It should be noted that at this time (after the EOF) signal) the count in Index Register Counter Means 100 will be one less than the total number of eight)bit characters detected, since the last detected character is still in Input Buffer Means 72 and the count in Limit Register Counter 102 reflects the size code number, which is two less than the total number of eight-bit characters scanned. If the front and back size codes properly compare in Size Code Check Means 112, the count in Limit Register Counter Means 102 is increased by two, and the count in Index Register Counter Means 100 is increased by one. If all bits of the code have been detected, this should make the count in Index Register Counter Means 100 equal the count in Limit Register Counter Means 102, thereby causing the LRIXCP signal to become a logic "1." When the RGIXCP signal becomes logic "1," the EOD signal will become logic "1," indicating that the two size code checks have been successfully completed.

If one or both of the two size code checks are unsuccessful, it is still desirable for the EOD signal to become logic "1." This will occur after the GTO counter 104 provides the logic "1" PENUP signal, due to probe 64 remaining on white background area 56 in FIG. 3.

After the size code has been checked, the B.C.C. and MOD3 parity of the captured data is checked. The EOD signal is applied to Parity Loop Control Logic 114 and causes the SCPYOT signal and the PTYSEQ signal to be set to logic "1." The SCPYOT signal is applied to Character Pulse Generator Means 116 and set the CHPLOT signal for one character time (eight bit times). This causes Index Register Counter Means 100 to be set to a count of one, and, when Register Position Counter Means 98 has a count of one, the RGIXCP signal becomes logic "1" for one charatcer time. This clears Index Register Counter Means 100 and causes the first eight control bits stored in the first position of Main Buffer Means 74 to be shifted into Output Buffer Means 86. The size code in these eight bits is then shifted to Limit Register Counter Means 102, and two is added to the count in Limit Register Counter Means 100, so that the count therein corresponds to the number of characters in Main Buffer Means 74.

At this time, the PYCKFF signal is set to logic "1," and it resets the SCPYOT signal and causes the CHPLOT signal from Character Pulse Generator Means 116 to be set for one character time. This, in turn, causes a count of one to be placed in Index Register Counter Means 100, and the RGIXCP signal becomes logic "1" when the count in Register Position Counter Means 98 becomes one. Now the RGIXCP signal is held at logic "1" until the count in Register Position Counter Means 98 matches the count in Limit Register Counter Means 108; that is, until the RGLRCP signal becomes logic "1." During this time, all of the bits in Main Buffer Means 74 are shifted through Parity Check Logic Means 118, and the B.C.C. and MOD3 parity of the data stored in Main Buffer Means 74 is checked. If the parity check is successful, then the PYCKFF and PTYSEQ signals are reset to logic "0."

At this time, the data has been completely checked and is ready to be transmitted to Utilization Device 89. After the PTYSEQ signal is reset, the SCDTOT signal from Data Loop Logic Means 120 is set. This signal sets the CHPLOT signal to logic "1" for one character time and causes a count of one to be placed in Index Register Counter Means 100. When the next RGIXCP signal occurs, the first character in Main Buffer Means 74 is shifted into Output Buffer Means 86, and the size code portion thereof is placed in Limit Register Counter Means 102. Then the DATAOT signal becomes logic "1," and the data transfer commences.

If the tag had been scanned in the forward direction, the CHPLOT signal is set for two character times, causing a count of two to be placed in Index Register Counter Means 100. When the RGIXCP signal becomes logic "1," the first eight-bit character of true data is shifted from position two in Main Buffer Means 74 to Output Buffer Means 86. Upon command of Utilization Device 89, the data in Output Buffer Means 86 is then right shifted and transmitted through Interface Means 88 to Utilization Device 89. During this time, Index Register Counter Means 100 is incremented by one, and, upon the next logic "1" RGIXCP signal, the next eight bits of data are transferred to Output Buffer Means 86. This sequence continues until the count in Index Register Counter Means 100 equals the count in Limit Register Counter Means 102. Then, when the last data character is sent to Output Buffer Means 86, the LRIXCP signal becomes logic "1" and indicates that no more data is to be sent.

If the tag had been scanned in the reverse direction, the data stored in Main Buffer Means 74 would have been stored in opposite order and complementary to the data which is to be sent to Utilization Device 89. In this case, the SCDTOT signal causes the size code to additionally be loaded into Down Counter 122. Whenever the count in Down Counter 122 is fifteen or less, a one-character-long DWINSP signal is produced, and this signal is applied through CHPLOT control gate 124 to provide a logic "1" FDBKDOT signal, since the REVDAT signal is true for a reverse scan. The FDBKDOT logic "1" signal sets the CHPLOT signal, which remains logic "1" for $N+1$ character times, where N is the size code. For each character time the CHPLOT signal is logic "1," a count of one is subtracted from the count in Down Counter 122, and a count of one is added to the count in Index Register Counter Means 100. Further, for every character time after four that the CHPLOT signal is logic "1," a count of one is subtracted from the count in Limit Register Counter Means 102. Thus, when the CHPLOT signal returns to logic "0" after $N+1$ character times, Limit Register Counter Means 102 has a count of three, Index Register Counter Means 100 has a count of $N+1$, and Down Counter 122 has a count of zero. The count of three in Limit Register Counter Means 102 is the position in Main Buffer Means 74 of the least significant character of data, and the $N+1$ count in Index Register Counter Means 100 is the position in Main Buffer Means 74 of the most significant character of data. Special logic is also provided for situations when the size code is three or two, and this is described in detail hereinafter. When the RGIXCP signal becomes logic "1," the most significant character of data is transferred from Main Buffer Means 74 to Output Buffer Means 86. This is the same data that would be first transferred if a forward scan occurred, except that it is in opposite order and complementary thereto. This data is complemented and left shifted out of Output Buffer Means 86 and transmitted through Interface Means 88 to Utilization Device 89, and a count of One is subtracted from the count in Index Register Counter Means 100.

The above procedure repeats itself until the count in Index Register Counter means 100 matches the count in Limit Register Counter Means 102, at which time the LRIYCP signal becomes logic "1," indicating that the last character is being transferred from Main Buffer Means 74 to Output Buffer Means 86 and the entire message has been read from Main Buffer Means 74.

Before being able to fully understand the detailed block diagram of Reader 60 shown in FIGS. 14A through 14L, a general understanding of four-phase metal-oxide semiconductor (MOS) logic circuitry is necessary, since the detailed illustration in FIGS. 14A through 14L consists of labeled blocks of logic for which equations and operation, but not detailed circuitry, are given. The following description concerning FIGS. 6 through 13 will explain clocking and the circuits which may be constructed in response to the logical equations which will be given.

Reader 60 operates on an eight-bit periodic cycle, and eight separate and repetitive timing signals TB1 through TB8 are produced. Each of the timing signals is cyclically logic "1" for a one-bit time duration and logic "0" otherwise. These bit times are respectively designated as times TB1 through TB8. In addition, there are eight timing signals $\overline{TB1}$ through $\overline{TB8}$, which are the respective complements of the TB1 through TB8 signals and hence are logic "0" during respective times TB1 through TB8 and logic "1" otherwise. In addition to the sixteen timing signals TB1 through TB8 and $\overline{TB1}$ through $\overline{TB8}$, four phase control signals $\phi_1$, $\phi_2$, $\phi_3$, and $\phi_4$ are provided, and each of these signals is respectively shown in FIGS. 6A through 6D. Each of the four $\phi_1$, $\phi_2$, $\phi_3$, and $\phi_4$ signals is a series of periodic pulses, each of which occurs once each bit time. The $\phi_1$ signal, shown in FIG. 6A, has a relatively short pulse, such as one sixth of a bit time. The $\phi_2$ signal, shown in FIG. 6B, has a longer pulse, such as one-half a bit time. The leading edges of the $\phi_1$ and $\phi_2$ signals occur simultaneously. The $\phi_3$ signal, shown in FIG. 6C, has a short pulse, such as one sixth of a bit time, and has a leading edge coincident with the trailing edge of the $\phi_2$ signal. The $\phi_4$ signal, shown in FIG. 6D, has a longer pulse, such as one-half of a bit time, and has a leading edge coincident with the leading edge of the $\phi_3$ signal and a trailing edge coincident with the leading edge of the $\phi_1$ signal. The term "four-phase" is used to define these signals because the trailing edge of each occurs at four different times. A bit time is defined as the time between leading edges of successive $\phi_1$ pulses.

FIGS. 7 through 10 show the basic building blocks used in four-phase MOS logic circuitry. These building blocks are respectively called "1," "2," "3," or "4" gates and are respectively shown in FIG. 7, FIG. 8, FIG. 9, and FIG. 10. In FIG. 7, the "1" gate shown includes a first MOS transistor 130, which is designated as a load transistor; a second MOS transistor 132, which is designated an isolation transistor; and a series of one or more MOS transistors connected together to form logic circuit 134. Examples of the form which logic circuit 134 can take will be hereinafter given in more detail. The gate electrode of load transistor 130 is connected to the drain electrode thereof, and both of these are connected to the $\phi_1$ signal, shown in FIG. 6A. The source electrode of load transistor 130 and the drain electrode of isolation transistor 132 are coupled together, and the output O from the "1" gate is taken from this connection. The source electrode of isolation transistor 132 is connected to the drain electrodes of at least some of the transistors in logic circuit 134, and the source electrodes of at least some of the transistors in logic circuit 134 are connected to the $\phi_1$ signal. The gate electrode of isolation transistor 132 is connected to the $\phi_2$ signal, and the gate electrodes of the transistors in logic circuit 134 are connected to the input signals A through N. A general statement concerning the configuration of logic circuit 134 would be that, wherever two signals are to have a logical AND performed therebetween, the transistors to which those signals are applied will be connected in series, and, wherever two signals are to have a logical OR performed therebetween, the transistors to which those signals are applied will be connected in parallel. The output signal O from a "1" gate can be written as a function of the various input signals inverted, as indicated by the line drawn over the function. For instance, if B is "true," "on," or logic "1," $\overline{B}$ is "false," "off," or logic "0." Set off to the side of this equation would be the term "(1)," indicating a "1" gate. Herein, the term logic "1" will be used to signify a negative voltage signal, and the term logic "0" will be used to signify a voltage less than the threshold voltage of an MOS transistor, such as ground potential.

The operation of the "1" gate shown in FIG. 7 is hereinafter described with the assumptions being made that (1) the output is coupled to the gate electrode of another MOS transistor (not shown), which acts as a capacitive load, and (2) logic circuit 134 consists of a single transistor, hereinafter called the logic transistor, having its source connected to the $\phi_1$ signal and its drain connected to the source electrode of isolation transistor 132. The input to the gate electrode of the logic transistor will be the input voltage A, which is first assumed to be negative (logic "1") during the time the $\phi_2$ signal is negative. During the time that the $\phi_1$ signal is negative, the $\phi_2$ signal also will be negative, as seen from FIGS. 6A and 6B, and, thus, both load transistor 130 and isolation transistor 132 will be conductive. Since load transistor 130 is conductive the voltage at the output O will be negative, and this will cause the capacitive load (not shown) to become negatively charged. After the $\phi_1$ signal returns to ground voltage, but before the time the $\phi_2$ signal returns to ground voltage, as seen during the time $T_L$ between FIGS. 6A and 6B, load transistor 130 will become nonconductive and exhibit an extremely high drain-to-source impedance, while isolation transistor 132 will remain conductive and exhibit a relatively low drain-to-source impedance. In this event, one must look to the state of conductivity of the transistor in logic circuit 134. Since it was assumed that the input voltage A was negative, the logic transistor will be conductive; hence the output signal will be at ground voltage (logic "0"), since the drain electrode of the conductive logic transistor is connected to the $\phi_1$ signal, which is now at ground voltage. If the input voltage A was at ground potential (logic "0,"), the logic transistor would be nonconductive; hence the output voltage O would remain as the negative voltage (logic "1") stored in the capacitive load (not shown). Thus, the "1" gate just described acts as an inverter circuit; that is, the output signal O, is equal to the opposite of the input signal A. Written as a logical equation, this becomes $$O = \overline{A}$$

where the "(1)" term signifies a "1" gate.

Referring now to FIG. 8, a "2" gate is shown. The "2" gate similarly has a load transistor 136 having its drain and gate electrodes connected together and to the $\phi_1$ signal. The output from a "2" gate is taken from the source electrode of load transistor 136, which is also connected to the drain electrodes of at least some of the transistors in a logic circuit 138, which may be similar in construction to logic circuit 134. The source electrodes of at least some of the transistors in logic circuit 138 are connected to the drain electrode of an isolation transistor 140, which has its source electrode connected to the $\phi_1$ signal and its gate electrode connected to the $\phi_4$ signal. To understand the operation of a "2" gate, assume that (1) the output O is connected to a capacitive load and (2) there is a single logic transistor in logic circuit 138 having its gate electrode connected to the input voltage A, its drain electrode connected to the output signal O, and its source electrode connected to the drain electrode of isolation transistor 140. During the time the $\phi_1$ signal is negative, load transistor 136 will be conductive, and a negative signal will become stored in the capacitive load, thereby making the output signal O a negative voltage. When the $\phi_1$ signal returns to ground level, there will be no immediate path through which the capacitive load can discharge to ground, even though the logic transistor may be conductive. If the input signal A had been at ground potential, the logic transistor would be nonconductive, so the output signal O will remain at the negative voltage stored in the capacitive load. However, if the input signal is a negative voltage, the logic transistor is conductive, and, during the time the $\phi_4$ pulse is negative, isolation transistor 140 is conductive. Therefore, during the $\phi_4$ negative voltage time, the capacitive load can discharge to ground ($\phi_1$ is at ground potential when $\phi_4$ is negative) through the logic transistor and isolation transistor 140. Then, after $\phi_4$ returns to ground, but before $\phi_3$ returns to ground, the output signal O will be at ground potential. Thus, the "2" gate acts as an inverter circuit in this case. The logical equation for a "2" gate is:

$$O = \overline{A} \qquad (2)$$

where the term "(2)" indicates a "2" gate.

Referring now to FIG. 9, there is shown "3" gate, which is identical to the "1" gate shown in FIG. 7, with the exception that the $\phi_3$ and $\phi_4$ signals are used in place of the respective $\phi_1$ and $\phi_2$ signals used in FIG. 7. The output of the "3" gate is also an inverted version of the input applied thereto, where the logic circuit includes only a single transistor. Referring now to FIG. 10, there is shown the final building block in four-phase logic, which is a "4" gate. The "4" gate is identical to the "2" gate shown in FIG. 8 with the exception that the $\phi_3$ and $\phi_2$ signals are used in place of the respective $\phi_1$ and $\phi_4$ signals used in FIG. 8. The equations for the "3" and "4" gates shown in FIGS. 9 and 10 are, respectively:

$$O = \overline{A} \qquad (3)$$

$$O = \overline{A} \qquad (4)$$

Referring now to FIG. 11, there is shown a chart depicting which types of gates may apply signals to and/or receive signals from which other types of gates. The numbers 1, 2, 3, and 4 indicate the respective "1," "2," "3," and "4" gates shown in FIGS. 7 through 10. From the chart in FIG. 11, it is seen that a "1" gate can apply a signal to either a "2" gate or a "3" gate. Similarly, a "2" gate can only apply a signal to a "3" gate. A "3" gate can apply a signal to either a "4" gate or a "1" gate, while a "4" gate can only apply a signal to a "1" gate. It should be noted that "1" and "3" gates delay the data applied there one half of a bit time, while "2" and "4" gates do not.

With the above basic building blocks in mind, two examples of designing logic circuits using four-phase MOS circuits will now be given. In both examples, a "1" gate performs logic and feeds an inverter "3" gate. First, the example will be given for a situation where one desires to provide a negative output signal when either a C input signal is negative or an A input signal and a B input signal are negative; that is, a circuit to perform the logical function $AB+C$.

FIG. 12 shows a "1" gate-"3" gate combination circuit 142, which satisfies these requirements where the logic is performed in the "1" gate and the "1" gate output is inverted by the "3" gate to get the required result. Since the signals A and B must be negative at the same time in order to get O as a negative voltage, A and B are in a logical AND relationship; hence logic transistors 144 and 146 are connected in series with the A and B input signals respectively applied thereto, thereby forming an AND gate. Alternatively, output signal O could be negative if the C input signal had been negative. Therefore C is in a logical OR relationship with A and B; hence transistor 148 is connected in parallel with the two serially-connected logic transistors 144 and 146, and input signal C is connected thereto, thereby forming the OR gate. The output from the "1" gate in FIG. 13 can be written as the logical equation $$O = \overline{(AB+C)} \qquad (1)$$

The symbol (1) indicates that the logic given in the equation is performed in a "1" gate. If this output is applied to the input of the logic transistor in the "3" gate inverter 150 in FIG. 12, the output O becomes the equation:

$$O = AB+C \qquad (1-3)$$

The notation (1-3) used here indicates that the input signals are applied to a "1" gate and the output signal is taken from a "3" gate, with the output of the "1" gate being applied as the input of the "3" gate. There is also a one-bit time delay between the application of the A, B and C signals and the provision of the O signal. The circuit 142 of FIG. 12 could be one stage of a shift register, where, for instance, A comes from the previous stage of the register and where B and C are other inputs which can affect the register in desired manners.

Another common type of equation used in logical design is the latch equation, which may be written as:

$$O = A + \overline{B}O$$

Here O becomes negative when A becomes negative, and O remains negative until $\overline{B}$ goes from its normally negative value to ground. FIG. 13 shows a circuit 152, which will perform this logic function. In this case, transistors 154 and 156 are connected in series, transistor 154 having its gate electrode connected to the $\overline{B}$ data signal, and transistor 156 having its gate electrode connected to the output signal O. Transistor 158 is connected in parallel with transistors 154 and 156, and its gate electrode is connected to the A input signal. This circuit operates so that, whenever the A signal goes negative, the output signal O will go negative. This, in turn, will render conductive transistor 156, and, since the normally negative $\overline{B}$ signal is applied to transistor 154, it will be conductive. This will keep the output signal O negative, even though the A signal returns to ground. When the $\overline{B}$ signal goes to ground, transistor 154 will become nonconductive, and the output signal O then goes back to ground. Hence the circuit shown in FIG. 13 operates as a logical latch, or as an R-S flip-flop circuit; it is set by the A signal and reset by the $\overline{B}$ signal.

Reference is now made to FIGS. 14A through 14L, where a detailed description of Reader 60 is given. Where possible, numerical designations identical to those used in FIG. 5 will be used in FIGS. 14A through 14L. In FIGS. 14A through 14L, blocks of logic will be defined by equations rather than specific circuit details, with only input and output signals being shown for each block. It should be understood that appropriate ones of the $\phi_1$, $\phi_2$, $\phi_3$, and $\phi_4$ signals are also applied to each block. The circuit details of each block can be arrived at by following the procedure set out above with respect to FIGS. 7 through 13.

Referring now specifically to FIG. 14A, color bar coded field 62 is scanned by optical probe 64 and transmits light through optical fibers 66 to Color Detector Means 170, as previously explained in FIG. 5, and the above-cited Christie et al. United States patent application. Color Detector Means 170 provides three signals, GA1, WA1, and BA1, which represent respective colors green, white, and black. If probe 64 is not placed on a color, each of the GA1, WA1, and BA1 signals is logical "1," and, whenever probe 64 is placed on a color, the associated one of these signals becomes logical "0."

The GA1, WA1, and BA1 signals are all applied to Edge Detect Logic 172, which provides GA, WA, BA, and GARBAGE signals in response thereto. The logical equations for Edge Detect Logic 172 are:

| | | |
|---|---|---|
| BA=$\overline{(BA1)}$ | (4) | 172– 1 |
| BB1=$\overline{BB}$ | (1–3) | 172– 2 |
| BB2=BB BB1 | (1–3) | 172– 3 |
| $\overline{BB2}$=$\overline{(BB2)}$ | (4) | 172– 4 |
| BB2EDGE=$\overline{(BB2\ BB3)}$ | (1) | 172– 5 |
| BB3=$\overline{BB2}$ | (1–3) | 172– 6 |
| BB=GA1 WA1 BA | (1–3) | 172– 7 |
| GA=$\overline{(GA1)}$ | (4) | 172– 8 |
| GARBAGE=GBWEDGE7 | (1–3) | 172– 9 |
| GB1=$\overline{GB}$ | (1–3) | 172–10 |
| GB2=GB GB1 | (1–3) | 172–11 |
| $\overline{GB2}$=$\overline{(GB2)}$ | (4) | 172–12 |
| GB2EDGE=$\overline{(GB3\ \overline{GB2})}$ | (1) | 172–13 |
| GB3=$\overline{GB2}$ | (1–3) | 172–14 |
| GB=BA1 WA1 GA | (1–3) | 172–15 |
| GBWEDGE=$\overline{(WB2EDGE\ BB2EDGE}$ | | |
| $\overline{GB2EDGE}$ | (3) | 172–16 |
| GBWEDGE1=GBWEDGE | (1–3) | 172–17 |
| GBWEDGE2=GBWEDGE1 | (1–3) | 172–18 |
| GBWEDGE3=GBWEDGE2 | (1–3) | 172–19 |
| GBWEDGE4=GBWEDGE3 | (1–3) | 172–20 |
| GBWEDGE5=GBWEDGE4 | (1–3) | 172–21 |
| GBWEDGE6=GBWEDGE5 | (1–3) | 172–22 |
| GBWEDGE7=GBWEDGE6 | (1–3) | 172–23 |
| WA=$\overline{(WA1)}$ | (4) | 172–24 |
| WB1=$\overline{WB}$ | (1–3) | 172–25 |
| WB2=WB1 WB | (1–3) | 172–26 |
| $\overline{WB2}$=$\overline{(WB2)}$ | (4) | 172–27 |
| WB2EDGE=$\overline{(WB2\ \overline{WB3})}$ | (1) | 172–28 |
| WB3=$\overline{WB2}$ | (1–3) | 172–29 |
| WB=GA1 BA1 WA | (1–3) | 172–30 |

From these equations, it is seen that, when one of the GA1, WA1, or BA1 signals becomes logic "0" and remains logic "0" for two bit times, the corresponding one of the WB2, GB2, or BB2 signals becomes logic "1." One bit time thereafter, the GBWEDGE signal becomes logic "1" for one bit time and is applied through an eight-bit delay network to provide the one-bit (long) GARBAGE logic "1" signal. The WA, GA, and BA signals are merely the WA1, GA1, and BA1 signals inverted by a "4" gate, as seen by equations 172–1, 172–8, and 172–24.

To be more specific about the operation of Edge Detect Logic 172, it will be assumed that a white color is just beginning to be scanned; thus the WA1 signal is logic "0," and the WA signal is logic "1." One bit time later, the WB signal becomes logic "1" (equation 172–30), and one bit time after that the WB1 signal becomes logic "1" (equation 172–25). One bit time after both the WB and WB1 signals are logic "1," the WB2 signal becomes logic "1" (equation 172–26) and causes the WB2EDGE signal to become logic "0" one half-bit time thereafter, since the WB3 signal is logic "1" at this time (equation 172–28). One one-bit time after the WB2 signal becomes logic "1," the WB3 signal becomes logic "1," the WB3 signal becomes logic "0" (equations 172–27 and 172–29) and causes the WB2EDGE signal to become logic "1." One half-bit time after the WB2EDGE signal becomes logic "0," the GBWEDGE signal becomes logic "1" (equation 172–16). The GBWEDGE signal is then delayed eight bit times (equations 172–17 through 172–23 and 172–9) before the GARBAGE signal becomes logic "1" for one bit time.

The GARBAGE signal is applied to Load Color Logic 174, and the WA, GA, and BA signals are applied to Data Decode logic 176. Load Color Logic 174 included logic blocks 178, 180, and 182, and Data Decode logic 176 includes logic blocks 184 and 186. Logic block 178 is responsive to the GARBAGE signal from Edge Detect Logic 172, the GA1, BA1, and WA1 signals from Color Detect logic 170, the $\overline{LOCKOUT}$ signal from logic block 180, and the WHL, GHL, and BKL signals from logic block 184, and provides the LDCOLOR and $\overline{LDCOLOR}$ load color signals. The logic equations for logic block 178 are:

1–2 (LDCOLOR)

| | | |
|---|---|---|
| ALLDN=$\overline{(BA1\ GA1\ WA1)}$ | (3) | 178– 1 |
| B=$\overline{(BA1)}$ | (3) | 178– 2 |
| DBCL=$\overline{(G\ \overline{WORB}+B\ \overline{WORG}+W}$ | | |
| $\overline{GORB})$ | (1–2–3) | 178– 3 |
| G=$\overline{(GA1)}$ | (3) | 178– 4 |
| GORB=$\overline{(BA14\ GA14)}$ | (4) | 178– 5 |
| LDCOLOR=DBCL ALLDN | | |
| $\overline{LOCKOUT}$ NCL2 NCL1 NCL3 | | |
| $\overline{LDCOLOR}$ GARBAGE | (1–3) | 178– 6 |
| $\overline{LDCOLOR}$=$\overline{(LDCOLOR)}$ | (4) | 178– 7 |
| NCL1=$\overline{(G\ \overline{GNL})}$ | (4) | 178– 8 |
| NCL2=$\overline{(B\ \overline{BLK})}$ | (4) | 178– 9 |
| NCL3=$\overline{(W\ \overline{WHL})}$ | (4) | 178–10 |
| W=$\overline{(WA1)}$ | (3) | 178–11 |
| WORB=$\overline{(BA14\ WA14)}$ | (4) | 178–12 |
| WORG=$\overline{(WA14\ GA14)}$ | (4) | 178–13 |
| GA14=$\overline{(GA1)}$ | (4) | 178–14 |
| BAM=$\overline{(BA1)}$ | (4) | 178–15 |
| WA14=$\overline{(WA1)}$ | (4) | 178–16 |

Logic block 180 is responsive to the LDCOLOR TCIRBAR TB8, and L2 signals and provides the $\overline{LOCKOUT}$ signal, which is applied to logic block 178, according to the logical equations:

1–3 $\overline{LOCKOUT}$

| | | |
|---|---|---|
| LOCKOUT=LOCKOUT TCIRBAR | | |
| LORST+LDCOLOR | (1–3) | 180–1 |
| $\overline{LOCKOUT}$=$\overline{(LOCKOUT)}$ | (4) | 180–2 |
| LORST=(TB8 L2) | (4) | 180–3 |

The TCIRBAR signal is one of a family of signals also including the TCIR, $\overline{TCIR}$, and TCIR#4 signals which are provided in response to utilization device 89 reaching full power. They are more fully discussed in FIG. 14J. Similarly, the TB8 signal is one of the timing signals used in Reader 60 and is provided by logic in FIG. 14J. In general, whenever a signal is provided by logic on another drawing, a letter in parentheses will precede that signal where the letter indicates the letter of the series of FIG. 14 drawings. However, in the case of the timing signals TB1 through TB8 and $\overline{TB1}$ through $\overline{TB8}$, the TCIR family of signals, and the INIT family of signals, also provided from FIG. 14J, this letter designation is omitted because of their frequent use; however, it is to be understood that they are provided by logic shown in FIG. 14J.

Logic block 182 is responsive to the LDCOLOR, TB8, and $\overline{TB8}$ signals and provides the L2 signal to reset the $\overline{LOCKOUT}$ latch in logic block 180 according to the logical equations:

L1=L1 $\overline{TB8}$+LDCOLOR _____ (1–3) 182–1
L2=TB8 L1+$\overline{TB8}$ L2 _____ (1–3) 182–2

Logic block 184 in Data Decode Logic 176 is responsive to the WA, GA, and BA signals from Edge Detect Logic 172, the LDCOLOR $\overline{LDCOLOR}$ signals from logic block 178, and the TCIRBAR signal and provides the WHL, GNL, BKL, and WASWHL color latch signals and the WAD, GAB, and BAD signals. The logical equations for logic block 184 are:

1–6 WHL/GNL/BKL/WAD/GAD/BAD/WASWHL
BAD=BA _____ (1–3) 184–1
BKL=$\overline{LDCOLOR}$ TCIRBAR BKL+BAD
    LDCOLOR _____ (1–3) 184–2
GAD=GA _____ (1–3) 184–3
GNL=GNL $\overline{LDCOLOR}$ TCIRBAR+GAD
    LDCOLOR _____ (1–3) 184–4
WAD=WA _____ (1–3) 184–5
WASWHL=WASWHL $\overline{LDCOLOR}$ TCIRBAR
    +WHL LDCOLOR _____ (1–3) 184–6
WHL=WHL LDCOLOR TCIRBARWAD+
    LDCOLOR _____ (1–3) 184–7

Logic block 186 provides the DATAIN binary data signal in response to the LDNB, LDCOLOR, WHL, GNL, BKL, WAD, GAD, and BAD signals according to the logical equations:

1–7 DATAIN
DATAIN=(GNL WAD+BKL GAD+BAD
    WHL) LDCOLOR+DATAIN
    DATAZERO _____ (1–3) 186–1
DATAZERO=(LDCOLOR+DTRST) __ (4) 186–2
DTRST=LDNB _____ (1–3) 186–3

When power is first applied to the system in which Reader 60 is a part, the TCIRBAR signal becomes logic "0" for two character times and resets the LOCKOUT latch in logic block 180, causing the $\overline{LOCKOUT}$ signal to become logic "1" (equations 180–1 and 180–2). This also resets the WHL, GNL, BKL, and WASWHL latches in logic block 184, causing the WHL, GNL, BKL, and WASWHL signals to become logic "0" (equations 184–7, 184–4, 184–2, and 184–6). The term "character time" is defined to mean eight successive bit times such as between bit times TB3 and the following TB2. After probe 64 is placed on a color and the GARBAGE signal becomes logic "1," the DBCL, ALLDN, $\overline{LOCKOUT}$, NCL1, NCL2, NCL3, $\overline{LDCOLOR}$ signals are all logic "1," so the LDCOLOR signal becomes logic "1" for one bit time (equation 178–6) and the $\overline{LDCOLOR}$ signal becomes logic "0" for one bit time (equation 178–7). The logic "1" LDCOLOR signal sets the LOCKOUT latch in logic block 180 and causes the $\overline{LOCKOUT}$ signal to become logic "0." This prevents the LDCOLOR signal from becoming logic "1" again until the LOCKOUT latch is reset. The logic "1" LDCOLOR signal also sets the L1 latch in logic block 182 (equation 182–1), which sets the L2 latch, causing the L2 signal to become logic "1" from the following TB1 through TB8 time (equation 182–2). When the L2 signal is reset at time TB8, the LOCKOUT latch is reset, and a new LDCOLOR logic "1" signal will be provided when a new color bar is scanned.

When a color bar is being scanned, the one of the WA, GA, or BA signals which is logic "1" is delayed one bit time to produce one of the WAD, GAD, or BAD signals (equations 184–5, 184–3, and 184–1), and, when the LDCOLOR signal becomes logic "1," the one of the color latches having the logic "1" WAD, GAD, or BAD signal applied thereto is set to provide a logic "1" WHL, GNL, or BKL signal (equations 184–7, 184–4, and 184–2). If a logic "1" WHL signal is provided, the next LDCOLOR signal sets the WASWHL latch, causing the WASWHL signal to become logic "0" (equation 184–6) and the simultaneous $\overline{LDCOLOR}$ logic "0" signal resets the WHL latch; otherwise the next $\overline{LDCOLOR}$ logic "0" signal resets the GNL or BKL signals had these signals been logic "1." It should be noted that all latches are set and reset one bit time after the leading edge of the setting or resetting signals, and, in the case of the LDCOLOR signal, this occurs at the trailing edge of the logic "1" signal, since it is only one bit time in duration. Thus, during the time the LDCOLOR signal is at logic "1," the previous color latch signal (WHL, GNL, or BKL) and the present color delay signal (WAD, GAD, and BAD) are logic "1," and the DATAIN signal can be determined by looking at the transition from the previous color as represented by the WHL, GNL, or BKL signals to the present color as represented by the WAD, GAD, and BAD signals. As seen by the equation 186–1, when logic "1" WHL and BAD, GNL, and WAD, or BKL and GAD signals occur during the time the LDCOLOR signal is logic "1," the DATAIN signal becomes logic "1," and it is reset two bit times after a logic "1" LDNB signal is provided from circuit 188 (equations 186–1, 186–2, and 186–3); otherwise the DATAIN signal remains logic "1." Thus, the DATAIN signal represents the data defined by the color transitions according to the charts in FIGS. 4A and 4B.

Circuit 188 is responsive to the LDCOLOR, EOD (from FIG. 14H), TB7, $\overline{TB7}$, TB8 EOFFF (from FIG. 14C), SHFT7 (from FIG. 14C) and DUB4 (from FIG. 14C) signals and provides the TRANS, TRANSTB7, and LDNB signals according to the logical equations:

1–5 TRANSTB7 TRANS LDNB
    $\overline{EOD}$=($\overline{EOD}$) _____ (4) 188–1
LDNB=TRANSTB7+DUB4+TB8 EOFF
    $\overline{SHFT7}$ _____ (1–3) 188–2
$\overline{SHFT7}$=$\overline{(SHFT7)}$ _____ (4) 188–3
TRANS=$\overline{EOD}$ LDCOLOR+$\overline{TB7}$
    TRANS _____ (1–3) 188–4
TRANSTB7=TB7 TRANS _____ (1–3) 188–5

The logic "1" LDCOLOR signal sets the TRANS latch as long as the EOD signal is logic "1," and the TRANS latch remains set until the $\overline{TB7}$ signal returns to logic "1" (equation 188–4). During the TB7 time, the logic "1" TRANS signal causes the TRANSTB7 signal to become logic "1" (equation 188–5), and this causes the LDNB signal to be provided one bit time later (equation 188–2). Thus, every time a new color is scanned and the LDCOLOR signal becomes logic "1," the LDNB signal becomes logic "1" for one bit time during the following TB8 time. The LDNB signal is also provided when it is necessary to insert dummy bits into Input Buffer Means 72, and this is controlled by the DUB4 and TB8 EOFF $\overline{SHFT7}$ terms of equation 188–2. The reason and position of the dummy bits will be explained hereinafter.

Referring now to FIG. 14B, Beginning of Field (BOF) Counter Means 90 and associated logic are shown. The purpose of this counter is to detect the beginning of the scanning of data and to prevent loading Input Buffer Means 72 with noise or accidental pickup. BOF Counter Means 90 counts the time probe 62 is scanning the white color and the next non-white color of the tag. If the ratio of the white color time to the non-white color time is four to one or greater, then the BOF signal is provided to indicate a valid scan occurring. In this instance, the white color would be the background color, and the non-white color would be the first bar. BOF Counter Means 90 accomplishes this by counting up while a white color is being scanned, and, after a green or black area begins to be scanned, the count in the BOF Counter Means 90 is divided by four and inverted before continuing the count. If the counter is still counting when the next color transition occurs, the BOF signal becomes logic "1" for one bit time, and, if it has counted out when the next color transition occurs, the BOF signal remains logic "0."

The heart of BOF Counter Means 90 is eight bit recirculating BOF Counter 189 having B8 stage 192, B7 stage 194, B6 stage 196, B5 stage 198, B4 stage 200, B3 stage 202, B2 stage 204, and B1 stage 206, with B8 stage 192 being most significant and B1 stage 206 being the least significant. Each of stages 192 to 206 (even numbers) respectively provides the B8, B7, B6, B5, B4 and $\overline{B3}$, B2 and $\overline{B2}$, and B1 and $\overline{B1}$ signals. Each of stages 194 to 206 (even numbers) is responsive to the output of the stage next up in significance thereto. B8 stage 192 is where the counter logic occurs and is responsive to the $\overline{WHCH}$, D1VL, $\overline{D1VL}$, ADDL, $\overline{ADDL}$ control signals, the TB7, $\overline{TB7}$, TB8, and $\overline{TB8}$ timing signals, and the B10BAR, $\overline{B9}$, $\overline{B3}$, $\overline{B1}$, and B1 counter signals. The logical equations for BOF Counter 189 are:

B1=B2 _____ (1-3) 206-1
$\overline{B1}=\overline{(B1)}$ _____ (4) 206-2
B2=B3 _____ (1-3) 204-1
$\overline{B2}=\overline{(B2)}$ _____ (4) 204-2
B3=B4 _____ (1-3) 202-1
$\overline{B3}=\overline{(B3)}$ _____ (4) 202-2
B4=B5 _____ (1-3) 200-1
B5=B6 _____ (1-3) 198-1
B6=B7 _____ (1-3) 196-1
B7=B8 _____ (1-3) 194-1
B8=D1VL (B10BAR TB8+TB7 $\overline{B9}$+$\overline{TB7}$
$\overline{B3}$ $\overline{TB3}$ $\overline{TB8}$+ ($\overline{ADDL}$ B1+ADDL
$\overline{B1}$) $\overline{WHCH}$ $\overline{D1VL}$ _____ (1-3) 192-1

Eight bit recirculating BOF counter 189 is a portion of ten bit BOF counter 190, which further includes logic blocks 208, 210, 212, 214, 216, and 218. Logic block 208 provides a B9SET signal in response to the $\overline{HWCH}$, TB8, and B1 signals according to the logical equations:

2-11 B9SET
B9SET=DCD256 B1 TB8 _____ (1-3) 208-1
$\overline{B9SET}=\overline{(B9SET)}$ _____ (4) 208-2
DCD256=$\overline{B9SET}$ DCD256 B1 $\overline{WHCH}$
+TB8 _____ (1-3) 208-3

Logic block 210 provides a B9RST signal in response to the B9SET and B10 BAR signals according to the logical equation:

B9RST=$\overline{(B10BAR\ B9SET)}$ _____ (4) 210-1

Logic block 212 provides a B9 signal and a $\overline{B9}$ signal in response to the B9SET, B89RST, B9RST, and $\overline{WHCH}$ signals according to the logical equations:

2-12 B9 $\overline{B9}$
B9=B9 B9RST $\overline{WHCH}$ B89RST+B9SET
$\overline{B9}$ _____ (1-3) 212-1
$\overline{B9}=\overline{(B9)}$ _____ (4) 212-2

Logic block 214 provides a B10 signal and a B10BAR signal in response to the B9, B9SET, $\overline{WHCH}$, and B89RST signals according to the logical equations:

2-14 B10 B10BAR
B10=$\overline{(B10\#1)}$ _____ (3) 214-1
B10BAR=$\overline{(B10\#2)}$ _____ (3) 214-2
B10#1=B10 $\overline{WHCH}$ B89RST+B9SET B9 _ (1) 214-3
B10#2=$\overline{(B10\#1)}$ _____ (2) 214-4

Logic block 216 provides a DCD512 signal in response to the B2, $\overline{B2}$, TB7, TB8, and $\overline{TB8}$ signals according to the logical equation:

2-16 DCD512
DCD512=DCD512 (B2 $\overline{TB8}$+TB8 $\overline{B2}$)
+TB7 _____ (1-3) 216-1

Logic block 218 provides a $\overline{CNTSTP}$ signal in response to the B2, B10, B9, DCD512 $\overline{BOFFF}$, WHL (from FIG. 14A) and TB7 signals according to the logical equations:

2-15 $\overline{CNTSTP}$
BOFFF=$\overline{(BOFFF)}$ _____ (4) 218-1
CNTSTP=WHL CNTSTP+B10 DCD512
TB7 B9 B2 $\overline{BOFFF}$ _____ (1-3) 218-2
$\overline{CNTSTP}=\overline{(CNTSTP)}$ _____ (4) 218-3

The control signals to ten bit BOF counter 190 are provided by Green or Black Latch 220, White Latch 222, Divide Latch 224, Add Latch 226, and Reset Logic 228. Green or Black Latch 220 provides the GORBCH, $\overline{GORBCH}$, and GORBTB8 signals in response to the TRANS, BKL, and GNL signals all from FIG. 14A and the TB7 and $\overline{TB8}$ timing signals according to the logical equations:

2-1 GORBCH GORBTB8
GORBCH=$\overline{TB8}$ GORBCH+GORBTB8 _ (1-3) 220-1
GORBTB8=TB7 TRANS (BKL+GNL) _ (1-3) 220-2
$\overline{GORBCH}=\overline{(GORBCH)}$ _____ (4) 220-3

White Latch 222 provides the WHCH and $\overline{WHCH}$ signals in response to the WHL (from FIG. 14A), TRANSTB7 (from FIG. 14A), and $\overline{TB8}$ signals according to the logical equations:

2-2 WHCH $\overline{WHCH}$
WHCH=$\overline{TB8}$ WHCH+TRANSTB7
WHL _____ (1-3) 222-1
$\overline{WHCH}=\overline{(WHCH)}$ _____ (4) 222-2

Divide Latch 224 provides DIVL and $\overline{DIVL}$ signals in response to the WASWHL (from FIG. 14A), GORBTB8, and $\overline{TB8}$ signals according to the logical equations:

2-3 DIVL $\overline{DIVL}$
DIVL=WASWHL GORBTB8+DIVL
$\overline{TB8}$ _____ (1-3) 224-1
$\overline{DIVL}=\overline{(DIVL)}$ _____ (4) 224-2

Add Latch 226 provides the ADDL and $\overline{ADDL}$ signals in response to the A1 (from FIG. 14C), A2 (from FIG. 14C), $\overline{CNTSTP}$, B1, and TB8 signals according to the logical equations:

2-7 ADDL $\overline{ADDL}$
ADDL=$\overline{CNTSTP}$ A1 TB8 A2+ADDL
B1 _____ (1-3) 226-1
$\overline{ADDL}=\overline{(ADDL)}$ _____ (4) 226-2

The A1 and A2 signals occur together during every fourth TB8 time.

Reset Logic 228 provides the B89RST signal in response to the TB8 and DIVL signals according to the logical equation:

B89RST=$\overline{(DIVL\ TB8)}$ _____ (4) 228-1

The output logic for BOF counter means 90 includes Down Count Latch 230, and BOF gate 232, which includes logic blocks 234 and 236 and BOFFF latch 238. Down Count Latch 230 provides the DNCNT signal in response to the B9, $\overline{\text{TRANSTB1}}$, DIVL, and TB7 signals according to the logical equations:

$$\text{DNCNT} = \overline{\text{TRANSTB1}}\ \text{DNCNTRST}$$
$$\text{DNCNT} + \text{DIVL} \quad\quad (1\text{--}3)\ 230\text{--}1$$
$$\text{DNCNTRST} = \overline{(\text{TB7 B9})} \quad\quad (4)\ 230\text{--}2$$

Logic Block 236 provides the TRANSTB1 and $\overline{\text{TRANSTB1}}$ signals in response to the TRANSTB7 signal from FIG. 14A according to the logical equations:

$$\text{TRANSTB1} = \text{TRANSTB7} \quad\quad (1\text{--}3)\ 236\text{--}1$$
$$\overline{\text{TRANSTB1}} = \overline{(\text{TRANSTB1})} \quad\quad (4)\ 236\text{--}2$$

Logic Block 234 provides the BGOFLD, BOF, and $\overline{\text{BOF}}$ signals in response to the DNCNT, TRANSBT1, and $\overline{\text{B9}}$ signals according to the logical equations:

$$\text{BGOFLD} = \overline{(\text{BOF}\#1)} \quad\quad (3)\ 234\text{--}1$$
$$\text{BOF} = \overline{(\text{BOF}\#2)} \quad\quad (3)\ 234\text{--}2$$
$$\text{BOF}\#1 = \overline{(\text{TRANSTB1 DNCNT B9})} \quad (1)\ 234\text{--}3$$
$$\text{BOF}\#2 = (\text{BOF}\#1) \quad\quad (2)\ 234\text{--}4$$

BOFFF Latch 238 provides the BOFFF and $\overline{\text{BOFFF}}$ signals in response to the $\overline{\text{EOD}}$ (from FIG. 14H), EOF (from FIG. 14C), and BGOFLD signals according to the logical equations:

$$\text{BOFFF} = \text{BGOFLD} + \overline{\text{EOD}}\ \text{BOFFF}\ \overline{\text{EOF}} \quad (1\text{--}3)\ 238\text{--}1$$
$$\overline{\text{BOFFF}} = \overline{(\text{BOFFF})} \quad\quad (4)\ 238\text{--}2$$
$$\overline{\text{EOF}} = \overline{(\text{EOF})} \quad\quad (4)\ 238\text{--}3$$

The operation of BOF Counter Means 90 will now be explained. As previously explained in FIG. 14A, when a white color is scanned by probe 64, the TRANSTB7 signal becomes logic "1" for one bit time during the TB8 time, and the WHL signal is set to logic "1." These two signals set the WHCH latch in white character logic 222, causing the WHCH signal to become logic "1" at time TB1. When the following $\overline{\text{TB8}}$ signal becomes logic "0," the WHCH latch is reset, causing the WHCH signal to become logic "0" after time TB8 (equation 222–1). The $\overline{\text{WHCH}}$ signal is the complement of the WHCH signal (equation 222–2) and is logic "0" from times TB1 through TB8.

The $\overline{\text{WHCH}}$ signal clears eight bit BOF Counter 189 by being applied to B8 stage 192 to cause the signals B1–B8 to become logic "0" during the next eight bit times. The eight stages 192–206 (even numbers) function as an eight bit recirculating dynamic counter. Each bit time, the bit signal stored in a stage is shifted one position down in significance, and the B1 least significant bit signal is shifted to B8 stage 192 to become the B8 signal. The true count is indicated at time TB1. During the eight bit times $\overline{\text{WHCH}}$ is logic "0," the entire contents of eight bit counter 189 is recirculated through B8 stage 192. As seen from equation 192–1, and assuming that the DIVL signal is logic "0" and the $\overline{\text{DIVL}}$ signal is logic "1," when the $\overline{\text{WHCH}}$ signal becomes logic "0," the B8 signal becomes logic "0." Since the $\overline{\text{WHCH}}$ signal is logic "0" for eight bit times, the next eight B8 signals which are provided and shifted down in significance each bit time are logic "0." Thus, when the $\overline{\text{WHCH}}$ signal becomes logic "1" again, the count in eight bit BOF counter 189 is zero; that is, it has been cleared.

The $\overline{\text{WHCH}}$ signal is also applied to logic blocks 212 and 214 to reset the B9 and B10 latches (equations 212–1 and 214–3) and to logic block 208 to reset the DCD256 latch (equation 208–3). These latches are all reset one bit time after the $\overline{\text{WHCH}}$ signal becomes logic "0"; that is, at time TB2. Thus, the B9, B10, and DCD256 signals are all logic "0" at the time eight bit BOF counter 189 is cleared. The logic "0" DCD256 signal maintains the B9SET signal at logic "0" (equation 208–1).

After the $\overline{\text{WHCH}}$ signal returns to logic "1," eight bit BOF counter 189 begins incrementing its count by one every fourth TB8 time. The incrementing is controlled by Add Latch 226 and the $\overline{\text{ADDL}}$ B1+ADDL $\overline{\text{B1}}$ term of equation 192–1. Assuming that the $\overline{\text{CNTSTP}}$ signal is logic "1," the ADDL latch in Add Latch 226 is set by every fourth TB8 logic "1" signal, since this is the time both the A1 and A2 signals are logic "1," thereby causing the ADDL signal to become logic "1" and the $\overline{\text{ADDL}}$ signal to become logic "0" at TB1 time (equations 226–1 and 226–2). The ADDL latch is reset whenever a logic "0" B1 signal occurs, thereby causing the ADDL signal to return to logic "0" and the $\overline{\text{ADDL}}$ signal to return to logic "1" one bit time thereafter (equations 226–1 and 226–2).

After the $\overline{\text{WHCH}}$ signal returns to logic "1," the circulating count in eight bit BOF counter 189 at time TB1 is "0–0–0–0–0–0–0–0." When the A1, A2, and TB8 signals all are logic "1," the ADDL signal becomes logic "1" during the following TB1 time, thereby causing the ADDL $\overline{\text{B1}}$ term of equation 192–1 to become logic "1." This, in turn, causes the B8 signal to become logic "1" during time T2. During the TB1 time that the ADDL $\overline{\text{B1}}$ term of equation 192–1 is logic "1," the B1 signal is logic "0," and this resets the ADDL latch, thereby causing the ADDL signal to become logic "0" from time TB2 until it is subsequently set again. Thereafter, the $\overline{\text{ADDL}}$ B1 term of equation 192–1 causes the then-existing count to recirculate in eight bit BOF Counter 189. The logic "1" B8 signal is down shifted one stage in significance every bit time, so, at the next TB1 time, the count in eight bit BOF counter 179 is "0–0–0–0–0–0–0–1."

When the ADDL signal again becomes logic "1" during TB1 time, the $\overline{\text{ADDL}}$ B1+ADDL $\overline{\text{B1}}$ term of equation 192–1 is logic "0," since the B1 signal is then logic "1." Thus, a logic "0" is inserted as the B8 signal during time TB2. Since B1 was not logic "0," the ADDL latch is not reset. During time TB3, however, the B1 signal becomes a logic "0" (this being the B2 signal during time TB1), and the ADDL B1 term of equation 192–1 becomes logic "1." Thus, the B8 signal becomes logic "1" during time TB3, and, at the following TB1 time, the count in eight bit BOF counter 189 is "0–0–0–0–0–1–0." During time TB3, the ADDL signal becomes logic "0," since the B1 signal was logic "0" at TB2. This process continues until the count in eight bit BOF counter becomes "1–1–1–1–1–1–1–1"; that is, until it is full.

Logic block 208 includes DCD256 latch, which is set by each TB8 pulse and reset whenever the B1 signal becomes logic "0" (equation 208–3). If eight bit counter 179 has a full count, the B1 signal will remain logic "1" through the next TB8 time. In this case, the DCD256 latch is not reset, and the DCD256 signal remains logic "1" and thereby causes the B9SET signal to become logic "1" during the next TB1 time (equation 208–1). The logic "1" B9SET signal resets the DCD256 latch (equation 208–3) and sets the B9 latch in logic block 212, causing the B9 signal to become logic "1" (equation 212–1). Eight bit BOF counter 179 remains at full count for four character times, since the A1 and A2 signals both only become logic "1" every fourth TB8 time. As explained above, the DCD256 latch is not reset during the first character time, and B9SET signal becomes logic "1" during time TB1 of the second character time, and resets the DCD256 latch. During time TB8 of the second character time, the DCD256 latch is again set by the logic "1" TB8 signal (equation 208–3), and it remains set through the third character time. Thus, the B9SET signal becomes logic "1" for a second time during time TB1 of the fourth character time. At the time the second B9SET logic "1" signal occurs, the B9 signal is logic "1," and the B10 latch in logic block 214 is set by the B9SET term of equation 214–3, thereby causing the B10 signal to become logic "1" and the B10BAR signal to become logic "0" during time TB1 of the fourth character time. One bit time before the B10 signal becomes logic "1," the B9 latch is reset by the B9RST signal becoming logic "0" as a result of the B10BAR signal being logic "1" when the second B9SET signal occurred (equation 210–1), and the B9 signal becomes logic "0" at time TB1 of the fourth character time. Thus, after the end of four character times, eight bit counter BOF 189 is full, the B10 latch is set, and the B9 latch is reset.

The next time the A1 and A2 signals are logic "1," eight bit BOF counter 178 is incremented, and the count returns to zero. Eight bit BOF counter 179 then counts up again until it is full, as before, and a third and fourth B9SET logic "1" signal occurs. The third logic "1" B9SET signal sets the B9 latch, since the B9SET $\overline{B9}$ term of equation 212–1 is logic "1," and the fourth B9SET pulse does nothing, since both the B9 and B10 latches are already set. Eight bit BOF counter 178 again counts out to zero and begins incrementing its count again. When the count reaches 253—that is, a count of "1–1–1–1–1–1–0–1," the DCD512 latch in logic block 216 remains set for the next eight bit times. The DCD512 latch is set by every TB7 pulse and is reset by a logic "1" B2 signal at time TB8 or a logic "0" B2 signal any other time. Thus, when the count is 253, the DCD512 latch is not reset, and the DCD512 signal remains logic "1" through the next TB7 time.

The logic "1" DCD512 signal is applied to logic block 218 and causes the $\overline{CNTSTP}$ signal to become logic "0" at the following time TB8, since, the B10 DCD512 TB7 B9 B2 $\overline{BOFFF}$ term of equation 218–2 is logic "1" at time TB7 (equations 218–2 and 218–3). A logic "0" $\overline{CNTSTP}$ signal inhibits the ADDL latch from becoming set by the logic "1" A1 and A2 signals every fourth TB8 time (equation 226–1). Thus, the counting stops, and ten bit BOF counter 190 is saturated.

When probe 64 leaves the white color and begins scanning either a green or a black color, one of the GNL or BKL signals becomes logic "1," and the logic "1" LDCOLOR causes the TRANS signal to become logic "1," as previously explained with respect to FIG. 14A. This in turn causes the GORBTB8 signal in logic block 220 to become logic "1" at time TB8 (equation 220–2), which sets the GORBCH latch the next bit time, causing the GORBCH signal to become logic "1" at time TB1 (equation 220–1). The LDCOLOR logic "1" signal also sets the WASWHL latch in FIG. 14A, causing the WASWHL signal to be logic "1." When both the GORBTB8 and WASWHL signals are logic "1," the DIVL latch in Divide Latch logic 224 is set, causing the DIVL signal to become logic "1" and the $\overline{DIVL}$ signal to become logic "0" at time TB1. The DIVL latch is reset by the next logic "0" $\overline{TB8}$ signal after the following TB8 time. As long as the $\overline{DIVL}$ signal is logic "0," the incrementing of eight bit BOF counter ceases because the ($\overline{ADDL}$ B1 & ADDL $\overline{B1}$) $\overline{DIVL}$ $\overline{WHCH}$ term of equation 192–1 remains logic "0." This, of course, is important only if the CNTSTP latch had not been set; that is, if ten bit BOF counter 190 had not become saturated.

As previously mentioned, it is necessary to now divide the count in ten bit BOF counter 190 by four and complement it. A binary number may be divided by four by truncating the two least significant numbers and moving the remaining numbers down two positions in significance. Thus, the B10BAR signal should become the B8 signal, the $\overline{B9}$ signal should become the B7 signal, and so forth. The DIVL (B10BAR TB8+TB7 $\overline{B9}$+TB7 $\overline{B3}$ $\overline{TB8}$)

term of equation 192–1 accomplishes this result. The logic "1" DIVL signal enables this term and from times TB1 through TB6, the $\overline{B3}$ signal is recirculated through B8 stage 192. At time TB7, the $\overline{B9}$ signal is placed in B8 stage 192, and, at time TB8, the B10BAR signal is placed in B8 stage 192. Thus, when the DIVL signal returns to logic "0," the divide by four and inverting action has taken place.

The DIVL signal is also applied to logic block 228 to cause the B89RST signal to become logic "0" during time TB8 (equation 228–1). The logic "0" B89RST signal resets the B9 and B10 latches during time TB1, the B9 and B10 signals to become logic "0" (equations 212–1 and 214–3). Thereafter, the DIVL latch is reset, and eight bit BOF counter 189 counts in the manner previously described.

If eight bit counter 189 has not become full and caused the B9 latch to become set for the first time before a new color is detected, then probe 64 has scanned a white color for a time at least four times as long as the time it scanned the next non-white color, and this is interpreted as a valid beginning of field, and a logic "1" BOF signal should be issued. The logic to cause a logic "1" BOF signal to occur is Down Count Latch 230, BOF Gate 232, and BOFFF Latch 230. The logic "1" DIVL signal sets the DNCNT latch to logic "1," and it is reset by either a B9 logic "1" signal occurring at time TB7 or a logic "0" $\overline{TRANSTB1}$ signal (equations 230–1 and 230–2). The $\overline{TRANSTB1}$ signal becomes logic "0" one bit time after the TRANSTB7 signal, described in FIG. 14A, becomes logic "1" due to the occurrence of a logic "1" LDCOLOR signal (equations 236–1 and 236–2). Thus, when a new color is detected, the DNCNT latch is reset to logic "0" one bit time later, if it had not been reset earlier by a logic "1" B9 signal.

The logic "1" TRANSTB1, DNCNT, and $\overline{B9}$ signals cause the BOF and BGOFLD signals to become logic "1" during time TB2 for one bit time (equations 234–1 through 234–4). The logic "1" BGOFLO signal causes the BOFFF latch to be set, thereby causing the BOFFF signal to be logic "1" (equation 238–1) and the $\overline{BOFFF}$ signal to become logic "0" (equation 238–2). The logic "0" $\overline{BOFFF}$ signal resets the CNTSTP latch. The BOFFF signal will remain logic "1" until either the end of field, EOF, or end of data, EOD, signals become logic "1."

If B9 had been logic "1" when the next color was detected, the DNCNT latch would have been reset thereby, and the one bit time when the DNCNT and TRANSTB1 signals are both logic "1" would not exist. Thus, the BOF signal could not become logic "1," nor could the BOFF signal.

Reference is now made to FIG. 14C, where the EOF Counter Means 92 and the Register Position Counter Means 98 are shown. EOF Counter Means 92 operates similarly to BOF counter means 90. When probe 64 scans a green or black character, it counts up at a given rate, and, when probe 64 scans a white color, the count is inverted, and the counter then counts up at one fourth the given rate. When the EOF Counter Means 92 becomes saturated, a logic "1" EOF signal is issued.

The main element of EOF Counter Means 92 is eight bit recirculating EOF Counter 220, consisting of D8 stage 222, D7 stage 224, D6 stage 226, D5 stage 228, D4 stage 230, D3 stage 232, D2 stage 234, and D1 stage 236, most significant to least significant stage, which respectively provide the D8, D7, D6, D5, D4, D3, D2, and D1 and $\overline{D1}$ signals. Each of stages 224 through 236 (even numbers only) is responsive to the signal provided by the next most significant stage thereto. D8 stage 222 is responsive to the CNTL, $\overline{CNTL}$, WHCH (from FIG. 14B), GORBCH (from FIG. 14B) D1, $\overline{D1}$, and $\overline{WHCH}$ (from FIG. 14B)

signals. The logical equations for eight bit EOF counter 220 are:

| | | |
|---|---|---|
| D1=D2 | (1–3) | 236–1 |
| $\overline{D1}=\overline{(D1)}$ | (4) | 236–2 |
| D2=D3 | (1–3) | 234–1 |
| D3=D4 | (1–3) | 232–1 |
| D4=D5 | (1–3) | 230–1 |
| D5=D6 | (1–3) | 228–1 |
| D6=D7 | (1–3) | 226–1 |
| D7=D8 | (1–3) | 224–1 |
| D8=D1 $\overline{\text{WHCH}}$ $\overline{\text{CNTL}}$ $\overline{\text{GORBCH}}$ D1+ CNTL $\overline{\text{GORBCH}}$ $\overline{\text{D1}}$+WHCH $\overline{\text{D1}}$ | (1–3) | 222–1 |

Add Count Logic 238 provides the CNTL and $\overline{\text{CNTL}}$ signals in response to the A1, TB8, A2, WHL (from FIG. 14A), BKL (from FIG. 14H), GNL (from FIG. 14A), and D1 signals according to the logical equations:

CNTL=WHL A2 A1 TB8+(BKL+GNL)
  TB8+D1 CNTL ................. (1–3) 238–1
$\overline{\text{CNTL}}=\overline{(\text{CNTL})}$ ................. (4) 238–2

Counter 240 provides the A1 and A2 signals in response to the TB8 and $\overline{\text{TB8}}$ timing signals according to the logical equations:

| | | |
|---|---|---|
| A1=A1 $\overline{\text{TB8}}$+$\overline{\text{A1}}$ TB8 | (1–3) | 240–1 |
| $\overline{\text{A1}}=\overline{(\text{A1})}$ | (4) | 240–2 |
| A2=A2CLK $\overline{\text{A2}}$+A2 $\overline{\text{A2CLK}}$ | (1–3) | 240–3 |
| $\overline{\text{A2}}=\overline{(\text{A2})}$ | (4) | 240–4 |
| A2CLK=A1 TB8 | (1–3) | 240–5 |
| $\overline{\text{A2CLK}}=\overline{(\text{A2CLK})}$ | (4) | 240–6 |

As seen from equation 240–1, the A1 latch is set by one TB8, logic "1" signal, reset by the next TB8 logic "1" signal, set by the next TB8 logic "1" signal, and so forth. The latch A2 is set by the leading edge of one A1 signal and reset by the leading edge of the next A1 signal (equation 240–3). Thus, the A1 and A2 signals are both logic "1" every fourth TB1 through TB8 character time.

EOF Counter Means 92 also includes logic blocks 242, 244, and 246 for increasing the count capacity of EOF Counter Means 92. Logic block 242 provides the EOF256 signal in response to the D1 and TB8 timing signals according to the logical equation:

EOF256=D1 EOF256+TB8 ............. (1–3) 242–1

Logic block 244 provides the D9LOAD signal in response to the A1, A2, D1, BKL (from FIG. 14A), GNL (from FIG. 14A), GORBCH (from FIG. 14B), TB8, and EOF256 signals according to the logical equation:

D9LOAD=$(\overline{\text{GORBCH}}$ EOF256 TB8 D1)
  (BKL+GNL+A2 A1) ............. (1–3) 244–1

Logic block 246 provides the D9 ninth stage signal in response to the TB8, WHCH (from FIG. 14B), GORBCH (from FIG. 14B), TCIRBAR, and D9LOAD signals according to the logical equations:

D9=TCIRBAR D9 D9RST $\overline{\text{GORBCH}}$+D9
  TB8 WHCH+D9LOAD ............. (1–3) 246–1
D9=$\overline{(\text{D9})}$ ............. (4) 246–2
D9RST=$\overline{(\text{TB8 WHCH})}$ ............. (4) 246–3

EOF Gate and EOFFF Latch 248 provides the EOF and EOFFF signals in response to the $\overline{\text{EOD}}$ (from FIG. 14H), $\overline{\text{BOF}}$ (from FIG. 14B), WHL (from FIG. 14A), D9LOAD, BOFFF (from FIG. 14B), TRANS15 (from FIG. 14E), and D9 signals according to the logical equations:

EOF=WHL D9 D9LOAD TRANS15
  BOFFF ............. (1–3) 248–1
EOFFF=(EOFFFLD $\overline{\text{BOF}}$ $\overline{\text{EOD}}$+EOF) ............. (1–3) 248–1

FIG. 14C also includes BOFF and EOFF Latch logic 250 and OVHSHFT Latch logic 252. BOFF and EOFF Latch logic 250 provides the BOFF and EOFF signals in response to the BOF (from FIG. 14B), EOF, TB6, and SHFT7 signals according to the logical equations:

BOFF=BOF+FFRST BOFF ............. (1–3) 250–1
EOFF=EOF+FFRST EOFF ............. (1–3) 250–2
FFRST=$\overline{(\text{SHIFT7 TB6})}$ ............. (4) 250–3

OVHSHFT Latch logic 252 provides the OVHSHFT and SHFT7 signals in response to the BC8 (from FIG. 14D), BOFF, EOFF, TB5, and $\overline{\text{TB5}}$ signals according to the logical equations:

OVHSHFT=OVHSHFT TB5+$\overline{\text{TB5}}$ BC8
  (BOFF+EOFF) ............. (1–3) 252–1
SHIFT7=OVHSHFT ............. (1–3) 252–2

The operation of EOF Counter Means 92 will now be explained. As probe 64 scans through the data field, it will sense a green or black bar prior to sensing the longer white background portion of the tag. The GORBCH signal is set to logic "1," and the $\overline{\text{GORBCH}}$ signal becomes logic "0" for one character time whenever a green or black bar is first being scanned, as explained with respect to FIG. 14B. The occurrence of the logic "0" $\overline{\text{GORBCH}}$ signal clears EOF Counter 220 by blocking the recirculation from stage 236 to stage 222 (equation 222–1). After the $\overline{\text{GORBCH}}$ signal returns to logic "1," and assuming that a green or black bar is still being scanned (the $\overline{\text{WHCH}}$ signal therefore being logic "1" EOF Counter 220 increments its count by one every character time, according to the $\overline{\text{WHCH}}$ $\overline{\text{CNTL}}$ $\overline{\text{GORBCH}}$ D1+CNTL $\overline{\text{GORBCH}}$ $\overline{\text{D1}}$ term of equation 222–1. The CNTL and $\overline{\text{CNTL}}$ signals are provided from Add Count Logic 238, and, as seen from equation 238–1, the CNTL latch is set to logic "1" every TB1 time and is reset to logic "0" one bit time after the D1 signal becomes logic "0." EOF Counter 220 thus increments its count in the manner previously explained with respect to eight bit BOF counter 189 in FIG. 14B.

If EOF Counter 220 becomes full, the EOF256 signal from logic block 242 remains logic "1" for at least one character time (equation 242–1). The EOF256 latch is set by every TB8 timing pulse and reset by the first logic "0" D1 signal. If EOF Counter 220 is full, the D1 signal remains logic "1" for the next eight bit times, so the EOF256 signal remains logic "1" during this time (equation 242–1). During the next TB8 time, the logic "1" EOF256, D1, TB8, and $\overline{\text{GORBCH}}$ signals cause a one bit long D9LOAD logic "1" signal to be provided from logic block 244 during the following time TB1 (equation 244–1), assuming, of course, that the $\overline{\text{GORBCH}}$ signal has return to logic "0" and that one of the GNL or BKL signals is still logic "1." The logic "1" D9LOAD signal sets the D9 latch in logic block 246 (equation 346–1), causing the D9 signal to become logic "1."

After the D9 signal becomes logic "1," EOF Counter 220 begins counting up again, as explained above. If the probe 64 is traveling at a proper velocity, which may be, for instance, between two and sixty inches per second, it will see a white color before EOF Counter 220 counts out again. When probe 64 sees a white color, the WHCH signal becomes logic "1" for one character time, and the $\overline{\text{WHCH}}$ signal becomes logic "0" for one character time, as explained with respect to White Latch 222 in FIG. 14B. The logic "1" WHCH signal causes the contents of EOF Counter 220 to be inverted, as seen by the WHCH $\overline{\text{D1}}$ term of equation 222–1. The logic "1" WHCH signal also causes the D9 latch to change states; that is, it inverts the D9 signal (equations 246–1 and 246–3).

After the count of EOF Counter Means 92 is inverted, EOF Counter Means 220 begins counting up at one fourth of the previous rate. This is because the CNTL latch in Add Count Logic 238 is now set by the

WHL A1 A2 TB8 term of equation 238-1—that is, by every fourth TB8 timing pulse—so the CNTL signal becomes logic "1" one fourth as often as it had previously. After EOF Counter 220 counts out, the D9 signal is set to logic "1" as before, if it had not been logic "1" after the logic "1" WHCH signal inverted it. Thereafter, EOF counter 220 counts up again until it is full and causes another logic. "1" D9LOAD pulse signal to occur. Now the logic "1" D9 and D9LOAD signals cause the EOF signal to become logic "1" for one bit time (equation 248-1). This assumes that WHL and BOFFF are still logic "1" and fifteen color bars have been detected, thereby rendering the TRANS15 signal from FIG. 14E logic "1." The EOF signal then causes the EOFFF latch to be set, and the EOFF signal becomes logic "1" (equation 248-2). The EOFFF signal remains logic "1" until an $\overline{\text{EOD}}$ or a new $\overline{\text{BOF}}$ logic "0" signal is received.

BOFF and EOFF Latch 250 includes a BOFF latch and an EOFF latch. When the BOF signal becomes logic "1," the BOFF latch is set (equation 250-1). Similarly, a logic "1" EOF signal sets the EOFF latch (equation 250-2). Each of the BOFF and EOFF latches are reset when a logic "1" SHFT7 signal occurs at time TB6. A logic "1" SHFT7 signal is provided from OVHSHFT latch 252 one bit time after the OVHSHFT latch included therein is set (equation 252-2). The OVHSHFT latch is set upon the occurrence of either a BOFF or an EOFF logic "1" signal and a BC8 logic "1" signal at time TB5 (equation 252-1). If the BOFF logic "1" signal is used to set the OVHSHFT latch, the OVHSHFT signal becomes logic "1" after the seventh color bar is scanned, at which time the BC8 signal is logic "1." If the EOFF logic "1" signal is used to set the OVHSHFT latch, the BC8 signal will be logic "1" when the logic "1" EOFF signal occurs, so the OVSHFT latch is set one bit time thereafter. The OVSHFT latch is reset after the next TB5 time. Therefore, the OVSHFT signal is logic "1" from TB6 through TB5, and, since the SHFT7 signal is the OVHSHFT signal delayed one bit time (equation 252-2), it will be logic "1" from time TB7 through TB6.

Reference is now made to the Register Position Counter Means 98 portion of FIG. 14C. This counter includes a free-running eight bit recirculating Register Position Counter 254, which counts from one to seventeen and then is reset to a count of one by the RSTRPC and RGPC2 signals from Reset RPC to "1" logic 256. Register Position Counter 254 includes RGPCEG stage 258, RGPCSV stage 260, RGPCSX stage 262, RGPCFV stage 264, RGPCFO stage 266, RGPCTH stage 268, RGPCTW stage 270, and RGPSCN stage 272, most significant to least significant, which respectively provide the RGPCEG, RGPCSV, RGPCSX, RGPCFV, RGPCFO, RGPCTH, RGPCTW, and RGPSCN and $\overline{\text{RGPSCN}}$ signals. The incrementing of Register Position Counter 254 is controlled by setting the RPCC signal in Carry Latch 274.

In Register Position Counter 254, each of the stages 260 through 272 (even numbers) is responsive to the signal provided by the stage next higher in significance thereto. RGPCEG stage 258 is responsive to the RPCC, RGPSCN, and RSTRPC signals. In addition, stages 260 through 270 (even numbers) are responsive to the RSTRPC signal, and RGPSCN stage 272 is responsive to the RGPC2 signal. The logical equations for Register Position Counter 254 are:

RGPCEG = (RGPSCN+RPCC)
   RSTRPC RGPCEG#4 _____ (1-3) 258-1
RGPCEG #4 = $\overline{\text{(RGPSCN RPCC)}}$ _____ (4) 258-2
RGPCFO = RGPCFV RSTRPC _____ (1-3) 266-1
RGPCFV = RSTRPC RGPCSX _____ (1-3) 264-1
RGPCSV = RGPCEG RSTRPC _____ (1-3) 260-1
RGPCSX = RGPCSV RSTRPC _____ (1-3) 262-1
RGPCTH = RGPCFO RSTRPC _____ (1-3) 268-1
RGPCTW = RGPCTH RSTRPC _____ (1-3) 270-1
RGPCY = $\overline{\text{(RGPCTW)}}$ _____ (1) 272-1
RGPSCN = $\overline{\text{(RGPC2 RGPCY)}}$ _____ (3) 272-2
RGPSCN = $\overline{\text{(RGPSCN)}}$ _____ (4) 272-3

Carry Latch 274 is responsive to the RGPSCN and the TB8 signals and provides the RPCC signal according to the logical equation:

RPCC = TB8+RGPSCN RPCC _____ (1-3) 274-1

Reset RPC to "1" logic 256 is responsive to the TB1 through TB8 timing signals, the RGPSCN and $\overline{\text{RGPSCN}}$ signals, and the TCIR and INIT signals and provides the RSTRPC and RGPC2 signals according to the logical equations:

RGPC11 = $\overline{\text{(RSTRPC)}}$ _____ (1) 256-1
RGPC2 = $\overline{\text{(RGPC11)}}$ _____ (2) 256-2
RPCOFF = TB8+RGPSCN (TB1+
  TB5)+$\overline{\text{RGPSCN}}$ (TB2+TB3+TB4+
  TB6) RPCOFF _____ (1-3) 256-3
RSTRPC = ((RPCOFF+TCIR+
  INIT) TB7) _____ (1-2-3) 256-4

As previously mentioned, the TCIR signal is a normally logic "0" signal provided from the Utilization Device 89 and used for initial resetting purposes throughout the Reader 60 system. The INIT signal is a single bit time logic "1" signal which is generated by logic within Interface Means 88 in response to a command from Utilization Device 89 and is used to initialize various logic portions of the system after each reading occurs. The TCIR and INIT signals and their variations are discussed more fully in FIG. 14J.

The INIT or TCIR signals cause the RSTRPC signal to become logic "0" during time TB8 (equation 256-4). This signal causes each of the RGPCEG, RGPCSV, RGPCSX, RGPCFV, RGPCFO, RGPCTH, and RGPCTW signals to become logic "0" at the following TB1 time (equations 258-1, 260-1, 262-1, 264-1, 266-1, 268-1, and 270-1). One half-bit time after the RSTRPC signal becomes logic "0," the RGPC2 signal becomes logic "0" (equations 256-1 and 256-2) and sets the RGPCSN signal to logic "1" (equations 272-1, 272-2, and 272-3). Thus, Register Position Counter 254 is set to a count of one, during time TB1.

RPCC latch, included in Carry Latch 274, is set by each logic "1" signal causing the RPCC signal to become logic "1" at time TB1, and RPCC latch 274 is reset by the first logic "0" RGPSCN signal, causing the RPCC signal to become logic "0" one bit time thereafter (equation 274-1). Thus, at time TB1, just after the RSTRPC and RGPC2 signals have caused Register Position Counter 254 to return to a count of one, RPCC signal becomes logic "1." At that time, the RGPSCN signal is logic "1," so the RPCC latch is not reset. During time TB1, the RGPCEG#4 signal becomes logic "0," since both the RGPSCN and RPCC signals are logic "1" (equation 258-2), and this causes the RGPCEG signal to become logic "0" (equation 258-1). During time TB2, however, the RGPSCN signal is logic "0," so the RGPCEG#2 signal becomes logic "1," and the RPCC latch is reset, causing the RPCC signal to become logic "0" at time TB6. However, since the RPCC signal remains logic "1" at time TB2, the RGPCEG signal becomes logic "1." At the following TB1 time, a complete circular shift of the bits, the count in Register Position Counter 254 becomes two, or "0-0-0-0-0-0-1-0." At the next TB1 time, the count becomes three, and this procedure continues until the count in Register Position Counter 254 becomes seventeen; that is, "0-0-0-1-0-0-0-1."

Every TB8 logic "1" signal sets the RPCOFF latch in Reset RPC to "1" logic 256, causing the RPCOFF signal to become logic "1" during time TB1 (equation 256-3).

The RPCOFF latch is reset by a logic "0" RGPSCN signal at times TB1 or TB5 or by a logic "0" $\overline{\text{RGPSCN}}$ signal at times TB2, TB3, TB4, or TB6 (equation 256–3). Thus, unless the count in Register Position Counter 254 is seventeen, the RPCOFF signal becomes logic "0" by time TB7. If the RPCOFF signal remains logic "1" at time TB7, the RSTRPC signal from reset RPC to "1" logic 256 becomes logic "0" during time TB8 (equation 256–4). This signal and the logic "0" RGPC2 signal (equation 256–1 and 256–2), occurring one half-bit time later, reset Register Position Counter 254 to a count of one at the following TB1 time. Again, it increments up to seventeen and is reset to one, and so forth.

Register Position Counter Means 98 keeps track of the position of the eight bit characters in Main Buffer Means 74. To do this, it is necessary that one dummy bit be added to the front seven control data bits (one direction bit, four size code bits, and two field identification bits) read from the data field to make these bits an eight bit character, and that five dummy bits be added to the back eleven control bits (one direction bit, four size code bits, two MOD3 parity code bits, and four B.C.C. parity code bits) read from the data field to make them into two eight bit characters. FIGS. 15A and 15B shows the position of these dummy bits, with FIG. 15A showing their position for a forward direction scan, and FIG. 15B showing their position for a reverse scan. In both FIGS. 15A and 15B, the first bit read appears on the right, and the last bit read appears on the left. In the case of a forward direction scan of the data field shown in FIG. 15A, a logic "0" dummy bit 700 is added in the position before the first direction bit which was read, four logic "0" dummy bits 702, 704, 706, and 708 are added between the four bit B.C.C. code, and the two bit MOD3 code and one logic "0" dummy bit 710 are added after the last direction bit is read. In the case of a reverse direction scan shown in FIG. 15B, logic "0" dummy bits 712 and 714 are also added before and after the first and last direction bits are read respectively, and four logic "0" dummy bits 716, 718, 720, and 722 are added between the last four bit B.C.D. character and the four bit B.C.C. code.

In either case, the dummy bit 700 or 712 prior to the first read direction bit is inserted directly into the third stage of Input Buffer Means 72 when the BOF signal is provided, which occurs after two bits are detected. The remaining five dummy bits are inserted by providing the LDNB signal from logic 188 in FIG. 14A as logic "1" for five additional bit times. These five additional bit times of logic "1" LDNB signal are provided in accordance with the DUB4+TB8 EOFF $\overline{\text{SHFT7}}$ term of equation 188–2. The DUB4 signal is a logic "1" signal for four bit times and is provided at the proper time to cause the four dummy bits to be added; it is explained in further detail in the next paragraph. After the entire data field has been scanned, the EOF signal becomes logic "1," and the EOFF latch is set, a final LDNB logic "1" signal occurs at time TB8, causing the final dummy bit 710 or 714 to be added. If all of the data has been detected, this last LDNB logic "1" should make the BC8 signal logic "1" and set the OVHSHFT latch in OVHSHFT Latch logic 252 (equation 252–1). This causes a logic "1" SHFT7 signal one bit time later, which, in turn, resets the EOFF latch at time TB6 (equations 250–2 and 250–3), and causes the LDNB signal to return to logic "0."

The four bit long DUB4 logic "1" signal is provided by Dummy Bit Logic 275 in FIG. 14C in response to the BOFFF (from FIG. 14B), BOFF, DIRBIT (from FIG. 14E), LRIXCP (from FIG. 14F), OVHSHFT, BC4 (from FIG. 14D), TB4, and $\overline{\text{TB8}}$ signals according to the logical equations:

$\overline{\text{DIRBIT}} = \overline{\text{(DIRBIT)}}$ _____ (4) 275–1

DUB4=DUB4L TB4 BC4+DUB4 $\overline{\text{TB8}}$ \_\_ (1–3) 275–2

$\overline{\text{DUB4}} = \overline{\text{(DUB4)}}$ _____ (4) 275–3

DUB4L=$\overline{\text{DIRBIT}}$ TB4 LRIXCP BOFFF
   +OVHSHFT DIRBIT TB4 BOFF
   +DUB4L $\overline{\text{DUB4}}$ _____ (1–3) 275–4

The DIRBIT signal reflects the scanning direction and is a logic "0" for a forward direction scan and logic "1" for a reverse direction scan; the BC4 signal is logic "1" when BC8 Counter Means 96 registers a count of four; and the LRISCP signal becomes logic "1" when the counts in the Limit Register Means 102 and the Index Register Means 100 are equal.

In the case of a forward direction scan—that is, with the $\overline{\text{DIRBIT}}$ signal being logic "1"—the size code is applied to and stored in the Limit Register Means 102. After all of the data bits of the front control data and the data portions of the data field have been read, the count in Index Register Means 100 will equal the count in Limit Register Means 102. At this time, the LRIXCP signal becomes logic "1" and remains logic "1" until a new BC8 pulse increments Index Register Means 100. During this time, the BOFFF signal is still logic "1," and, at the next TB4 time, the DUB4L in Dummy Bit Logic 275 is set according to the $\overline{\text{DIRBIT}}$ TB4 LRIXCP BOFFF of equation 275–4. Then, four more color bars are scanned, and the four bit B.C.C. code is detected. This causes the BC4 signal from BC8 Counter Means 96 to become logic "1" during the time the fourth B.C.C. bar is scanned. At the next TB4 time, the DUB4 latch is set according to the DUB4L TB4 BC4 term of equation 275–2. The DUB4 latch is reset after time TB8 by the DUB4 $\overline{\text{TB8}}$ term of equation 275–2, and this resets the DUB4L latch one bit time later; thus the DUB4 signal is logic "1" from TB5 through TB8 times. During the time TB6 through TB1, the LDNB signal then becomes logic "1" (equation 188–2) and causes four logic "0" dummy DATAIN Bits 702, 704, 706, and 708 to be provided and also increments BC8 Counter Means 96 to a full count, so the BC8 signal becomes logic "1." The logic "1" BC8 signal increments Index Register Means 100, causing the LRIXCP to become logic "0," thereby disabling the DUB4L latch.

In the case of a reverse direction scan—that is, with the DIRBIT signal being logic "1"—the BOF signal sets the BOFF latch (equation 250–1) and this enables the OVHSHFT latch. When the BC8 Counter Means 96 becomes full—that is, when the BC8 signal is logic "1" after the first dummy bit and first seven back control bits are detected—the OVHSHFT latch is set, and the OVHSHFT signal becomes logic "1" (equation 262–1). This, in turn, causes the DUB4L latch to be set after the next TB4 time according to the OVHSHFT DIRBIT TB4 BOFF term of equation 275–4. Then, four more color bars are scanned, and the BC4 signal becomes logic "1." After the next TB4 time, the DUB4 latch is set, and the DUB4 signal becomes logic "1." This resets the DUB4L latch. The DUB4 latch is reset after the next TB8 time, and the four bit DUB4 logic "1" signal causes four logic "0" DATAIN dummy bits 716, 718, 720, and 722 to be provided. The OVHSHFT latch is reset after the next TB5 time, and this disables the DUB4L latch, so no further dummy bits are caused to occur by this logic.

Reference is now made to FIG. 14D, where Input Buffer Means 72 and BC8 Counter Means 96 are shown. After the data is detected and provided as the DATAIN signal, it is stored in Input Buffer Means 72. As soon as eight bits are stored in Input Buffer Means 72, an eight bit data character is transferred to Main Buffer Means 74. BC8 Counter Means 96 keeps track of the number of data bits stored in Input Buffer Means 72 by counting from zero through eight and then resetting back to zero. When BC8 Counter Means 96 reaches a count of eight, it enables logic (hereinafter described) to allow the eight bits stored by Input Buffer Means 72 to be transferred to Main Buffer Means 74.

Input Buffer Means 72 includes Input Buffer 276, Input Buffer Hold or Shift Control logic 278, Input Buffer Toggle logic 280, Set IBS Toggle logic 282, and IBS Toggle logic 284. Input Buffer 276 is so arranged that, when the buffer is full, the three bits detected first are stored in the common portion 286 and the five bits detected last are stored in either IBA portion 288 or IBB portion 290. This arrangement allows five new bits to be detected and stored in Input Buffer 72 before the previous eight bits must have been shifted to Main Buffer Means 74. This provision is necessary because of the delay encountered between the time Input Buffer 276 becomes full and the time the eight bits can be shifted to Main Buffer Means 74.

IBA Portion 288 includes IBAB1 stage 292, IBAB2 stage 294, IBAB3 stage 296, IBAB4 stage 298, and IBAB5 stage 300, which respectively provide the IBAB1, IBAB2, IBAB3, IBAB4, and IBAB5 signals. IBB Portion 290 includes IBBB1 stage 302, IBBB2 stage 304, IBBB3 stage 306, IBBB4 stage 308, and IBBB5 stage 310, which respectively provide the IBBB1, IBBB2, IBBB3, IBBB4, and IBBB5 signals. Common Portion 286 includes IBB6 stage 312, IBB7 stage 314, and IBB8 stage 316, which respectively provide the IBB6, IBB7, and IBB8 signals. Each of the stages 292, 294, 296, 298, 300, 312, 314, and 316 is responsive to the IBAHLD and IBASHFT holding and shifting control signals provided from Input Buffer Hold or Shift Control logic 278. Similarly, each of the stages 302 to 316 (even numbers) is responsive to the IBBHLD and IBBSHFT holding and shifting control signals provided from Input Buffer Hold or Shift Control logic 278. In addition, stages 292 and 302 are responsive to the IBB8 signal from IBB8 stage 316, the DATAIN signal from FIG. 14a, and the IBA and IBB toggle signals from Input Buffer Toggle logic 280. In addition, each of the stages 294, 296, 298, and 300 is respectively responsive to the IBAB1, IBAB2, IBAB3, and IBAB4 signals, and each of the stages 304, 306, 308, and 310 is respectively responsive to the IBBB1, IBBB2, IBBB3, and IBBB4 signals. In addition, stages 296 and 306 are responsive to the BOF signal from FIG. 14B. Each of the stages 312, 314, and 316 is responsive to the TAD and TBD toggle signals from IBS Toggle logic 284. Stage 312 also is responsive to the IBAB5 and IBBB5 signals, and the stages 314 and 316 are respectively responsive to the IBB6 and IBB7 signals. The logical equations for Input Buffer 276 are:

IBAB1 = IBAB1 IBAHLD + IBB8 IBASHFT
  IBB + IBASHFT DATAIN IBA _____ (1-3) 292-1
IBAB2 = IBAHLD IBAB2 + IBAB1
  IBASHFT _____ (1-3) 294-1
IBAB3 = IBAB3 IBAHLD + IBASHFT
  IBAB2 $\overline{BOF}$ _____ (1-3) 290-1
IBAB4 = IBAB3 IBASHFT + IBAHLD
  IBAB4 _____ (1-3) 298-1
IBAB5 = IBAB5 IBAHLD + IBASHFT
  IBAB4 _____ (1-3) 300-1
IBB6 = (IBAHLD IBB6 + IBAB5 IBASHFT)
  TAD + (IBB6 IBBHLD + IBBB5
  IBBSHFT) TBD _____ (1-3) 312-1
IBB7 = (IBAHLD IBB7 + IBASHFT IBB6)
  TAD + (IBB7 IBBHLD + IBB6 IBBSHFT)
  TBD _____ (1-3) 314-1
IBB8 = ((IBB8 IBAHLD + IBASHFT
  IBB7) TAD + (IBB8 IBBHLD + IBB7
  IBBSHFT) TBD _____ (1-3) 316-1
IBBB1 = IBBB1 IBBHLD + (DATAIN IBB
  + IBB8 IBA) IBBSHFT _____ (1-3) 302-1
IBBB2 = IBBB2 INNHLD + IBBB1
  IBBSHFT _____ (1-3) 304-1
IBBB3 = IBBB3 IBBHLD + IBBB2
  IBBSHFT $\overline{BOF}$ _____ (1-3) 306-1
IBBB4 = IBBB4 IBBHLD + IBBB3
  IBBSHFT _____ (1-3) 308-1

IBBB5 = IBBB5 IBBHLD + IBBB4
  IBBSHFT _____ (1-3) 310-1

Input Buffer Hold or Shift Control logic 278 provides the IBAHLD, IBBHLD, IBASHFT, and IBBSHFT signals in response to the IBA, IBB, RGIXCP (from FIG. 14F), ENSR3 (from FIG. 14G), OVHSHFT (from FIG. 14C), and LDNB (from FIG. 14A) signals according to the logical equations:

IBAHLD = $\overline{(IBASHFT2)}$ _____ (3) 278-1
IBASHFT1 = $\overline{(RGIXCP\ ENSR3\ IBB}$
  $\overline{+ OVSHFT\ IBB + IBA\ LDNB)}$ ____ (1) 278-2
IBASHFT2 = $\overline{(IBASHFT1)}$ _____ (2) 278-3
IBASHFT = $\overline{(IBASHFT1)}$ _____ (3) 278-4
IBBHLD2 = $\overline{(IBBSHFT1)}$ _____ (2) 278-5
IBBHLD = $\overline{(IBBHLD2)}$ _____ (3) 278-6
IBBSHFT1 = $\overline{(RGIXCP\ ENSR3\ IBA + IBB}$
  $\overline{LDNB + IBA\ OVHSHFT)}$ _____ (1) 278-7
IBBSHFT = $\overline{(IBBSHFT1)}$ _____ (3) 278-8

Input Buffer Toggle Logic 280 provides the IBA and IBB toggle signals in response to the BOFFF (from FIG. 14B), EOFFF (from FIG. 14C), BC8, and TB4 signals according to the logical equations:

IBA = IBA $\overline{IBTGL}$ + IBB IBTGL _____ (1-3) 280-1
IBB = $\overline{(IBA)}$ _____ (4) 280-2
IBTGL = BC8 TB4 (BOFFFF + EOFFF) _ (1-3) 280-3
$\overline{IBTGL}$ = $\overline{(IBTGL)}$ _____ (4) 280-4

Set IBS Toggle logic 282 provides the TBTGL signal in response to the DUB4 (from FIG. 14C), TRANSTB7 (from FIG. 14A), BC5, BC6, and TB6 signals according to the logical equations:

BC6 = $\overline{(BC6)}$ _____ (4) 282-1
TBTGL = TRANSTB7 BC5 $\overline{BC6}$ + TB6
  DUB4 _____ (1-3) 282-2

IBS Toggle logic 284 provides the TAD and TBD signals in response to the IBA, TBTGL, and BOF (from FIG. 14B) according to the logical equations:

BOF = $\overline{(BOF)}$ _____ (4) 284-1
TAD = $\overline{(TBD)}$ _____ (4) 284-2
TBD = TAD TBTGL + IBA BOF + TBD
  $\overline{TBTGL\ BOF}$ _____ (1-3) 284-3
TBTGL = $\overline{(TBTGL)}$ _____ (4) 284-4

BC8 Counter Means 96 includes BC8 Counter 318, Increment BC8 Counter logic 320, and Clear BC8 Counter logic 322. BC8 Counter 318 includes BC1 stage 324, BC2 stage 326, BC3 stage 328, BC4 stage 330, BC5 stage 322, BC6 stage 334, BC7 stage 336, and BC8 stage 338, which respectively provide the BC1, BC2, BC3, BC4, BC5, BC6, BC7, and BC8, BC8P and BC8TB8 signals. Each of the stages 324 to 338 (even numbers) is responsive to the HLDBC and SHBC hold and shift signals provided from Increment BC8 Counter logic 320. Stages 324, 326, and 328 are responsive to the CLEAR3 signal, and stages 330, 332, 334, 336, and 338 are responsive to the CLEAR5 signal. In addition, each of the stages 326 to 338 (even numbers) is responsive to the signal from the preceding stage. BC8 stage 338 is also responsive to the BOFFF signal from FIG. 14B and the TB6 and TB8 timing signals. The logical equations for BC8 Counter 318 are:

BC1 = SHBC CLEAR3 + HLDBC BC1 ___ (1-3) 324-1
BC2 = SHBC CLEAR3 BC1 + HLDBC
  BC2 _____ (1-3) 326-1
BC3 = SHBC CLEAR3 BC2 + HLDBC
  BC3 _____ (1-3) 328-1
BC4 = SHBC CLEAR5 BC3 + BC4
  HLDBC _____ (1-3) 330-1
BC5 = SHBC BC4 CLEAR + HLDBC
  BC5 _____ (1-3) 332-1

BC6=SHBC CLEAR5 BC5+HLDBC
BC6 _____ (1–3) 334–1
BC7=SHBC CLEAR5 BC6+HLDBC
BC7 _____ (1–3) 336–1
BC8=SHBC CLEAR5 BC7+BC8
HLDBC _____ (1–3) 338–1
BC8P=BC8 BOFFF TB6 _____ (1–3) 338–2
BC8TB8=BC8 TB8 _____ (1–3) 338–3

Clear BC8 Counter logic 322 provides the CLEAR3 and CLEAR5 signals in response to the BC8TB3 signal and the BOF signal from FIG. 14B according to the logical equations:

CLEAR3=$\overline{BC8TB8}$ _____ (1–3) 322–1
CLEAR5=$\overline{(BC8TB8+BOF)}$ _____ (1–2–3) 322–2
$\overline{BC8TB8}$=$\overline{(BC8TB8)}$ _____ (4) 322–3

Increment BC8 Counter logic 320 provides the HLDBC and SHBC signals in response to the BOF (from FIG. 14B), LDNB (from FIG. 14A), and BC8TB8 signals according to the logical equations:

HLDBC=$\overline{(HLDBC\#1)}$ _____ (3) 320–1
HLDBC#1=$\overline{(SHBC\#1)}$ _____ (2) 320–2
SHBC=$\overline{(SHBC\#1)}$ _____ (3) 320–3
SHBC#1=$\overline{(BC8TB8+BOF+LDNB)}$ _____ (1) 320–4

The operation of BC8 Counter Means 96 is now described assuming that the HLDBC, CLEAR3, and CLEAR5 signals are initially logic "1" and the SHBC signal is initially logic "0." One bit time after the LDNB signal becomes logic "1" during time TB1, the SHBC signal becomes logic "1," and the HLDBC signal becomes logic "0" (equations 320–1 through 320–4). If BC8 Counter 318 is clear—that is, if each of the BC1 through BC8 signals is logic "0"—the logic "1" SHBC and logic "0" HLDBC signals set the BC1 latch and cause a logic "1" BC1 signal to be provided one bit time later during time TB3 (equation 324–1). The next LDNB logic "1" signal again causes a logic "1" SHBC signal. Now, since the BC1 signal is logic "1," the BC2 latch is set, and the BC2 signal becomes logic "1" at time TB3 (equation 326–1). This same process continues until the BC8 latch is set and the BC8 signal becomes logic "1" during time TB3 (equation 338–1). Four bit times later, and as long as the BOFFF signal is logic "1," the BC8P signal becomes logic "1" during time TB7 (equation 338–2). This signal is used to set the ADIDR latch, which in turn increments the Index Register Means 100, as will be explained hereinafter.

Two bit times later, during TB1 time, the BC8TB8 signal becomes logic "1" for one bit time (equation 338–3). This signal causes the SHBC signal to become logic "1" and the HLDBC signal to become logic "0" during time TB2 (equations 320–1 through 320–4) and also causes the CLEAR3 and CLEAR5 signals from Clear BC8 Counter logic to become logic "0" during time TB2 (equations 322–1, 322–2, and 322–3). Under these conditions, each of the BC1 through BC8 latches is reset (equations 324–1, 326–1, 328–1, 330–1, 332–1, 334–1, 336–1, and 338–1), and BC8 Counter 318 is cleared.

The logic "1" BOF signal, which is applied to Increment BC8 Counter logic 320 and Clear BC8 Counter logic 322, is used to insert the first dummy bit into Input Buffer Means 72. BC8 Counter 318 must be incremented when each dummy bit is placed in Input Buffer Means 72. From equation 320–4, it is seen that, in addition to the LDNB and BC8TB8 signals, the BOF signal also causes the SHBC signal to become logic "1." The BOF signal occurs after the BC2 signal becomes logic "1," so it causes the BC3 signal to become logic "1."

The BOF signal is also applied to the Clear BC8 Counter logic 322 to cause the CLEAR5 signal to become logic "0" (equation 322–2), and this causes the BC4 through BC8 signals to become logic "0" if not already logic "0." Thus, after the BOF signal becomes logic "1," BC8 Counter 318 has a count of three, indicating that Input Buffer Means $n$ is storing three data bits (one of which is a logic "0" dummy bit).

In Input Buffer 276, a first eight bits of data are applied through IBA portion 288, and the next eight bits of data are applied through IBB portion 290, and so forth. Input Buffer Toggle logic 280 controls the selection of the IBA portion 288 or the IBB portion 290 by providing one of the IBA or IBB signals as logic "1." After the BOFFF signal becomes logic "1" (it had been preventing toggling due to background colors, or noise, when logic "0"), each BC8 logic "1" signal causes the IBA and IBB signals to change values during time TB6. This, in turn, causes the next eight DATAIN signal data bits to be applied through the other portion of Input Buffer 276.

If, at the beginning of the tag scan, the IBA signal is logic "1," then the first logic "1" LDNB signal occurring during time TB1 causes a logic "1" IBASHFT signal and a logic "0" IBAHLD signal during time TB2 (equations 278–1 through 278–4) according to the IBA LDNB term of equation 278–2. During this time, the value of the DATAIN signal represents the value of the first data bit, and this value is stored in IBAB1 stage 292. For instance, if the DATAIN signal is logic "1," the IBAB1 latch is set according to the IBASHFT DATAIN IBA term of equation 292–1, and IBAB1 signal becomes logic "1." On the other hand, if the DATAIN signal was logic "0," the IBAB1 latch is not set, and the IBAB1 signal remains logic "0." After time TB2, the IBAHLD signal becomes logic "1," and the IBAB1 IBAHLD term of equation 292–1 keeps the IBAB1 signal as it was during the TB2 time.

When the second LDNB signal occurs, and the IBASHFT again becomes logic "1," the IBAB1 value is shifted to IBAB2 stage 294 according to the IBAB1 IBASHFT term of equation 294–1, and the then-occurring DATAIN signal value is shifted into IBAB1 stage 292, as explained above. During the time that the IBASHFT signal is logic "1" due to the second LDNB logic "1" signal, $\overline{BOF}$ signal becomes logic "0." This causes the first logic "0" dummy bit to be inserted into the IBAB3 stage 296 according to the IBASHFT IBAB2 $\overline{BOF}$ term of equation 296–1.

The logic "1" BOF signal also sets the TBD signal from IBS Toggle logic 284 to logic "1" when the IBA signal is logic "1" (or the TAD signal to logic "1" when the IBB signal is logic "1") (equations 284–2 through 284–4). After the fifth DATAIN data bit is shifted into Input Buffer 276, and the BC5 signal from BC8 Counter 318 becomes logic "1," the TBTGL signal from Set IBS Tobble logic 382 becomes logic "1" during time TB1 according to the TRANSTB7 BC5 $\overline{BC6}$ term of equation 282–2. The logic "1" TBTGL signal causes the IBS Toggle logic 284 signal to change states; that is, in the case the IBA signal is logic "1," the TAD signal becomes logic "1" (equations 284–2 and 284–3). The logic "1" TAD signal enables the stored data bits to be shifted from the IBA portion 288 ot the common portion 286 of Input Buffer 276. Upon the next LDNB logic "1" signal, the data bit stored in IBAB5 stage 300 is transferred to IBB6 stage 312 according to the IBAB5 IBASHFT TAD term of equation 312–1.

After the eighth data bit is shifted into Input Buffer 276 and the BC8 signal becomes logic "1" at time TB3, the TBTGL signal becomes logic "1" during the following TB5 time (equation 280–3). This causes the IBB signal from Input Buffer Toggle logic 280 to become logic "1" and the IBA signal to become logic "0" (equations 280–1 and 280–2).

When Input Buffer 276 becomes full for the first time, the logic "1" BC8 signal enables the OVHSHFT latch, and the OVHSHFT signal becomes logic "1" at TB6 time and remains logic "1" for eight bit times. This allows the eight control data bits then stored in Input Buffer 276 to be shifted into Output Buffer Means 86. The OVHSHFT and IBB logic "1" signals keep the IBASHFT signal logic "1" for eight bit times according to the OVHSHFT IBB term of equation 278–'2, and this causes the data in Input Buffer 276 to circulate one time according to the IBBB8 IBASHFT IBB term of equation 292–1. Thus, the IBB8 signal will be the serial data stored in Input Buffer 276, and this is applied to Output Buffer Means 86. When the OVHSHFT signal returns to logic "0," it resets the BOFF latch and thereby prevents OVHSHFT from becoming logic "1" until a logic "1" EOFF signal is provided.

As will be explained in detail hereinafter, the logic "1" BC8P signal from BC8 Counter 318 sets the ADIDR signal to logic "1" for eight bit times. The ADIDR signal increments by one the count in Index Register Means 100 (from zero to one). One bit time later, the ADIDRD signal becomes logic "1," and this sets the ENSR3 latch so that the ENSR3 signal becomes logic "1." When the count in the Register Position Counter Means 98 equals the count in the Index Register Means 100, a logic "1" RGISCP signal is provided from TB1 through TB8. The logic "1" RGIXCP, IBB, and ENSR3 signals cause the IBASHFT signal to become logic "1" for eight bit times (equations 278–2 and 278–4). This, in turn, causes the bits stored in Input Buffer 276 to circulate one time and the IBB8 signal to reflect a serial version of the stored data bits. These bits are then shifted into the Main Buffer Means 74.

During this time, new DATAIN data bits will be being provided. Since the IBB signal is now logic "1," these bits will be shifted into the IBB portion 290 of Input Buffer 276. The fifth such data bit causes the TBTGL signal to become logic "1" (equation 282–2), and this sets the TBD latch so that the TBD signal becomes logic "1." Now the bits in IBB portion 290 are shifted into Common Portion 286. When the eighth bit is shifted into Input Buffer 276, the TBTGL signal becomes logic "1" (equation 280–1), thereby causing the IBA latch to be set so that the IBA signal becomes logic "1" and the IBB signal becomes logic "0" (equations 280–1 and 280–2). When the RGIXCP and ENSR3 signals become logic "1" again, the stored bits are circulated one time, and the data is shifted into Main Buffer Means 74. This process then continues until all of the data bits have been read.

Reference is now made to FIG. 14E, where the Gross Time Out (GTO) Counter Means 104, Direction Bit Logic and Field I.D. Logic 324 and the Size Code Logic 326 are shown. Direction Bit Logic and Field I.D. Logic 324 provides the scanning direction signals DIRBIT and $\overline{\text{DIRBIT}}$ and the field identification (I.D.) signals IDLSB, $\overline{\text{IDLSB}}$, IDMSB, and IDMSBAR in response to the IBB8 signal (from FIG. 14D), BOFF (from FIG. 14C), EOFF (from FIG. 14C), SHFT7 (from FIG. 14C), TB4, TB5, TB6, TB7, and RG10KBAR signals according to the logical equations:

DIRBIT=$\overline{\text{LDDB}}$ DIRBIT+LDDB IBB8 _ (1–3) 324–1
DIRBIT=$\overline{\text{(DIRBIT)}}$ _____ (4) 324–2
$\overline{\text{IBB8}}$=$\overline{\text{(IBB8)}}$ _____ (4) 324–3
IDLSB=IDLSB (DIRBIT $\overline{\text{IBB8}}$
  +$\overline{\text{DIRBIT}}$ IBB8)+LDSLB LDLSB _ (1–3) 324–4
$\overline{\text{IDLSB}}$=$\overline{\text{(IDLSB)}}$ _____ (4) 324–5
IDMSB=(IDMSB#1) _____ (3) 324–6
IDMSBAR=(IDMSB#2) _____ (3) 324–7
IDMSB#1=(IDMSB $\overline{\text{LDMSB}}$+(DIRBIT
  $\overline{\text{IBB8}}$+$\overline{\text{DIRBIT}}$ IBB8) $\overline{\text{LDMSB}}$) ___ (1) 324–8
IDMSB#2=(IDMSB#1) _____ (2) 324–9
LLDB=RG10KBAR BOFF TB7
  SHFT7 _____ (1–3) 324–10
$\overline{\text{LLDB}}$=$\overline{\text{(LDDB)}}$ _____ (4) 324–11
LDLSB=RG10KBAR ($\overline{\text{DIRBIT}}$ BOFF
  TB4+DIRBIT EOFF TB7) SHFT7 __ (1–3) 324–12

$\overline{\text{LDLSB}}$=$\overline{\text{(LDLSB)}}$ _____ (4) 324–13
LDMSB=RG10KBAR ($\overline{\text{DIRBIT}}$ EOFF
  TB6 OVHSHFT+$\overline{\text{DIRBIT}}$ BOFF
  SHFT7 TB5) _____ (1–3) 324–14
$\overline{\text{LDMSB}}$=$\overline{\text{(LDMSB)}}$ _____ (4) 324–15

The first DATAIN bit detected will be the direction bit, and, in the event of a forward direction scan, it will be logic "0" (white to green transition is logic "0" as seen from FIG. 4A), or, in the event of a reverse direction scan, it will be logic "1" (white to black transition is logic "1" as seen from FIG. 4B). Since the leading bit stored in Input Buffer 276 is a dummy bit, the first direction bit detected will appear in the IBB7 stage at the time the first DC8 logic "1" signal occurs. When the OVHSHFT signal becomes logic "1" from times TB6 through the following TB5 and causes the IBASHFT signal to become logic "1" (assuming that IBA portion 288 was used first), from times TB7 through the following TB6, the control data bits stored in Input Buffer 276 are circulated one time. Thus, at time TB8, the direction bit will be in IBB8 stage 316.

During the time the IBASHFT signal is logic "1," the SHFT7 and BOFF signals are also logic "1." Further, the RG10KBAR signal remains logic "1" until the size code check in Size Code Logic 326 is performed for the first field after the EOF signal becomes logic "1." Thus, during time TB8, the LDDB signal becomes logic "1" (equation 324–10), and the $\overline{\text{LDDB}}$ signal becomes logic "0" (equation 324–11). The $\overline{\text{LDDB}}$ logic "0" resets the DIRBIT latch, if it is not already reset, according to the $\overline{\text{LDDB}}$ DIRBIT term of equation 324–1. If the IBB8 signal is logic "1," indicating a reverse direction scan, the DIRBIT latch is then set, and the DIRBIT signal becomes logic "1" according to the LDDB IBB8 term of equation 324–1, and, if the IBB8 signal is logic "0," indicating a forward direction scan, the DIRBIT latch remains reset, and the DIRBIT signal remains logic "0." Thus, when the DIRBIT signal is logic "1" and the $\overline{\text{DIRBIT}}$ signal is logic "0," a reverse direction scan is occurring, and, when the DIRBIT signal is logic "0" and the $\overline{\text{DIRBIT}}$ signal is logic "1," a forward direction scan is occurring.

If the tag being scanned is a double field tag, the RG10KBAR signal becomes logic "0" after the first field is scanned, so the LDDB signal cannot become logic "1" when the logic "1" BOFF signal for the second field occurs. Thus, the DIRBIT and $\overline{\text{DIRBIT}}$ signals remain unchanged for the second field.

In the event of a forward direction scan, the two bit field identification (I.D.) code will be stored in the IBAB1 and IBAB2 stages 292 and 294 of Input Buffer 276 (assuming that the IBA portion 288 is used initially) at the time the BOFF signal becomes logic "1." Thus, when the OVHSHFT signal becomes logic "1" and causes the first circulation of the Input Buffer 276 bits, the two I.D. code bits will be in IBB8 stage 316 at times TB5 and TB6, with the least significant bit thereof being in IBB8 stage 316 during time TB5 and the most significant bit thereof being in IBB8 stage 316 during time TB6.

In the event of a reverse direction scan, the complement of the two bit field identification code will be stored in the IBB7 and IBB8 stages 314 and 316 of Input Buffer 276 at the time the EOFF signal becomes logic "1." When the OVHSHFT logic "1" signal causes the bits to circulate through Input Buffer 276, the two I.D. code bits will appear as the complement of the IBB8 signal during times TB7 and TB8, with the least significant bit thereof appearing during time TB8 and the most significant bit thereof appearing during time TB7.

As the data stored in Input Buffer 276 circulates as a result of the OVHSHFT signal, the LDLSB signal becomes a logic "1" for the one bit time when the IBB8 signal represents the least significant bit of the I.D. code (equation 324–12). In the case of a forward direction scan, this occurs when the term DIRBIT BOFF TB4 SHFT7 of equation 324–12 is logic "1," and, in the case of a reverse direction scan, this occurs when the DIRBIT EOFF TB7 SHFT7 term of equation 324–12 is logic "1." If a double field tag is being scanned, only the I.D. code of the first scanned field is necessary; hence, the RG10KBAR term of equation 324–12 blocks the LDLSB signal from becoming logic "1" when the second scanned field is scanned. When the LDLSB signal becomes logic "1," the $\overline{\text{LDLSB}}$ signal becomes logic "0" (equation 324–13), and this resets the IDLSB latch, as seen from the IDLSB $\overline{\text{LDLSB}}$ term of equation 324–4.

It should be recalled that the I.D. code for a single field tag is "0–0" (most significant bit first); for the first field of a double tag the I.D. code is "0–1" (most significant bit first); and for the second field of a double field tag, the I.D. code is "1–1" (most significant bit first).

The logic "1" LDLSB signal enables the IDLSB latch to be set or not by the valve of the IBB8 signal then occurring (equation 324–7). In the event of a forward direction scan, the DIRBIT IBB8 term of equation 324–4 determines whether the IDLSB latch is set and, hence, whether the IDLSB signal will be logic "1" or logic "0"; and, in the event of a reverse direction scan, the $\overline{\text{DIRBIT}}$ $\overline{\text{IBB8}}$ term of equation 324–4 determines whether the IDLSB latch is set and, hence, whether the IDLSB signal will be logic "1" or logic "0." When the IDLSB signal is logic "1," the least significant I.D. code bit is a logic "1," thereby indicating that a double field tag is being scanned, and, when the IDLSB signal is logic "0," the least significant I.D. code bit is a logic "0," indicating that a single field tag is being scanned.

The most significant bit of the I.D. code is detected in the same manner as the least significant bit was, according to the equations 324–6 through 324–10, and 324–14 and 324–15. When the IDMSB signal is logic "1," the most significant bit of the I.D. code is logic "1," and therefore the second field of a double field tag is scanned first; and, when the IDMSB signal is logic "0," the most significant bit of the I.D. code is logic "0," and therefore the first field of a double field tag is scanned first.

The logic for the second of the two size code checks is shown in Size Code Logic 326 and includes N Size Code Compare Latch 328, Field "1" Latch 330, and Field "2" Latch 332. As previously mentioned with respect to Size Code Check 112 in FIG. 5, and hereinafter explained in detail in FIG. 14H, the first size code check is comparing the detected front and back size codes. If this comparison proves valid, the NCOMP signal becomes logic "1" during time TB6. This causes a count of one to be added to the count already in Index Register Counter Means 100 and a count of two to be added to the count already in Limit Register Counter Means 102. If all of the bits on the tag have been detected, the counts in these two counters will be the same and equal to the total number of characters in Main Buffer Means 74.

The N Size Compare Latch 328 provides the NSCCK signal in response to the $\overline{\text{INIT}}$, BOF (from FIG. 14B), TCIRBAR, NCOMP (from FIG. 14H), and $\overline{\text{EOD}}$ (from FIG. 14H) signals according to the logical equation:

NSCCK=BOF $\overline{\text{INIT}}$ $\overline{\text{EOD}}$ TCIRBAR
  NSCCK+NCOMP _____ (1–3) 328–1

The NSCCK signal is set to logic "1" by the NCOMP signal becoming logic "1." It is normally reset by the $\overline{\text{EOD}}$ signal becoming logic "0," but also it may be reset by the BOF, $\overline{\text{INIT}}$, and TCIRBAR signals becoming logic "0."

The Field "1" Latch 330 provides the RG10K and RG10KBAR signals in response to the LDM1, $\overline{\text{INIT}}$, EOFFF (from FIG. 14C), TCIRBAR, RGIXCP (from FIG. 14F), LRIXCP (from FIG. 14F), TB8, and NSCCK signals according to the logical equations:

RG10K=$\overline{(\text{RG10K}\#1)}$ _____ (3) 330–1
RG10KBAR=$\overline{(\text{RG10K}\#2)}$ _____ (3) 330–2
RG10#1=$\overline{(\text{NSCCK LRIXCP LDM1}}$
  $\overline{\text{EOFFF RGISCP TB8+RG10K}}$
  $\overline{\text{INIT}}$ TCIRBAR) _____ (1) 330–3
RG10K#2=$\overline{(\text{RG10K}\#1)}$ _____ (2) 330–4

The LDM1 signal is logic "1" whenever a single field tag or the first field of a double field tag is scanned. With the count in Limit Register Counter Means 102 being equal to the count in Index Register Counter Means 100, the LRIXCP signal will be logic "1." When the count in Register Position Counter Means 98 reaches this count, the RGIXCP signal will become logic "1" for one character time between TB1 and TB8. During this time, the EOFFF signal is also logic "1." Thus, the RG10K latch is set because the

NSCCK LRISCP LMD1 EOFFF RGIXCP TB8 term of equation 330–3 is logic "1" during TB8 time, and thus the RG10K signal becomes logic "1," and the RG10KBAR signal becomes logic "0" at the following time TB1. This indicates a good size code check; that is, the proper number of bits have been read from the tag. If an improper number of bits had been read from the tag, the count in Index Register Counter Means 100 would not equal the count in Limit Register Counter Means 102, and the LRIXCP signal would be logic "0." Thus, the RG10K latch would not be set. The RG10K latch is reset by either the $\overline{\text{INIT}}$ or TCIRBAR signals becoming logic "0."

The Field "2" Latch 332 provides the RG20K and $\overline{\text{RG20K}}$ signals in response to the LDM2, $\overline{\text{INIT}}$, EOFFF (from FIG. 14C), TCIRBAR, RGIXCP (from FIG. 14F), LRIXCP (from FIG. 14F), TB8, and NSCCK signals according to the logical equations:

RG20K=NSCCK LRIXCP EOFFF LDM2
  RGISCP TB8+$\overline{\text{INIT}}$ TCIRBAR
  RG20K _____ (1–3) 332–1
$\overline{\text{RG20K}}$=$\overline{(\text{RG20K})}$ _____ (4) 332–2

The LDM2 signal is logic "1" wherever the second field of a double field tag is scanned. The Field "2" Latch 332 operates exactly like the Field "1" Latch 330 whenever the LDM2 signal is logic "1" rather than the LDM1 signal being logic "1." The logic "1" RG20K signal indicates that the second size code check is valid for the second scanned field.

The LDM1 and LDM2 signals applied to Field "1" Latch 330 and Field "2" Latch 332 respectively are provided from Main Buffer selection logic 334, which, in turn is controlled by Set LDM Logic 336. Main Buffer selection logic 334 is responsive to the TBM and INIT signals according to the logical equations:

LDM1=$\overline{(\text{LOAD1})}$ _____ (3) 334–1
LDM2=$\overline{(\text{LOAD2})}$ _____ (3) 334–2
LOAD1=(LDM1 $\overline{\text{TMB}}$+INIT) _____ (1) 334–3
LOAD2=$\overline{(\text{LOAD1})}$ _____ (2) 334–4
$\overline{\text{TMB}}$=$\overline{(\text{TMB})}$ _____ (4) 334–5

Set LDM logic 336 provides the TBM signal in response to the RG10K, BOF (from FIG. 14B), and IDLSB signals according to the logical equation:

TMB=BOF RG10K IDLSB _____ (1–3) 336–1

The IDLSB signal will be logic "1" whenever a double field tag is being scanned. If the data from the first scanned field passes the size code checks associated therewith, the RG10K signal becomes logic "1." Therefore, one bit time after the BOF signal for the second scanned field becomes logic "1," the TMB signal will become logic "1" (equation 336–1).

The LDM1 latch is set by the INIT signal causing the LDM1 signal to become logic "1," and the LDM2 signal becomes logic "0" (equation 334–3). When the TMB signal becomes logic "1," it resets the LDM1 latch (equation 334–3), so the LDM1 signal becomes logic "0," and the LDM2 signal becomes logic "1."

The remainder of FIG. 14E is the Gross Time Out (G.T.O.) Counter Means 104, which includes 15 Color Bar Transitions Logic 338, TRANS15 Reset Logic 340, Increment GTO Logic 342, Clear GTO Logic 344, PENUP Latch 346, GTO Switching Logic 348, and GTO Counter 350. GTO Counter 350 is a ten-stage counter which includes an eight-stage recirculating counter 352 having most significant to least significant E8 stage 354, E7 stage 356, E6 stage 358, E5 stage 360, 14 stage 362, E3 stage 364, E2 stage 366, and E1 stage 368. Each of stages 354 to 368 (even numbers) respectively provides the E8, E7, E6, E5, E4, E3, E2, and E1 and $\overline{E1}$ signals. GTO Counter 350 also includes GTO256D Logic 370, E9 stage 372, E10 stage 374, and GTO Gate Logic 376.

15 Color Bar Transition Logic 338 provides a logic "1" TRANS15 signal after fifteen color transitions have been detected in response to the $\overline{GTO}$, BC8P (from FIG. 14D), BC3 (from FIG. 14D), TRANSTB7 (from FIG. 14A), $\overline{INIT}$, $\overline{BOF}$ (from FIG. 14B), BOFFF (from FIG. 14B), BOFF (from FIG. 14C, BOF (from FIG. 14B), $\overline{DIRBIT}$, and TRANSRT signals according to the logical equations:

2ND8L=2ND8L $\overline{TRANS15}$ $\overline{BOF}$+$\overline{BOFF}$
  BOFFF BC8P _____ (1–3) 338–1
TRANS15=2ND8L (TRANSTB7 BC3+
  $\overline{DIRBIT}$)+TRANS15 $\overline{GTO}$ $\overline{INIT}$
  TRANS15#4 _____ (1–3) 338–2
$\overline{TRANS15}=\overline{(TRANS15)}$ _____ (1–3) 338–3
TRANS15#4=$\overline{(TRANSRT BOF)}$ _____ (3) 338–4

TRANS15 Reset Logic 340 provides the TRANSRT signal in response to the TRANS15, $\overline{INIT}$, and EOF (from FIG. 14C) signals according to the logical equations:

TRANSRT=$\overline{(TRANSRT\ \overline{INIT}+}$
  $\overline{TRANS15\ EOF)}$ _____ (1–2–3) 340–1
$\overline{TRANSRT}=\overline{(TRANSRT)}$ _____ (4) 340–2

In a forward direction scan, the fifteenth transition causes BC8 Counter 318 to become full for the second time, it having been full for the first time due to the first seven transitions and the first dummy bit. At the time the first BC8P logic "1" signal occurs, the BOFF Latch is set, and the BOFF signal is logic "1." However, for subsequent BC8P logic "1" signals, the BOFF signal will be logic "0." Thus, when the first logic "1" BC8P signal occurs in conjunction with a logic "1" $\overline{BOFF}$ signal, the fifteenth transition has occurred if the tag is scanned in the forward direction. The 2ND8L latch in 15 Color Bar Transition Logic 338 is set when this condition occurs, as seen by the $\overline{BOFF}$ BOFFF BC8P term of equation 338–1. It should be noted that the BOFFF signal will be logic "1" at this time.

For a reverse direction scan, there will have been five dummy bits inserted in Input Buffer 276 by the time the second BC8P signal becomes logic "1"; thus, only eleven color transitions will have occurred at this time. Due to the different number of color transitions occurring at the time the 2ND8L signal becomes logic "1," it is necessary to have TRANS15 latch set at different times for forward and reverse direction scans. TRANS15 latch is set by the 2ND8L logic "1" signal for a forward direction scan ($\overline{DIRBIT}$ being logic "1") and after four more color transitions occur for a reverse direction scan. The four more color transitions are identified by the coincidence of logic "1" BC3 and TRANSTB7 signals. Thus, the TRANS15 signal becomes logic "1" when either the term 2ND8L $\overline{DIRBIT}$ or the term 2ND8L TRANSTB7 BC3 of equation 338–2 becomes logic "1."

The TRANS15 latch is reset when the $\overline{INIT}$ or the $\overline{GTO}$ signals become logic "0" or when the TRANSRT and BOF signals are both logic "1." The TRANSRT signal is logic "1" until the EOF signal becomes logic "1" after the TRANS15 signal had become logic "1" (equation 340–1); that is, until after the first scanned field has been completely scanned. When the BOF signal becomes logic "1," the TRANS15 latch is reset by the TRANS15#4 signal becoming logic "0" (equation 338–4). The TRANSRT signal is reset to logic "0" by the $\overline{INIT}$ signal becoming logic "0" prior to scanning the next tag (equation 340–1). The 2ND8L latch is reset by the BOF or the TRANS15 signals becoming logic "1" (equation 338–1).

As will be explained hereinafter, the EOD end of data signal becomes logic "1" after the entire tag has been scanned if the EOF signal has become logic "1" and the two size code checks have been successfully completed. This signal must be provided even though the size code checks fail in order to cause the error signal to occur. GTO Counter Means 104 is provided to cause the EOD signal to become logic "1" despite the fact that the size code checks have failed. GTO Counter Means 104 is activated by two previous occurrences, which are (1) a logic "1" BOF signal, and (2) a logic "1" TRANS15 signal. These two conditions show that the probe 64 is scanning a true tag and not picking up background colors. In the unusual event that less than fifteen bars of a tag are scanned, there will be no EOD logic "1" signal and hence no error signal; however, this is justified to prevent error signals from occurring due to background color pickup.

GTO Counter Means 104 is a switchable counter which can be switched so that it provides a logic "1" GTO signal whenever the probe 64 senses the same color for either one fourth of a second or one second. The one-second sense time is allowed only after the first scanned field of a double field tag is successively scanned and before the BOF signal becomes logic "1" due to the second field being scanned; otherwise the one-fourth-second sense time is used. The reason for this is that background area 25 is between the two fields of the double field tag, as seen in FIG. 1B, and, at the slowest allowable scanning velocity, it will take more than one fourth of a second to traverse area 25, but less than one second.

Increment GTO logic 342 is used to increment by one the count in eight-stage counter 352 and provides the ADDONE and $\overline{ADDONE}$ signals in response to the TRANS15, RSTRPC (from FIG. 14C), and E1 signals according to the logical equations:

ADDONE=E1 ADDONE+TRANS15
  $\overline{RSTRPC}$ _____ (1–3) 342–1
$\overline{ADDONE}=\overline{(ADDONE)}$ _____ (4) 342–2
$\overline{RSTRPC}=\overline{(RSTRPC)}$ _____ (4) 342–3

Clear GTO logic 344 is used to reset the count of eight-stage counter 352 to zero and provides the CLR and $\overline{CLR}$ signals in response to the $\overline{TB8}$, INITD1, and TRANSTB7 (from FIG. 14A) signals according to the logical equations:

CLR=TRANSTB7+INITD1+$\overline{TB8}$ CLR _ (1–3) 344–1
$\overline{CLR}=\overline{(CLR)}$ _____ (4) 344–2

PENUP latch 346 provides the PENUP signal to indicate that the probe 64 has been on one color too long in response to the $\overline{INIT}$, TCIRBAR, and GTO signals according to the logical equation:

PENUP=$\overline{INIT}$ TCIRBAR PENUP
  +GTO _____ (1–3) 346–1

GTO Switching Logic 348 provides the SWGTO and $\overline{SWGTO}$ signals to control the time that the probe 64 is allowed to sense the same color in response to the TBM, INIT, $\overline{\text{INIT}}$, DIRBIT, $\overline{\text{DIRBIT}}$, IDLSB, IDMSB, IDMSBAR, TCIR#4, TCIRBAR, and RG10K signals according to the logical equations:

$$\text{SWGTO} = \text{SWGTO SWGTOREV SWGTOFOR} + \text{INIT} + \text{TMBDLY} + \text{TCIR#4} \quad (1\text{-}3)\ 348\text{-}1$$
$$\overline{\text{SWGTO}} = \overline{(\text{SWGTO})} \quad (4)\ 348\text{-}2$$
$$\text{SWGTOFOR} = \overline{(\text{RG10K IDLSB IDMSBAR DIRBIT})} \quad (4)\ 348\text{-}3$$
$$\text{SWGTOREV} = \overline{(\text{RG10K IDMSB SIDLSB DIRBIT})} \quad (4)\ 348\text{-}4$$
$$\text{TMBDLY} = \overline{\text{INIT}}\ \text{TMBDLY TCIRBAR} + \text{TMB} \quad (1\text{-}3)\ 348\text{-}5$$

E8 stage 354 provides the E8 signal in response to the ADDONE, $\overline{\text{ADDONE}}$, CLR, E1, $\overline{\text{E1}}$, and GTO256D signals. The E7 through E1 stages 356 through 368 (even numbers) provide the E7 through E1 and $\overline{\text{E1}}$ signals in response to the stage next higher in significance thereto. The logical equations for the E8 through E1 stages 354 through 368 (even numbers) are:

$$\text{CLRCNT} = \overline{(\text{GTO256D} + \text{CLR})} \quad (4)\ 354\text{-}1$$
$$\text{E1} = \text{E2} \quad (1\text{-}3)\ 366\text{-}1$$
$$\overline{\text{E1}} = \overline{(\text{E1})} \quad (4)\ 368\text{-}2$$
$$\text{E2} = \text{E3} \quad (1\text{-}3)\ 366\text{-}1$$
$$\text{E3} = \text{E4} \quad (1\text{-}3)\ 364\text{-}1$$
$$\text{E4} = \text{E5} \quad (1\text{-}3)\ 362\text{-}1$$
$$\text{E5} = \text{E6} \quad (1\text{-}3)\ 360\text{-}1$$
$$\text{E6} = \text{E7} \quad (1\text{-}3)\ 358\text{-}1$$
$$\text{E7} = \text{E8} \quad (1\text{-}3)\ 356\text{-}1$$
$$\text{E8} = (\text{E1}\ \overline{\text{ADDONE}} + \text{ADDONE}\ \overline{\text{E1}})\ \text{CLRCNT} \quad (1\text{-}3)\ 354\text{-}2$$

GTO256D logic 370 provides the GTO256D signal to indicate whether eight-bit counter 352 is full in response to the TB8, $\overline{\text{TB8}}$, and E1 signals according to their logical equations:

$$\text{GTO256} = \overline{(\text{GTO256D#2} + \text{GTO256#1})} \quad (3)\ 370\text{-}1$$
$$\text{GTO256D} = \overline{(\text{GTO256D#1})} \quad (3)\ 370\text{-}2$$
$$\text{GTO256D#1} = \overline{(\text{TB8 E1 GTO256} + \overline{\text{TB8}}\ \text{GTO}@\%¢\text{D})} \quad (1)\ 370\text{-}3$$
$$\text{GTO256D#2} = \overline{(\text{GTO256D#1})} \quad (2)\ 370\text{-}4$$
$$\text{GTO256#1} = \overline{(\text{TB8} + \text{E1 GTO256})} \quad (1)\ 370\text{-}5$$

E9 stage 372 provides the E9 and $\overline{\text{E9}}$ signals in response to the E10, $\overline{\text{E10}}$, $\overline{\text{CLR}}$, TB8, and GTO256D signals according to the logical equations:

$$\text{E9} = \text{E9}\ \overline{\text{CLR}}\ \text{E9#4} + \text{TVSET} \quad (1\text{-}3)\ 372\text{-}1$$
$$\overline{\text{E9}} = \overline{(\text{E9})} \quad (4)\ 372\text{-}2$$
$$\text{E9#4} = \overline{(\text{TB8 GTO256D}\ \overline{\text{E10}})} \quad (4)\ 372\text{-}3$$
$$\text{TVSET} = \text{TB8 GTO256D}\ \overline{\text{E10}} \quad (1\text{-}3)\ 372\text{-}4$$

E10 stage 374 provides the E10 and $\overline{\text{E10}}$ signals in response to the E9, $\overline{\text{CLR}}$, TB8, and GTO256D signals according to the logical equations:

$$\text{E10} = \text{TB8 GTO256D E9} + \text{E10}\ \overline{\text{CLR}} \quad (1\text{-}3)\ 374\text{-}1$$
$$\overline{\text{E10}} = \overline{(\text{E10})} \quad (4)\ 374\text{-}2$$

GTO gate 376 provides the GTO and $\overline{\text{GTO}}$ signals to indicate that probe 64 has detected the same color for too long a time and is responsive to the E9, $\overline{\text{E9}}$, E10, SWGTO, $\overline{\text{SWGTO}}$, INITD1, and TB8 signals according to the logical equations:

$$\text{GTO} = \text{TB8}\ \overline{\text{INITD1}}\ (\text{GTO256D}\ \overline{\text{E9}}\ \overline{\text{SWGTO}}\ \text{E10} + \text{SWGTO E9}) \quad (1\text{-}3)\ 376\text{-}1$$
$$\overline{\text{GTO}} = \overline{(\text{GTO})} \quad (4)\ 376\text{-}2$$
$$\text{INITD1} = \overline{(\text{INITD1})} \quad (4)\ 376\text{-}3$$

The ADDONE latch in Increment GTO logic 342 is set by each logic "1" $\overline{\text{RSTRPC}}$ signal after the TRANS15 signal becomes logic "1," as seen from the TRANS15, $\overline{\text{RSTRPC}}$ term of equation 342-1, causing the ADDONE signal to become logic "1" and the $\overline{\text{ADDONE}}$ signal to become logic "0." The $\overline{\text{RSTRPC}}$ signal is the complement of the RSTRPC signal (equation 342-3) which is provided from Reset R.P.C. to "1" logic 256 in FIG. 14C. The RSTRPC signal, which is normally logic "1," becomes logic "0" during time TB8 every time Register Position Counter 254 registers a count of seventeen. If the bit rate in the system is 144 kHz., then the logic "1" $\overline{\text{RSTRPC}}$ signal occurs at a rate of approximately 1.06 kHz. Every time the ADDONE signal becomes logic "1" and the $\overline{\text{ADDONE}}$ signal becomes logic "0," the count in counter 352 is incremented by one (equation 354-2). The operation of this is similar to how BOF counter 189 was incremented by the ADDL signal becoming logic "1" as explained in FIG. 14B. When Counter 352 is full, it will have a count of 255; thus it requires 0.27 second for Counter 352 to become full. Hereinafter, this time will be referred to as one-fourth of a second.

Since it is desirable to measure the time on a single color with GTO Counter Means 104, it is necessary to clear the count in GTO Counter 350 every time a new color is sensed. For this, Clear GTO logic 344 is provided. The CLR latch is set by each TRANSTB7 logic "1" signal and reset one character time later by the logic "0" $\overline{\text{TB8}}$ signal (equation 344-1). It is also set prior to beginning a tag scan by the INITD1 signal. When the CLR signal becomes logic "1," it causes the CLRCNT signal to become logic "0" (equation 354-1), and this, in turn, causes eight logic "0"s to be placed into Counter 352 (equation 354-2). Thereafter, Counter 352 begins counting up again. The logic "0" $\overline{\text{CLR}}$ signal resets E9 stage 372 and E10 stage 374 (equations 372-1 and 374-1).

The GTO256 latch included in GTO256D logic 270 is set by every TB8 logic "1" signal and reset by the next occurring logic "0" E1 signal (equations 370-1 and 370-5). If Counter 352 is full, there will be no logic "0" E1 signal before the next TB8 logic "1" signal. At this time, the GTO256D latch is set by the logic "1" GTO256, TB8, and E1 signals (equations 370-2 and 370-3), and this resets the GTO256 latch (equations 370-1 and 370-3). The GTO256D latch is reset by the next $\overline{\text{TB8}}$ logic "0" signal (equations 370-2 and 370-3), so a logic "1" GTO256D signal occurs from time TB1 through time TB8. This signal causes the E8 signal to become logic "0" for the next eight bit times to clear Counter 352 (equation 354-1).

The first logic "1" GTO256D signal also sets the E9 latch included in E9 stage 372 by causing the TVSET signal to become logic "1" during time TB1, as long as E10 stage 374 is not set (equation 372-4). Then Counter 352 again counts up and causes a second GTO256D logic "1" signal to occur. The second GTO256D logic "1" signal sets E10 stage 374 (equation 374-1) and clears Counter 352. Again Counter 352 counts up and causes a third GTO256D logic "1" signal to be provided. The third logic "1" GTO256D resets the E9 latch (equations 372-1 and 372-3) and clears Counter 352. Again, Counter 352 counts up and causes a fourth logic "1" GTO256D signal. At this point, the E10, $\overline{\text{E9}}$, and GTO256D signals are logic "1."

GTO Switching Logic 348 controls the time that probe 64 is allowed to be on a single color; that is, the timeout period before the GTO signal is provided. In the case of a single field tag, this time is always one fourth of a second, and, in the case of a double field tag, this time will be one fourth of a second when probe 64 is scanning the color bars of each field and one second while probe 64 is scanning the white background area 25 separating the two fields, if the two size code checks for the first scanned field are valid.

Prior to beginning the scan, the $\overline{\text{INIT}}$ signal becomes logic "0" and resets the TMBDLY latch (equation 348-5), and the logic "0" INIT signal sets the SWGTO latch, if it is not already set (equation 348-1). The TCIRBAR signal becoming logic "1" causes the same actions. Thus, before any scanning occurs, the SWGTO signal is logic "1," and this signifies a one-fourth-second timeout period. In the case of a single field tag, no further action occurs in GTO switching logic 348. In the case of a double field tag, after the first scanned field is scanned, the two size code checks are performed, and, if valid, the RG10K signal becomes logic "1." If the double field tag is being scanned in the forward direction, the least significant bit of the field I.D. code of the first scannel field will be logic "1," and the most significant bit of the field I.D. code of the first scanned field will be logic "0." Thus, the $\overline{\text{DIRBIT}}$, IDLSB, and IDMSBAR signals will all be logic "1," and, when the RG10K signal becomes logic "1," the SWGTOFOR signal will become logic "0" (equation 348-3). This, in turn, will reset the SWGTO latch and cause the SWGTO signal to become logic "0" (equation 348-1), and this signifies a one-second timeout period. In the case of a double field tag being scanned in the reverse direction, both bits of the field I.D. code of the first scanned field will be logic "1." Thus, the DIRBIT, IDLSB, and IDMSB signals will be logic "1," and, when the RG10K signal becomes logic "1," the SWGTOREV signal becomes logic "0" (equation 348-4). This, in turn, will reset the SWGTO latch and cause the SWGTO signal to become logic "0" (equation 348-1).

When probe 64 begins scanning the second field, the TMB signal becomes logic "1" when a logic "1" BOF signal for the second field occurs (equation 336-1). The logic "1" TMB signal sets the TMBDL latch and causes the TMBDL signal to become logic "1" (equation 348-5). This, in turn, sets the SWGTO latch and causes the SWGTO signal to become logic "1" (equation 348-1), which signifies that the timeout period is again one fourth of a second. It should be noted that, when the SWGTO signal is logic "1," the $\overline{\text{SWGTO}}$ signal is logic "0," and, when the SWGTO signal is logic "0," the $\overline{\text{SWGTO}}$ signal is logic "1."

The GTO gate logic 376 responds to the count in GTO Counter 350 and the SWGTO and $\overline{\text{SWGTO}}$ signals to provide the GTO signal if the then-designated timeout period is exceeded. When the SWGTO signal is logic "1," a one-fourth-second timeout is called for, and this is the time required for Counter 352 to become full one time and cause the B9 signal to become logic "1." Thus, the GTO signal becomes logic "1" during time TB1 whenever the B9 and SWGTO signals are logic "1" during time TB8 (assuming that $\overline{\text{INITDI}}$ is also logic "1") (equation 376-1). Similarly, when the $\overline{\text{SWGTO}}$ signal is logic "1," the timeout period is to be one second, and this is the time required for Counter 352 to cause the fourth GTO256D logic "1" signal; that is, when the $\overline{\text{B9}}$, B10, and GTO256D signals are logic "1." Under this condition, a logic "1" GTO signal occurs at TB1 time (equation 376-1).

Whenever the logic "1" GTO signal occurs, it sets the PENUP latch 346 and causes the PENUP signal to become logic "1" (equation 346-1). This signal causes the EOD signal to be provided when the size code checks fail. The PENUP latch 346 is reset by either the $\overline{\text{INIT}}$ or TCIRBAR signals becoming logic "0."

Figure 14F:
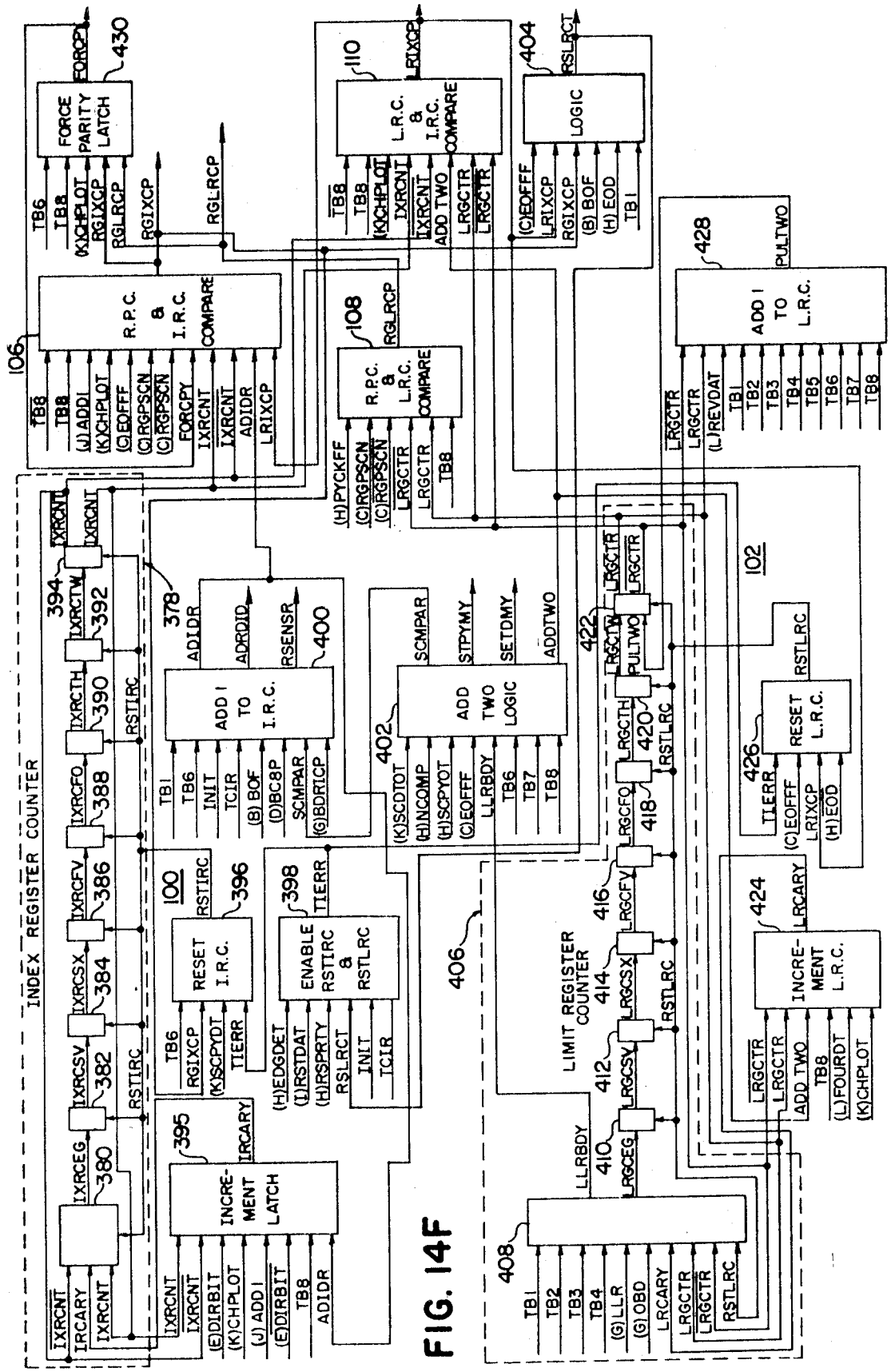
Figure 15A:
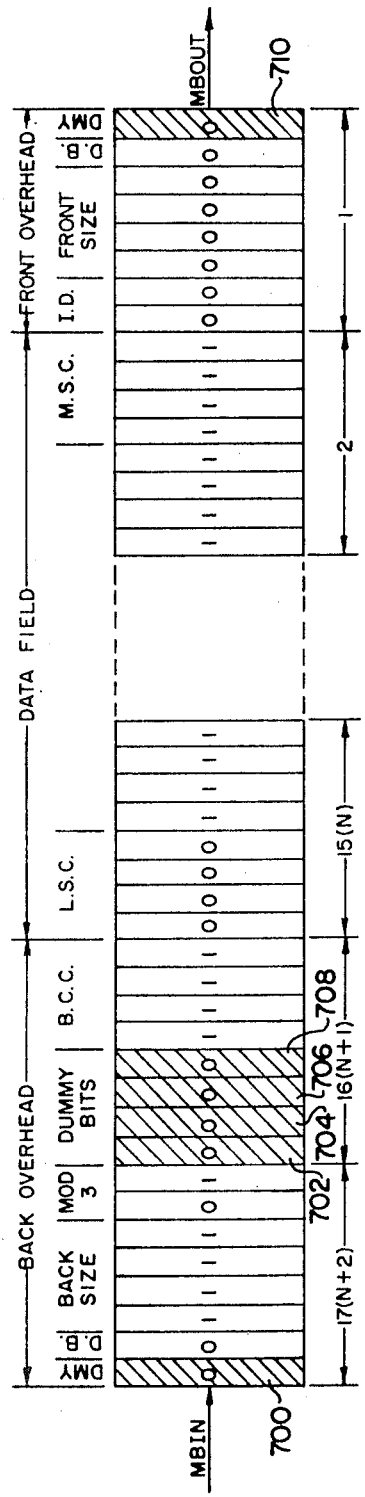
Figure 15B:
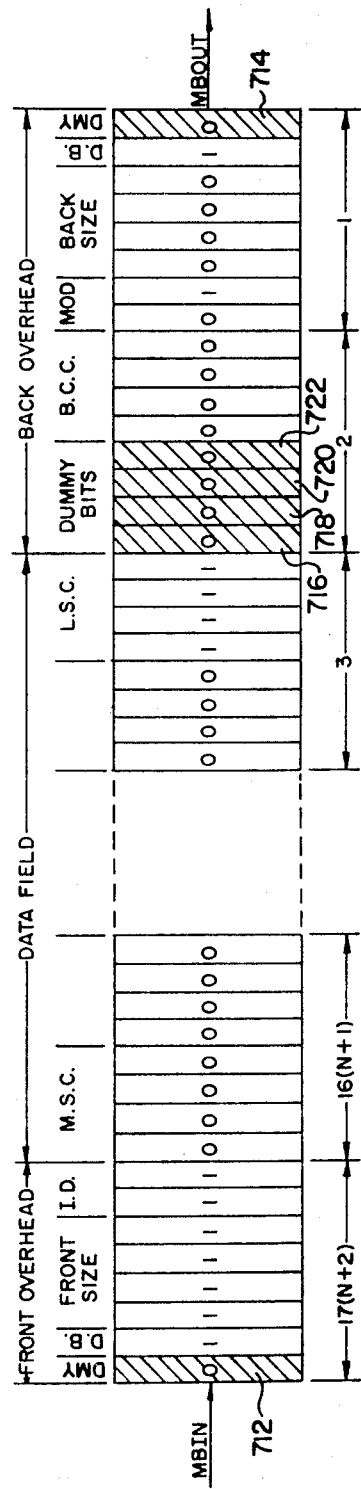

Referring now to FIG. 14F, there are shown Index Register Counter Means 100, Limit Register Counter Means 102, R.P.C. and I.R.C. Compare Logic 106, R.P.C. and L.R.C. Compare Logic 108, and L.R.C. and I.R.C. Compare Logic 110. Index Register Counter Means 100 includes eight stage Index Register Counter 378, which, in turn, includes IXRCEG stage 380, which provides the IXRCEG signal; IXRCSV stage 382, which provides the IXRCSV signal; IXRCSX stage 384, which provides the IXRCSX signal; IXRCFV stage 386, which provides the IXRCFV signal; IXRCFO stage 388, which provides the IXRCFO signal; IXRCTH stage 390, which provides the IXRCTH signal; IXRCTW stage 392, which provides the IXRCTW signal; and IXRCNT stage 394, which provides the IXRCNT and $\overline{\text{IXRCNT}}$ signals, in the order of most significant stage to least significant stage. Each of the stages 380 through 394 (even numbers) is responsive to the RSTIRC reset signal, and the stages 382 through 394 (even numbers) are each responsive to the signal provided by the next higher stage in significance thereto. IXRCEG stage 380 is responsive to the $\overline{\text{IXRCNT}}$, IXRCNT, and IRCARY signals. The logical equations for Index Register Counter 378 are:

IXRCEG=(IRCARY+IXRCNT)
   IXRCEG#4 RSTIRC _____ (1-3) 380-1
IXRCEG#4=$\overline{\text{(IRCARY IXRCNT)}}$ \_\_\_\_ (4) 380-2
IXRCFO=IXRCFV RSTIRC _____ (1-3) 388-1
IXRCFV=IXRCSX RSTIRC _____ (1-3) 386-1
IXRCNT=IXRCTW RSTIRC _____ (1-3) 394-1
$\overline{\text{IXRCNT}}$=$\overline{\text{(IXRCNT)}}$ _____ (4) 394-2
IXRCSV=IXRCEG RSTIRC _____ (1-3) 382-1
IXRCSX=IXRCSV RSTIRC _____ (1-3) 384-1
IXRCTH=IXRCFO RSTIRC _____ (1-3) 390-1
IXRCTW=IXRCTH RSTIRC _____ (1-3) 392-1

Figure 14G:
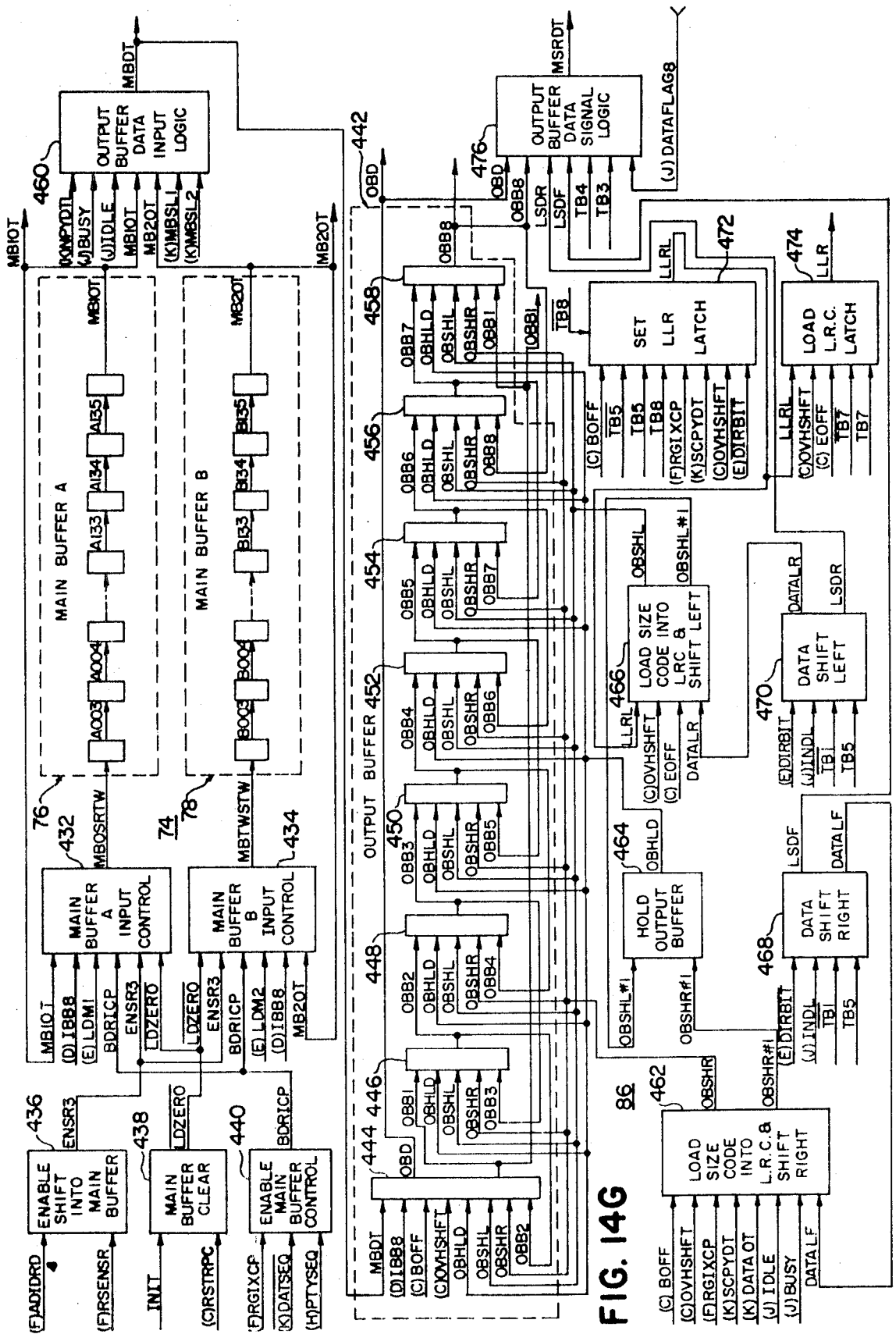
Figure 14J:
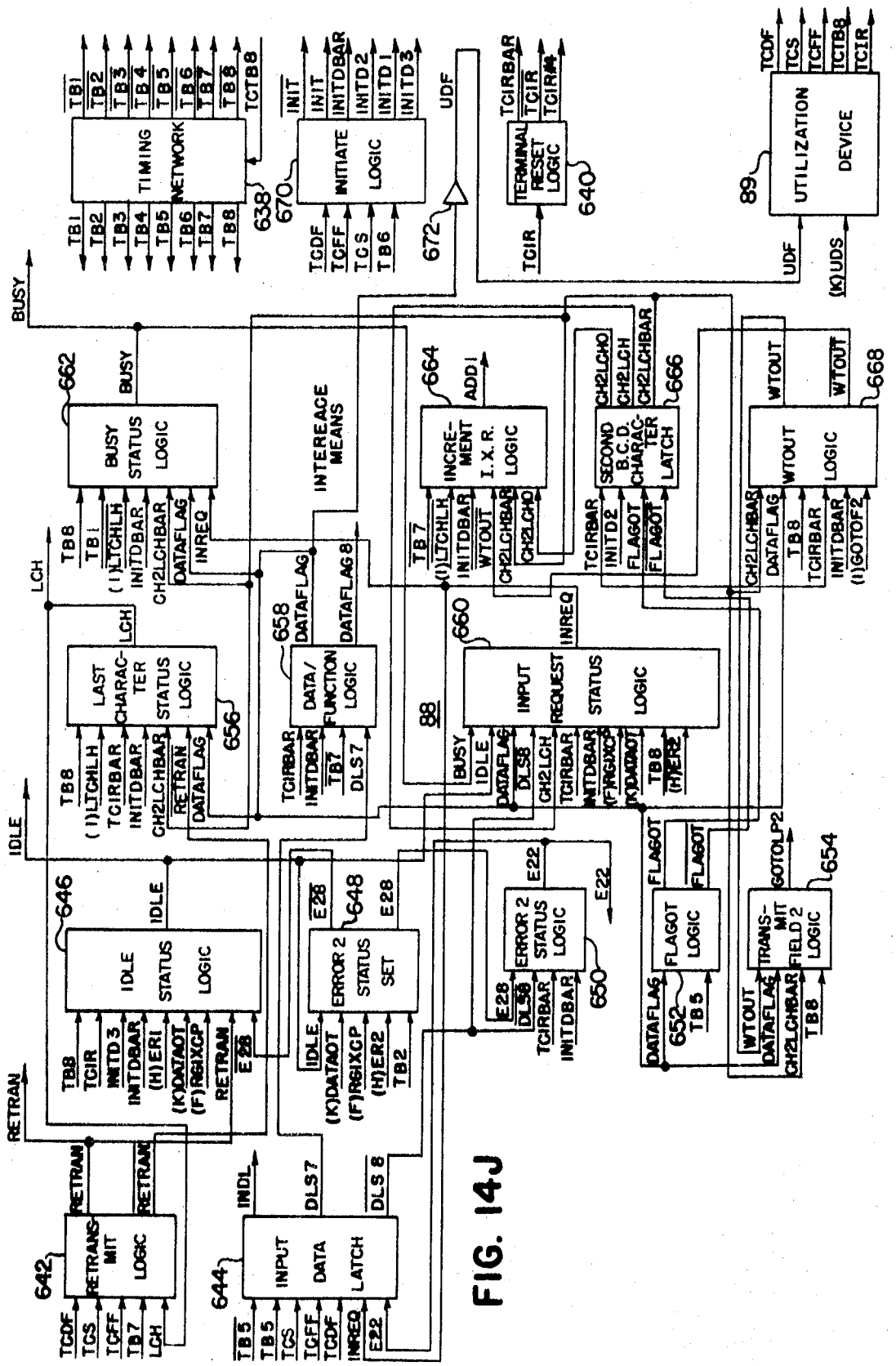

Index Register Counter Means 100 also includes Increment Latch 395, which provides the IRCARY signal in response to the IXRCNT, $\overline{\text{IXRCNT}}$, DIRBIT (from FIG. 14E), CHPLOT (from FIG. 14K), ADD1 (from FIG. 14J, $\overline{\text{DIRBIT}}$ (from FIG. 14E), TB8, and ADIDR signals according to the logical equation:

IRCARY=IRCARY (IXRCNT (ADD1
   $\overline{\text{DIRBIT}}$+ADIDR+CHPLOT+ADD1
   $\overline{\text{IXRCNT}}$ DIRBIT+TB8 (ADIDR+
   CHPLOT+ADD1) _____ (1-3) 395-1

The RSTIRC reset index register signal is provided from Reset I.R.C. Logic 396 in response to the TB6, RGIXCP, SCPYDT (from FIG. 14K), and TIERR signals according to the logical equations:

ATWO=$\overline{\text{(TIERR SRT)}}$ _____ (2) 396-1
RSTIRC=$\overline{\text{(ATWO)}}$ _____ (3) 396-2
SRT=$\overline{\text{(RGIXCP TB6 SCPYDT)}}$ _____ (1) 396-3

The TIERR signal is provided from Enable RSTIRC and RSTLRC Logic 398 in response to the EDGDET (from FIG. 14H), RSTDAT (from FIG. 14I), RSPRTY (from FIG. 14H), RSLRCT, INIT, and TCIR signals according to the logical equation:

TIERR=$\overline{\text{(RSLRCT+RSTDAT+TCIR+}}$
   $\overline{\text{EDGDET+RSPRTY+INIT)}}$ _____ (1) 398-1

ADD "1" to I.R.C. Logic 400 provides the ADIDR, ADIDRD, and RSENSR signals in response to the TB1, TB6, INIT, TCIR, BOF (from FIG. 14B) BC8P (from FIG. 14D), SCMPAR, and BDRICP (from FIG. 14G) signals according to the logical equations:

ADIDR=(ADIDR+BC8P+SCMPAR)
   RSENSR $\overline{\text{RSAIR}}$ _____ (1-3) 400-1
$\overline{\text{ADIDR}}$=$\overline{\text{(ADIDR)}}$ _____ (4) 400-2
ADIDRD=TB6 ADIDR _____ (1-3) 400-3
RSAIR=TB6 ADIDR+RSAIR
   RSENSR _____ (1-3) 400-4
$\overline{\text{RSAIR}}$=$\overline{\text{(RSAIR)}}$ _____ (4) 400-5
RSENSR=$\overline{\text{(INIT+TCIR+BOF+}}$
   $\overline{\text{ADIDR TB1 BDRICP)}}$ _____ (1-2-3) 400-6

Add Two Logic 402 provides the SCMPAR, STPYMY, SETDMY, and ADDTWO signals in response to the SCDTOT (from FIG. 14K), NCOMP (from FIG. 14H), SCPYOT (from FIG. 14H), EOFF (from FIG. 14C), LLRBDY, TB6, TB7, and TB8 signals according to the logical equations:

ADDTWO=FDKAD2 ((SCMPAR+
   SCPYOT) LLRBDY TB7+
   ADDTWO) _____ (1–3) 402–1
FDKAD2=(EOFFF+SCPYOT)
   (SMPTB6 TB6+FDKAD2) _____ (1–3) 402–2
FDKAD2=(FDKAD2) _____ (4) 402–3
SCMPAR=NCOMP _____ (1–3) 402–4
SETDMY=SCDTOT TB8 SLLRBDY ___ (1–3) 402–5
SMPTB6=(SCPYOT+EOFFF)
   (ADDTWO TB7+SMPTB6) _____ (1–3) 402–6
STPYMY=TB7 FDKAD2 _____ (1–3) 402–7

The RSLRCT signal is provided by Logic 404 in response to the EOFFF (from FIG. 14C), LRIXCP, RGIXCP, BOF (from FIG. 14B), FOD (from FIG. 14H), and TB1 signals according to the logical equation:

RSLRCT=$\overline{\text{EOD}}$ (RGIXCP EOFFF
   TB1 LRIXCP+BOF _____ (1–3) 404–1

The main unit in Limit Register Counter Means 102 is eight stage Limit Register Counter 406, which includes LRGCEG stage 408, which provides the LRGCEG and LLRBDY signals; LRGCSV stage 410, which provides the LRGCSV signal; LRGCSX stage 412, which provides the LRGCSX signal; LRGCFV stage 414, which provides the LRGCFV signal; LRGCFO stage 416, which provides the LRGCFO signal; LRGCTH stage 418, which provides the LRGCTH signal; LRGCTW stage 420, which provides the LRGCTW signal; and LRGCTR stage 422, which provides the LRGCTR and $\overline{\text{LRGCTR}}$ signals, in the order of most significant stage to least significant stage. Each of the stages 410 through 422 (even numbers) is responsive to the RSTLRC reset signal. Each of the stages 410 through 422 (even numbers) is responsive to the signal provided by the stage next higher in significance thereto. In addition, the LRGCTR stage 422 is responsive to the PULTWO signal. LRGCEG stage 408 is responsive to the TB1, TB2, TB3, TB4, LLR (from FIG. 14G), OBD (from FIG. 14G), LRCARY, LRGCTR, $\overline{\text{LRGCTR}}$, and RSTLRC signals. The logical equations for Limit Register Counter 406 are:

LLRBDY=LLR _____ (1–3) 408–1
$\overline{\text{LLRBDY}}$=$\overline{\text{(LLRBDY)}}$ _____ (4) 408–2
LRGCEG=RSTLRC (LLRBDY OBD
   (TB1+TB2+TB3+TB4)+(LRCARY
   +LRGCTR) LRGCEG#4 $\overline{\text{LLRBDY}}$) __(1–3) 408–3
LRGCEG#4=$\overline{\text{(LRCARY LRGCTR)}}$ ___ (4) 408–4
LRGCFO=RSTLRC LRGCFV _____ (1–3) 416–1
LRGCFV=RSTLRC LRGCSX _____ (1–3) 414–1
LRGCSV=RSTLRC LRGCEG _____ (1–3) 410–1
LRGCSX=RSTLRC LRGCSV _____ (1–3) 412–1
LRGCTH=RSTLRC LRGCFO _____ (1–3) 418–1
LRGCTR=RSTLRC LRGCTW
   +PULTWO _____ (1–3) 422–1
$\overline{\text{LRGCTR}}$=$\overline{\text{(LRGCTR)}}$ _____ (4) 422–2
LRGCTW=RSTLRC LRGCTH _____ (1–3) 420–1

Increment L.R.G. Logic 424 provides the LRCARY signal in response to the $\overline{\text{LRGCTR}}$, LRGCTR, ADDTWO, TB8, FOURDT (from FIG. 14L), and CHPLOT (from FIG. 14K) signals according to the logical equation:

LRCARY=LRCARY (IRGCTR ADDTWO
   +$\overline{\text{LRGCTR}}$ CHPLOT FOURDT)+TB8
   (CHPLOT FOURDT+ADDTWO) ___ (1–3) 424–1

Reset L.R.C. Logic 426 provides the RSTLRC signal in response to the TIERR, EOFFF (from FIG. 14C), LRIXCP, and $\overline{\text{EOD}}$ (from FIG. 14H) signals according to the logical equations:

BTWO=$\overline{\text{(TIERR LRE)}}$ _____ (2) 426–1
$\overline{\text{EOFFF}}$=$\overline{\text{(EOFFF)}}$ _____ (4) 426–2
LRE=$\overline{\text{(EOD EOFFF)}}$ LRIXCP) _____ (1) 426–3
RSTLRC=$\overline{\text{(BTWO)}}$ _____ (3) 426–4

Add "1" to L.R.C. Logic 428 provides the PULTWO signal in response to the $\overline{\text{LRGCTR}}$, LRGCTR, REVDAT (from FIG. 14L), TB1, TB2, TB3, TB4, TB5, TB6, TB7, and TB8 signals according to the logical equations:

DECTWO=REVDTA (DECTWO
   ($\overline{\text{LRGCTR}}$ (TB6+TB5+TB1+TB3
   +TB4)+LRGCTR TB2)+TB8) _____ (1–3) 428–1
PULTWO=DECTWO TB7 _____ (1–3) 428–2

The R.P.C. and I.R.C. Compare Logic 106 provides the RGIXCP signal in response to the $\overline{\text{TB8}}$, TB8, ADD1 (from FIG. 14J), CHPLOT (from FIG. 14K, EOFFF (from FIG. 14C), RGPSCN (from FIG. 14C), $\overline{\text{RGPSCN}}$ (from FIG. 14C), FORCPY, IXRCNT, $\overline{\text{IXRCNT}}$, ADIDR, and LRIXCP signals according to the logical equations:

BLOKCP=BLOKCP#4 _____ (1–3) 106–1
BLOKCP#4=$\overline{\text{(RGIXCP FORCPY)}}$ ____ (4) 106–2
COMRGI=COMRGI (BLOKCP(IXRCNT
   RGPSCN+$\overline{\text{IXRCNT}}$ $\overline{\text{RGPSCN}}$)
   +RGIXCP FORCPY)+TB8 $\overline{\text{ADD1}}$
   $\overline{\text{CHPLOT}}$ $\overline{\text{ADIDR}}$ _____ (1–3) 106–3
N15=$\overline{\text{(RGIXCP EOFFF LRIXCP)}}$ ___ (4) 106–4
RGIXCP=(COMRGI N15 TB8+$\overline{\text{TB8}}$
   RGIXCP ADD1 CHPLOT ADIDR ____ (1–3) 106–5

The FORCPY signal is provided from Force Parity Latch 430 in response to the TB6, TB8, CHPLOT (from FIG. 14K), RGIXCP, and RGLRCP signals according to the logical equations:

FORCPY=PYCKFF FORCPY#4 (TB8
   CHPLOT+FORCPY) _____ (1–3) 430–1
FORCPY#4=$\overline{\text{(RGIXCP TB6}}$ _
   $\overline{\text{RGLRCP)}}$ _____ (4) 430–2

R.P.C. ad L.R.C. Compare Logic 108 provides the RGLRCP signal in response to the PYCKFF (from FIG. 14H), RPGSCN (from FIG. 14C), $\overline{\text{RPGSCN}}$ (from FIG. 14C), LRGCTR, $\overline{\text{LRGCTR}}$, and TB8 signals according to the logical equations:

COMRGL=COMRGL (RGPSCN LRGCTR
   +$\overline{\text{RGPSCN}}$ $\overline{\text{LRGCTR}}$)+TB8 _____ (1–3) 108–1
RGLRCP=(RGLRCP $\overline{\text{TB8}}$+COMRGL
   TB8) PYCKFF _____ (1–3) 108–2

L.R.C. and I.R.C. Compare Logic 110 provides the LRIXCP signal in response to the $\overline{\text{TB8}}$, TB8, CHPLOT (from FIG. 14K), IXRCNT, $\overline{\text{IXRCNT}}$, ADDTWO, LRGCTR, and $\overline{\text{LRGCTR}}$ signals according to the logical equations:

$\overline{\text{ADDTWO}}$=$\overline{\text{(ADDTWO)}}$ _____ (4) 110–1
CPZERO=(IXRCNT+CPZERO
   +LRGCTR) $\overline{\text{TB8}}$ _____ (1–3) 110–2
LRIXCP=(COMPLI CPZERO TB8
   +LRIXCP $\overline{\text{TB8}}$) $\overline{\text{ADDTWO}}$ $\overline{\text{CHPLOT}}$ _ (1–3) 110–3
COMPLI=COMPLI ($\overline{\text{IXRCNT}}$ LRG
   $\overline{\text{CTR}}$+IXRCNT LRGCTR)+TB8
   $\overline{\text{ADDTWO}}$ $\overline{\text{CHPLOT}}$ _____ (1–3) 110–4

The operation of Index Register Counter Means 100, Limit Register Counter Means 102, R.P.C. and I.R.C. Compare Logic 106, R.P.C. and L.R.C. Compare Logic 108, and L.R.C. and I.X.C. Compare Logic 110 will now be described for the loading of the data into Main Buffer Means 74, the parity check operation, and the unloading of data from Main Buffer Means 74 for both forward and reverse scans.

When the INIT or TCIR signals become logic "1" prior to the beginning of a tag scan, the TIERR signal becomes logic "0" (equation 398–1). This causes the ATWO signal in Reset I.R.C. Logic 396 to become logic "1" (equation 396–1) and the RSTIRC signal to become logic "0" (equation 396–2). When the RSTIRC signal becomes logic "0," each of the IXRCEG, IXRCSV, IXRCSX, IXRCFV, IXRCFO, IXRCTH, IXRCTW, and IXRCNT signals become logic "0" (equations 380–1, 382–1, 384–1, 386–1, 388–1, 390–1, 392–1, and 394–1).

The logic "0" TIERR signal also causes the BTWO signal to become logic "1" (equation 426–1), which, in turn, causes the RSTLRC signal to become logic "0" (equation 426–4). The logic "0" RSTLRC signal causes each of the LRGCEG, LRGCSV, LRGCSX, LRGCFV, LRGCFO, LRGCTH, LRGCTW, and LRGCTR signals to become logic "0" (equations 408–3, 410–1, 412–1, 414–1, 416–1, 418–1, 420–1, and 422–1).

The INIT or TCIR logic "1" signals also cause the RSENSR signal to become logic "0" for one bit time (equation 400–6), which, in turn, resets the RSAIR latch (equation 400–4) and the ADIDR latch (equation 400–1) in Add 1 to L.R.C. Logic 400. The logic "1" BOF signal also causes this same action if for some reason background noise has changed these conditions, or for the second field of a double field tag. Thus, after the BOF signal becomes logic "1," the $\overline{\text{RSAIR}}$ and RSENSR signals are logic "1," and the ADIDR signal is logic "0." The BOF signal also causes the RSLRCT signal to become logic "1" (equation 404–1), which, in turn, causes the TIERR signal to become logic "0" (equation 398–1). This causes logic "0" RSTIRC and RSTLRC signals which reset the Index Register Counter 378 and the Limit Register Counter 406.

After seven color transitions are detected and one dummy bit is inserted, the first logic "1" BC8P signal occurs during time TB7 and sets the ADIDR latch (equation 400–1). At the following TB7 time, the ADIDRD signal becomes logic "1" for one bit time (equation 400–3), and the RSAIR latch is set (equation 400–4), which causes the ADIDR latch to be reset (equation 400–1). Thus, the ADIDR signal is logic "1" from time TB8 through TB7. The ADIDR latch is also set by the SCMPAR signal (equation 400–1), which is the NCOMP size code compare signal delayed one bit time (equation 402–4), and reset at the following TB7 time. The RSAIR latch is reset by a logic "0" RSENSR signal resulting from the occurrence of a BDRICP logic "1" signal at TB1 time after the ADIDR latch is reset (equation 400–6). The BDRICP signal is the RGIXCP signal delayed one bit time.

Index Register Counter means 100 is designed to count either up or down. During the loading of data into Main Buffer Means 74 and the parity check portions of the operation, Index Register Counter Means 100 increments its count. During the unloading of data from Main Buffer Means 74, Index Register Counter Means 100 increments its count if the tag was scanned in a forward direction ($\overline{\text{DIRBIT}}$ being logic "1") and decrements its count if the tag was scanned in a reverse direction (DIRBIT being logic "1"). The ADIDR signal is used to increment Index Register Counter Means 100 during the loading of the data, and the CHPLOT signal is used to increment Index Register Counter Means 100 during the parity check portions of operation. Each of these signals is a one-character-long logic "1" signal. During the data unload portion of the operation, the ADD1 signal, which is a series of one-character logic "1" signals, is used to either increment or decrement Index Register Counter Means 100. In the event of a reverse direction scan, the CHPLOT signal becomes logic "1" for $N+1$ character times, where $N$ is the size code, and causes a count of $N+1$ to be incremented into Index Register Counter 378. Thereafter the ADD1 signal becomes logic "1" for one-character time intervals as long as the count in Index Register Counter 378 is three or greater and causes the count to be decremented.

The ADIDR TB8+ADIDR IXRCNT IRCARY term of equation 395–1 controls the incrementing of Index Register Counter 378 during data loading. From this, it is seen that the IRCARY latch becomes set at time TB1 and is reset by the first logic "0" IXRCNT signal. When the IRCARY signal is combined with equations 380–1 and 380–2, the count in Index Register Counter 378 is increased by one. The

CHPLOT TB8+CHPLOT IXRCNT IRCARY term of the equation 395–1 controls the incrementing action during the parity check portion of the operation and the initial setting of Index Register Counter 378 during the data-unloading portion of the operation for a reverse direction scan. When this term is combined with equations 380–1 and 380–2, the count in Index Register Counter 378 is incremented by one for each eight bit times of logic "1" CHPLOT signal. The ADD1 TB8+ADD1 $\overline{\text{DIRBIT}}$ IXRCNT IRCARY term of equation 395–1 controls the incrementing action during the data-unloading portion of the operation for a forward direction scan. When this term is combined with equations 380–1 and 380–2, the count in Index Register Counter 378 is incremented by one for each character time of logic "1" ADD1 signal. The ADD1 TB8+ADD1 DIRBIT $\overline{\text{IXRCNT}}$ IRCARY term of equation 395–1 controls the decrementing action during the data-unloading portion of the operation for a reverse direction scan. When this term is combined with equations 380–1 and 380–2, the count in Index Register Counter 378 is decreased by one for each character time of logic "1" ADD1 signal.

Limit Register Counter Means 102 is designed to count either up or down or to receive a specified count directly. The INIT and BOF logic "1" signals each cause a logic "0" TIERR signal as explained above (equation 398–1). This then causes a logic "0" RSTLRC signal (equations 426–1 and 426–4), which resets Limit Counter 406 to a count of zero (equations 408–3, 410–1, 412–1, 414–1, 416–1, 418–1, 420–1, and 422–1). After Input Buffer 276 is full, the BOFF and OVHSHFT signals become logic "1" and cause the eight control data bits to be shifted into Output Buffer Means 86 during time TB7 through TB6, as has been previously explained.

As will be explained in detail hereinafter, in the case of a forward direction scan, the logic "1" OVHSHFT and BOFF signals cause the LLR signal to become logic "1" during time TB8 through TB7. This causes the LLRBDY signal to be logic "1" from time TB1 through TB8 (equation 408–1). During the time TB1 through TB4 when the LLRBDY signal is logic "1," the four size code bits will be appearing as the OBD signal provided from Output Buffer Means 86. As seen from the

LLRBDY OBD (TB1+TB2+TB3+TB4)

term of equation 408–3, these size code bits are loaded into Limit Register Counter 406. This occurs to cause the four dummy bits to be inserted after all of the data has been detected by probe 64; that is, when an LRIXCP logic "1" signal occurs (equations 275–4 and 275–2). For a reverse direction scan, the size code is not inserted into Limit Register Counter 406 at this time due to the dummy bits being inserted before the data is detected. In the case of the forward direction scan, the first LRIXCP logic "1" signal occurs before the EOF or EOD logic "1" signals occur, thereby causing the LRE signal to become logic "0" (equation 426–3), which in turn causes a logic "0" RSTLRC signal (equations 426–1 and 426–4) to reset the count in Limit Register Counter 406 to zero.

After the scan of a single field tag or the scan of the first field of a double field tag is completed, the EOFF and OVHSHFT logic "1" signals set the LLR signal to logic "1" from time TB8 through TB7 and cause the size code to appear as the OBD signal from time TB1 through TB4. Again, the LLRBDY OBD (TB1+TB2+TB3+ TB4) term of equation 408-3 allows the size code to be inserted into Limit Register Counter 406. When the NCOMP signal becomes logic "1," it causes the one bit time long SCMPAR signal during time TB7 (equation 402-4) to be provided from Add Two Logic 402. At this time, the LLRBDY signal is still logic "1," and, thus, the ADDTWO latch in Add Two Logic 402 is set, causing the ADDTWO signal to become logic "1" at time TB8 (equation 402-1). The logic "1" ADDTWO signal enables the SMPTB6 latch in Add Two Logic 402 to be set at the following TB8 time (equation 402-6), and this, in turn, enables the FDKAD2 latch in Add Two Logic 402 to be set at the next TB7 time (equation 402-2). Thus, the $\overline{FDKAD2}$ signal becomes logic "0" two character times after the ADDTWO signal became logic "1." This signal is used to reset the ADDTWO latch (equation 402-1), so the ADDTWO is a two-character-long logic "1" signal from time TB8 to the second following TB7.

The LRCARY latch in Increment L.R.C. logic 424 is set at the first TB8 time of the logic "1" ADDTWO signal and reset by the first logic "0" LRGCTR signal (equation 424-1). This causes one to be added to the count of Limit Register Counter 406 (equations 408-2 and 408-3). Since the ADDTWO signal is logic "1" for two character times, the LRCARY latch is set a second time at the next TB8 time and reset by the first logic "0" LRGCTR signal thereafter, again adding a count of one to Limit Register Counter 406. Thus, the count in Limit Register Counter 406 is now $N+2$, where N is the size code. During this same time, Index Register Counter 378 has been incremented by one due to the logic "1" SCMPAR signal causing a logic "1" ADIDR signal (equation 400-1), and the counts in both the Limit Register Counter 406 and the Register Position Counter 378 should be equal. This will cause the LRIXCP signal to become logic "1," and the RGIXCP signal will become logic "1" when the count in Register Counter 254 reaches the count in Index Register Counter 378. Under this condition, the RG10K latch in Field "1" Latch 330 in FIG. 14E is set, and the size code check is completed.

The logic "1" RGIXCP and LRIXCP signals at this time also cause the RSLRCT signal to become logic "1" (equation 404-1), and this causes the TIERR signal to become logic "0" (equation 398-1). This, in turn, causes both the RSTLRC and RSTIRC signals to become logic "0" (equations 396-1 and 396-2 and 426-1 and 426-4) and reset Limit Register Counter 406 and Index Register Counter 378.

If the tag being scanned is a double field tag, the above-described operation is repeated for the second scanned field. If the tag is a single field tag, or if the second field of a double field tag has just been scanned, the parity check portion of operation is entered when the EOD signal becomes logic "1" if a valid size code check occurs. One bit time after the EOD signal becomes logic "1," the EDGDET signal becomes logic "1" and causes the TIERR signal to become logic "0." This, in turn, causes Index Register Counter 378 and Limit Register Counter 406 to be reset to a count of zero. Normally, they will already have been reset by the RSLRCT signal becoming logic "1," but, where the size code check fails, the RSLRCT signal does not become logic "1," and it is then necessary to reset these counters by occurrence of the EDGDET signal. The EOD signal also resets the EOFFF latch, and the logic "0" EOFFF signal resets the SMPTB6 and FDKAD2 latches in ADDTWO Logic 402 (equations 402-2 and 402-6).

In the parity check portion of operation, it is necessary to insert the size code into Limit Register Counter 406, to add two to this count and to cause the RGIXCP signal to be logic "1" for $N+2$ character times, where N is the size code. This causes the entire message stored in Main Buffer Means 74 to be sent to the parity check logic shown in FIG. 14I.

As will hereinafter be explained in detail, the EOD logic "1" signal and a good size code check sets the parity sequence latch, causing the PTYSEQ signal to become logic "1." The logic "1" PTYSEQ signal causes the SCPYOT signal to become logic "1," which, in turn, results in a one-character logic "1" CHPLOT signal. This sets the IRCARY latch (equation 394-1) and causes the count of Index Register Counter to become one. When the count in Register Position Counter 254 becomes one, a one-character logic "1" RGIXCP signal is produced. This signal, together with the SCPYDT signal (the SCPYOT signal delayed one bit time), causes the SRT signal to become logic "1" (equation 396-3), which, in turn, causes the RSTIRC signal to become logic "0" (equations 396-1 and 396-2) and reset Index Register Counter 378.

The RGIXCP and SCPYDT logic "1" signals also allow the first eight bits stored in Main Buffer Means 74 to be shifted into Output Buffer Means 86, and they cause the LLR signal to become logic "1" for one character time. The LLR signal causes the LLRBDY signal to become logic "1" for one character time (equation 408-1), which allows the size code to be inserted into Limit Register Counter 406, as previously explained.

The SCPYOT and LLRBDY logic "1" signals set the ADDTWO latch (equation 402-1), and the ADDTWO signal remains set for two character times, as previously explained. This adds two to the count stored in Limit Register Counter 406, so the count therein becomes $N+2$, N being the size code. When the FDKAD2 signal becomes logic "1" and resets the ADDTWO signal to logic "0," it also causes the STPYMY signal to become logic "1" during time TB8 (equation 402-7). This, in turn, causes the SCPYOT signal to become logic "0," which resets the SMPTB6 and FDKAD2 latches in ADDTWO Logic 402 (equations 402-2 and 402-6). The STPMY logic "1" signal also sets the PYCKFF latch, which causes the CHPLOT signal to become logic "1" for one character time and cause the count in Index Register Counter 378 to become one in the manner previously explained. As will be explained in detail hereinafter, when the count in Register Position Counter 254 becomes one, the RGIXCP signal becomes logic "1" and remains logic "1" for $N+2$ character times—that is, until the count in Register Position Counter 254 equals the count in Limit Register Counter 406, at which time the RGLRCP signal becomes logic "1." During this time, all of the data in Main Buffer Means 74 is transferred through the parity check logic in FIG. 14I. After this, the PYCKPL signal becomes logic "1" and causes the RSPRTY signal to become logic "1." This causes the TIERR signal to become logic "0" (equation 398-1), which causes both Index Register Counter 378 and Limit Register Counter 406 to be reset to zero counts.

At this point, the data transmit portion of operation, hereinafter called data loop, is begun, and the data stored in Main Buffer Means 74 is transmitted to Utilization Device 89. In the data loop, the CHPLOT signal becomes logic "1" for one character time and causes the count in Index Register Counter 378 to become one. When the RGIXCP signal then becomes logic "1" due to this, the SCPYDT signal also is logic "1," and the SRT signal becomes logic "0" (equation 396-3), causing the Index Register Counter 378 to be reset to a zero count. The logic "1" RGIXCP and SCPYDT signals allow the first eight bits in Main Buffer Means 74 to be shifted into Output Buffer Means 86 and the size code portion thereof to be placed in Limit Register Counter 406 in the manner previously explained.

If the tag had been scanned in the forward direction, the CHPLOT signal becomes logic "1" for two character times and causes the count in Index Register Counter 378 to become two. When the following logic "1" RGIXCP signal occurs, the first eight bits of data appearing in position two of Main Buffer Means 74 is transferred to Interface Means 88. This causes the ADD1 signal to become logic "1" for one character time, which increments the count in Index Register Counter 378 by one. When the RGIXCP signal again becomes logic "1," the next eight bits of data are transferred to Interface Means 88. This procedure continues until the count in Index Register Counter 378 equals the count in Limit Register Counter 406, at which time the last character of data is ready to be sent. Then the LRIXCP and RGIXCP signals are both logic "1," and this causes the RSTDAT signal to become logic "1." This then causes the TIERR signal to become logic "0" (equation 398–1), which causes the counts of Index Register Counter 378 and Limit Register Counter 406 to be reset to a count of zero.

If the tag had been scanned in the reverse direction, the size code would also have been loaded in Down Counter 122, and the CHPLOT signal would remain logic "1" for $N+1$ character times, where N is the size code. Thus Index Register Counter 378 is incremented to a count of $N+1$. After the CHPLOT signal has been logic "1" for four character times, the FOURDT signal becomes logic "1." For each character time, the CHPLOT and FOURDT signals are both logic "1," one is subtracted from the count in Limit Register Counter 406. Thus, for size codes between $N=4$ and $N-15$, the count in Limit Register Counter 406 is reduced to three. Where $N=3$, this was previously loaded into Limit Register Counter 406 directly from the Output Buffer Means 86. Where the size code is $N=2$, a count of two would be originally inserted into Limit Register Counter 406, and this is decoded in the Add "1" to L.R.C. logic 428, and the DECTWO signal becomes logic "1" from time TB8 through TB7 (equation 428–1). If the DECTWO signal is logic "1" at time TB7, then the PULTWO signal becomes logic "1" during time TB8 (equation 428–2), and this forces the count in Limit Register Counter from two (0–0–0–0–0–0–1–0) to three (0–0–0–0–0–0–1–1) by forcing LRGCTR stage 422 thereof to a logic "1" (equation 422–1).

When the RGIXCP signal becomes logic "1," the first character of data, which is in position $N+1$ in Main Buffer Means 74, is sent to Interface Means 88. This causes the ADD1 signal to become logic "1" for one character time, and one is subtracted from the count in Index Register Counter 378. Then the next character of data is sent to Interface Means 88, and one is again subtracted from the count in Index Register Counter 378. This procedure continues until the count in Index Register Counter 378 is three, at which time the LRIXCP signal becomes logic "1." Then the RSTDAT signal becomes logic "1" and causes both Index Register Counter 378 and Limit Register Counter 406 to be reset to a count of zero.

R.P.C. and L.R.C. Compare Logic 108 provides the RFLRCP signal when the counts in the Register Position Counter 254 and the Limit Register Counter 406 are the same. Each TB1 time, the COMRGL latch is set by the TB8 signal and is reset whenever the bits in corresponding stages of Register Position Counter 254 and Limit Register Counter 406 differ; that is, whenever the RGPSCN LRGCTR+$\overline{RPCSCN}$ $\overline{LRGCTR}$ term of equation 108–1 is logic "0" (equation 108–1). If the counts are the same, the COMRGL signal will remain logic "1" through the following TB8 time, which allows the RGLRPC latch to be set by the TB8 signal if the PYCKFF signal is logic "1"; that is, if the operation is in the parity check portion of operation (equation 108–2). It is reset by the following $\overline{TB8}$ logic "0" signal, so the RGLRCP signal is a one character long logic "1" from times TB1 through TB8.

L.R.C. and I.R.C. Compare Logic 110 provides the LRIXCP signal whenever the counts of the Limit Register Counter 406 and the Index Register Counter 378 are equal. The COMPLI latch is set by every TB8 signal so long as the $\overline{ADDTWO}$ and $\overline{CHPLOT}$ signals are logic "1" and is reset whenever the bits in corresponding stages of Limit Register Counter 406 and Index Register Counter 378 differ; that is, whenever the $\overline{IXRCNT}$ $\overline{LRGCTR}$ and IXRCNT LRGCTR term of equation 110–4 is logic "0" (equation 110–4). If the counts in these counters are the same, the COMPLI signal will remain logic "1" through the following TB8 time, at which time the LRIXCP latch is set by the TB8 logic "1" signal if the $\overline{ADDTWO}$ and $\overline{CHPLOT}$ signals are logic "1" (equation 110–3). The LRIXCP latch is reset by the following $\overline{TB8}$ logic "0" signal, so the LRIXCP signal is a one character logic "1" signal from times TB1 through TB8.

When Limit Register Counter 406 and Index Register Counter 378 are both reset to zero counts, the LRIXCP signal is inhibited by the CPZERO latch. The CPZERO latch is set every time a logic "1" is present in either Limit Register Counter 406 or Index Register Counter 378 and is reset by the next logic "0" $\overline{TB8}$ signal (equation 110–2). Thus, if the count in both counters is zero, the CPZERO signal is logic "0" at time TB8, and the LRIXCP latch is inhibited from being set by the COMPLI CPZERO TB8 term of equation 110–3.

R.C.P. and I.R.C. Compare Logic 106 provides the RGIXCP signal whenever the counts in the Register Position Counter 254 and Index Register Counter 378 are the same. The COMRGI latch is set by each TB8 logic "1" signal so long as the $\overline{ADDI}$, $\overline{CHPLOT}$, and $\overline{ADIDR}$ signals are logic "1" (equation 106–3). It is reset whenever the bits in corresponding stages of Register Position Counter 254 and Index Register Counter 378 differ—that is, whenever the IXRCNT RGPSCN+$\overline{IXRCNT}$ $\overline{RGPSCN}$ term of equation 106–3 is logic "0," unless the normally logic "1" BLOKCP signal is logic "0." If the counts in these counters are the same, the COMRGI signal will remain logic "1" through the following TB8 time. At this time, the RGIXCP latch is set by the logic "1" TB8 signal so long as the $\overline{ADDI}$, $\overline{CHPLOT}$, and $\overline{ADIDR}$ signals are logic "1," assuming that the N15 signal is at its normal logic "1" value (equation 106–5). The RGIXCP latch is reset by the following $\overline{TB8}$ logic "0" signal or by one of the $\overline{ADDI}$, $\overline{CHPLOT}$, or $\overline{ADIDR}$ signals becoming logic "0" (equation 106–5). Thus, normally the RGIXCP signal is a one-character-long logic "1" from time TB1 through time TB8.

During the parity check portion of the operation, it is desired to have the RGIXCP signal logic "1" for $N+2$ character times. For this, Force Parity Latch 430 is provided. The FORCPY latch can be set only during the parity check, due to the PYCKFF term in equation 430–1. If the PYCKFF signal is logic "1" when the CHPLOT signal becomes logic "1," the FORCPY latch is set by the CHPLOT signal at time TB8 and reset when both the RGIXCP and RGLRCP signals are logic "1" at time TB6. The logic "1" CHPLOT signal caused the count in Index Register Counter 378 to be one, so the RGIXCP signal becomes logic "1" when the count in Register Position Counter 254 is one. Under this condition, the COMRGI latch cannot be reset by the lack of counter comparison, due to the RGIXCP FORCPY term of equation 106–3 now being logic "1." Also, the BLOKCP signal will become logic "0" (equations 106–1 and 106–2) and further prevent the COMRGI latch from being reset by the lack of comparison.

When the RGLRCP signal becomes logic "1" due to Register Position Counter 254 and Limit Register Counter 406 having the same count, the FORCPY latch is reset, and the RGIXCP signal is then reset by the lack of a comparison in the RGPSCN and IXRCNT signals. In this manner, the RGIXCP signal is logic "1" for $N+2$ character times.

For certain size codes, such as fifteen, the RGIXCP latch could be set a second time after the EOF signal becomes logic "1" because of certain timing within the system. This is because Index Register Counter 378 is reset from a count of seventeen, or binary "0–0–0–1–0–0–0–1," to a count of zero at time TB3, and Register Position Counter 254 reverts to a count of one, or binary "0–0–0–0–0–0–0–1," at the previous TB1 time. In this event, the COMRGI latch sees identical counts and sets the RGIXCP latch a second time. To prevent this, the N15 signal (equation 106–4) is provided and inhibits the RGIXCP latch from being set whenever the EOFFF, LRIXCP, and RGIXCP signals are all logic "1."

Referring now to FIG. 14G, the Main Buffer Means 74 and Output Buffer Means 86 are shown. Main Buffer Means 74 includes one-hundred-and-thirty-four-bit Main Buffer A76 and one-hundred-and-thirty-four-bit Main Buffer B78. It further includes Main Buffer A Input Control Logic 432, Main Buffer B Input Control Logic 434, Enable Shift Into Main Buffer Logic 436, Main Buffer Clear Logic 438, and Enable Main Buffer Logic 440. Each of Main Buffer A76 and Main Buffer B78 is a one-hundred-and-thirty-four-stage shift register, each stage consisting of a "1"-gate inverter feeding a "3"-gate inverter.

Each of the stages of Main Buffer A76 is consecutively designated from A003 through A135 and MB10T, least significant stage to most significant stage, and they respectively provide the A003 through A135 and MB10T signals. Stage A003 is responsive to the MBOSRTW signal, and each of the other stages is responsive to the signal provided by the stage next lower in significance thereto. The logical equations for Main Buffer A76 are:

A003=MBOSRTW _____ (1–3) 76–1
A004=A003 _____ (1–3) 76–2
A005=A004 _____ (1–3) 76–3
A134=A133 _____ (1–3) 76–4
A135=A134 _____ (1–3) 76–5
MB10T=A135 _____ (1–3) 76–6

Each of the stages of Main Buffer B78 is consecutively designated from B003 through B135 and MB20T, least significant stage to most significant stage, and they respectively provide the B003 through B135 and MB20T signals. Stage B003 is responsive to the MBTWSTW signal, and each of the other stages is responsive to the signal provided by the stage next lower in significance thereto. The logical equations for Main Buffer B78 are:

B003=MBTWSTW _____ (1–3) 78–1
B004=B003 _____ (1–3) 78–2
B005=B004 _____ (1–3) 78–3
B134=B133 _____ (1–3) 78–4
B135=B134 _____ (1–3) 78–5
MB20T=B135 _____ (1–3) 78–6

Main Buffer A Input Control logic 432 provides the MBOSRTW signal in response to the MB10T, IBB8 (from FIG. 14D), LDM1 (from FIG. 14E), BDRICP, ENSR3, and $\overline{\text{LDZERO}}$ signals according to the logical equations:

MBBD10T=MB10T _____ (1–3) 432–1
MBOSRTW=(BDRICP ENSR3 LDM1 IBB8+MBBD10T MBOSRTW#4) $\overline{\text{LDZERO}}$ _____ (1–3) 432–2
MBOSRTW#4=$\overline{\text{(BDRICP ENSR3 LDM1)}}$ _____ (4) 432–3

The MBBD10T and MBOSRTW logic function as the first two stages of Main Buffer A76, so the combination of Main Buffer A76 and Main Buffer A Input Control logic 432 constitutes a one hundred and thirty-six (136) bit storage register; that is, a register capable of storing seventeen eight-bit characters.

Main Buffer B Input Control logic 434 provides the MBTWSTW signal in response to the $\overline{\text{LDZERO}}$, ENSR3, BDRICP, LDM2 (from FIG. 14E), IBB8 (from FIG. 14D), and MB20T signals according to the logical equations:

MBBD20T=MB20T _____ (1–3) 434–1
MBTWSTW=(BDRICP ENSR3 LDM1 IBB8+MBBD20T MBTWSTW#4) $\overline{\text{LDZERO}}$ _____ (1–3) 434–2
MBTWSTW#4=$\overline{\text{(BDRICP SENSR3 LDM1)}}$ _____ (4) 434–3

The MBB20T and MBTWSTW logic function as the first two stages of Main Buffer B78, so the combination of Main Buffer B78 and Main Buffer B Input Control logic 434 constitutes a one hundred and thirty-six (136) bit storage register; that is, a register capable of storing seventeen eight-bit characters.

The ENSR3 signal is provided by Enable Shift Into Main Buffer logic 436 in response to the ADIDRD and RSENSR signals both from FIG. 14F according to the logical equation:

ENSR3=ADIDRD+RSENSR ENSR3 ___(1–3) 436–1

The $\overline{\text{LDZERO}}$ signal is provided by Main Buffer Clear logic 438 in response to the INIT and RSTRPC (from FIG. 14C) signals according to the logical equations:

INTBDP=INIT _____ (1–3) 438–1
LDZERO=(RSTRPC+INTBDP) (INIT+LDZERO) _____ (1–3) 438–2
$\overline{\text{LDZERO}}$=$\overline{\text{(LDZERO)}}$ _____ (4) 438–3

The BDRICP signal is provided by Enable Main Buffer Control logic 440 in response to the RGIXCP (from FIG. 14F), $\overline{\text{DATSEQ}}$ (from FIG. 14K), and PTYSEQ (from FIG. 14H) signals according to the logical equations:

BDRICP=$\overline{\text{DATSEQ}}$ $\overline{\text{PTYSEQ}}$ RGIXCP __(1–3) 440–1
PTYSEQ=$\overline{\text{(PTYSEQ)}}$ _____ (4) 440–2

Main Buffer A76 and Main Buffer A Input Control Logic 432 are used to store the information obtained from a single field tag or the first scanned field of a double field tag, while Main Buffer B78 and Main Buffer B Input Control logic 434 are used to store the information obtained from the second scanned field of a double field tag. The LDM1 and LDM2 signals from FIG. 14E control whether Main Buffer A76 and Main Buffer A Input Control logic 432 or Main Buffer B78 and Main Buffer B input Control logic 434 are used for storing the bits supplied from Input Buffer 276. It will be assumed for the description of the operation of Main Buffer Means 74 that a single field tag is being scanned and the LDM1 signal is logic "1." When the LDM2 signal is logic "1," the operation is identical to that which will be described herein except that Main Buffer B78 and Main Buffer B Input Control logic 434 are operational.

Main Buffer A Input Control logic 432 and Main Buffer A76 form a one hundred and thirty-six bit recirculating storage register. The MBBD10T signal is the MB10T signal delayed one bit time and serves as the first bit storage position. The MBOSRTW signal is the MBBD10T signal delayed one bit time unless new data is being loaded and serves as the second bit storage position. The A003 signal is the MBOSRTW signal delayed one bit time and serves as the third storage position. This continues until the MB10T signal is the A135 signal delayed one bit time and serves as the one hundred and thirty-sixth storage position.

Before a scan occurs, the INIT signal sets the LDZERO latch in Main Buffer Clear logic 438 (equation 438–2) and causes the $\overline{\text{LDZERO}}$ signal to become logic "0" for one hundred and thirty-six bit times. This is the time between the setting of the LDZERO latch and the next RSTRPC logic "0" signal. This causes the next one hundred and thirty-six MBOSTRW signals to be logic "0"

(equation 432-2), and, when $\overline{\text{LDZERO}}$ returns to logic "1," Main Buffer A76 has been cleared.

When Input Buffer 276 then becomes full after the scanning begins, the BC8P logic "1" signal causes the ADIDR signal to become logic "1" for one character time from TB8 through TB7. The ADIDRD signal is the ADIDR signal delayed one bit time and, thus, is logic "1" from time TB1 through TB8. The ADIDRD logic "1" signal sets the ENSR3 latch in Enable Shift Into Main Buffer Logic 436 (equation 436-1). The next logic "1" RGIXCP signal causes the BDRICP signal from Enable Main Buffer Control logic 440 to become logic "1" from time TB2 through the following TB1, as long as parity check and data transmit portions of operation are not occurring (equation 440-1). At the time the BDRICP signal returns to logic "0," the RSENSR signal from FIG. 14F becomes logic "0" for one bit time during time TB2 (equation 400-7). The logic "0" RSENSR signal resets the ENSR3 latch (equation 436-1), causing the ENSR3 signal to become logic "0" two bit times after the BDRICP signal becomes logic "0."

The logic "1" RGIXCP signal causes the contents of Input Buffer 276 to be serially shifted out as the IBB8 signal from time TB2 through the following TB1 time. This is the same time period in which the BDRICP signal is logic "1" and during the time in which the ENSR3 signal is logic "1." Thus, for this one character time, the MBOSRTW signal becomes the IBB8 signal delayed one bit time according to the BDRICP ENSR3 LDM1 IBB8 term of equation 432-2. The MBOSRTW#4 signal becomes logic "0" during this time and blocks the MBBD10T signal from being recirculated. The next TB1 time the RGIXCP signal becomes logic "1" (assuming that Index Register Counter 378 is not incremented in the mean time), the eight bits inserted above will be represented as the MB10T, A135, A134, A133, A132, A131, A130, and A129 signals. Further, every TB1 time that Register Position Counter 254 is reset to a count of one, these first eight bits will be in these same locations.

The next time Input Buffer 276 becomes full, Index Register Counter 378 will be incremented to a count of two. During the TB1 through TB8 time Register Position Counter 254 registers a count of one, the first eight bits applied to Main Buffer A76 will be shifted from the A129 through MB10T stages to the MBBD10T through A008 stages. During the next TB1 through TB8 time, the RGIXCP signal becomes logic "1" due to a count of two being in Register Position Counter 254 and Index Register Counter 378. One bit time after the RGIXCP signal becomes logic "1," the BDRICP signal becomes logic "1," and the eight bits stored in Main Buffer Means 74 are in the MBOSRTW through A009 stages, and the IBB8 signal is reflecting the Input Buffer IBB8 stage 316 bit. One bit time later, at TB3 time, the first Input Buffer 276 bit becomes the MBOSRTW signal and is thus stored in Main Buffer Means 74. This continues until the BDRICP signal returns to logic "0" after the following TB1 time. At the following TB2 time, the first eight bits are stored in stages A010 through A017, and the second eight bits are stored in stages MBOSRTW through A009. Thereafter, each TB1 time the count in Register Position Counter 254 becomes one, the first eight bits are in the A129 through MB10T stages, and the second eight bits are in the A121 through A128 stages. When Register Position Counter 254 is incremented to a count of two, the second eight bits will be stored in the A129 through MB10T stages at time TB1. This loading procedure continues with each eight bits from Input Buffer 276 being loaded directly behind the previous eight bits therefrom.

Output Buffer Means 86 includes Output Buffer 442 having OBB1 stage 444, OBB2 stage 446, OBB3 stage 448, OBB4 stage 450, OBB5 stage 452, OBB6 stage 454, OBB7 stage 456, and OBB8 stage 458, least significant to most significant stage. Each of these stages respectively provides the OBB1, OBB2, OBB3, OBB4, OBB5, OBB6, OBB7, and OBB8 signals. Output Buffer Means 74 further includes Output Buffer Data Input Logic 460, Load Size Code Into L.R.C. and Shift Right logic 462, Hold Input Buffer logic 464, Load Size Code Into L.R.C. and Shift Left logic 466, Data Shift Right logic 468, Data Shift Left logic 470, Set LLR Latch logic 472, Load L.R.C. Latch logic 474, and Output Buffer Data Signal logic 476.

Each of the Output Buffer 442 stages is responsive to the right shift OBSHR signal, the left shift OBSHL signal, and the hold OBHLD signal. OBB2 through OBB7 stages 446, 448, 450, 452, 454, and 456 each are responsive to the signals provided by the stages next higher and next lower in significance thereto. OBB8 stage 458 is responsive to the OBB1 and OBB7 signals. OBB1 stage also provides the OBD signal and further is responsive to the MBDT, IBB8 (from FIG. 14D), BOFF (from FIG. 14C), OVHSHFT (from FIG. 14C), and OBB2 signals. The logical equations for Output Buffer 442 are:

$OBB1 = \overline{(OBB1\#1)}$      (3) 444-1

$OBB1\#1 = \overline{(OBSHR\ (IBB8\ \overline{OVHSHFTD}}$
$\overline{BOFF} + MBDT) + OBHLD\ \overline{OBB1} +$
$\overline{OBB2}\ OBSHL)$      (1) 444-2

$OBB1\#2 = \overline{(OBB1\#1)}$      (2) 444-3

$OBB2 = OBHLD\ OBB2 + OBSHR\ OBB1 + OBB3\ OBSHL$      (1-3) 446-1

$OBB3 = OBHLD\ OBB3 + OBSHR\ OBB2 + OBB4\ OBSHL$      (1-3) 448-1

$OBB4 = OBHLD\ OBB4 + OBSHR\ OBB3 + OBB5\ OBSHL$      (1-3) 450-1

$OBB5 = OBHLD\ OBB5 + OBSHR\ OBB4 + OBB6\ OBSHL$      (1-3) 452-1

$OBB6 = OBHLD\ OBB6 + OBSHR\ OBB5 + OBB7\ OBSHL$      (1-3) 454-1

$OBB7 = OBHLD\ OBB7 + OBSHR\ OBB6 + OBB8\ OBSHL$      (1-3) 456-1

$OBB8 = OBHLD\ OBB8 + OBSHR\ OBB7 + OBB1\ OBSHL$      (1-3) 458-1

$OBD = \overline{(OBB1\#2)}$      (3) 444-4

$OVHSHFTD = OVHSHFT$      (1-3) 444-5

The MBDT signal is provided from Output Buffer Data Input Logic 460 in response to the NPYDTL (from FIG. 14K), BUSY (from FIG. 14J), IDLE (from FIG. 14J), MB10T, MB20T, MBSL1 (from FIG. 14K), and MBSL2 (from FIG. 14K) signals according to the logical equation:

$MBDT = (MB10T\ MBSL1 + MBSL2$
$MB20T)\ (IDLE + BUSY)\ NPYDTL$      (1-3) 460-1

The OBSHR and OBSHR#1 signals are provided from Load Size Code into L.R.C. and Shift Right Logic 462 in response to the BOFF (from FIG. 14C), OVHSHFT (from FIG. 14C), RGIXCP (from FIG. 14F), SCPYDT (from FIG. 14K), DATAOT (from FIG. 14K), IDLE (from FIG. 14J), BUSY (from FIG. 14J), and DATALF signals according to the logical equations:

$OBSHR\#1 = \overline{(\overline{RGIXCP}\ (\overline{DATAOT}}$
$\overline{(IDLE + BUSY)} + \overline{SCPYDT}) + \overline{BOFF}$
$\overline{OVHSHFT} + \overline{DATALF})$      (1) 462-1

$OBSHR = \overline{(OBSHR\#1)}$      (3) 462-2

The OBHLD signal is provided from Hold Output Buffer logic 464 in response to the OBSHL#1 and OBSHR#1 signals according to the logical equations:

$OBHLD = \overline{(OBHLD\#2)}$      (3) 464-1

$OBHLD\#2 = (OBSHR\#1\ OBSHL\#1)$      (2) 464-1

The OBSHL and OBSHL#1 signals are provided from Load Size Code Into L.R.C. and Shift Left logic 466 in response to the LLRL, OVHSHFT (from FIG. 14C), EOFF (from FIG. 14C), and DATALR signals according to the logical equations:

$$OBSHL = \overline{(OBSHL\#1)} \quad \quad (3) \ 466\text{-}1$$
$$OBSHL\#1 = \overline{(OVHSHFT\ \overline{EOFF} + LLRL + DATALR)} \quad \quad (1) \ 466\text{-}2$$

The LSDF and DATALF signals are provided from Data Shift Right logic 468 in response to the $\overline{DIRBIT}$ (from FIG. 14E), INDL (from FIG. 14J), $\overline{TB1}$, and TB5 signals according to the logical equations:

$$DATALF = INDL\ TB5\ \overline{DIRBIT} + \overline{TB1}$$
$$DATALF \quad \quad (1\text{-}3) \ 468\text{-}1$$
$$LSDF = DATALF \quad \quad (1\text{-}3) \ 468\text{-}2$$

The LSDR and DATALR signals are provided from Data Shift Left Logic 470 in response to the DIRBIT (from FIG. 14E), INDL (from FIG. 14J), $\overline{TB1}$, and TB5 signals according to the logical equations:

$$DATALR = INDL\ TB5\ DIRBIT + \overline{TB1}$$
$$DATALR \quad \quad (1\text{-}3) \ 470\text{-}1$$
$$LSDR = DATALR \quad \quad (1\text{-}3) \ 470\text{-}2$$

The LLRL signal is provided from Set LLR Latch logic 472 in response to the BOFF (from FIG. 14C), $\overline{TB5}$, TB5, TB8, RGIXCP (from FIG. 14F), SCPYDT (from FIG. 14K), OVHSHFT (from FIG. 14C), and $\overline{DIRBIT}$ (from FIG. 14E) signals according to the logical equations:

$$LLRL = TB5\ OVHSHFT\ \overline{DIRBIT}$$
$$+ SCDLY) + LLRL\ \overline{TB5} \quad \quad (1\text{-}3) \ 472\text{-}1$$
$$SCDLY = RGIXCP\ TB8\ SCPYDT$$
$$+ \overline{TB8}\ SCDLY \quad \quad (1\text{-}3) \ 472\text{-}2$$

The LLR signal is provided from Load L.R.G. Latch logic 474 in response to the LLRL, OVHSHFT (from FIG. 14C), EOFF (from FIG. 14C), $\overline{TB7}$, ad TB7 signals according to the logical equation:

$$LLR = (OVHSHFT\ EOFF + LLRL)\ TB7$$
$$+ LLR\ \overline{TB7} \quad \quad (1\text{-}3) \ 474\text{-}1$$

The MSRDT signal is provided from Output Buffer Data Signal logic 476 in response to the OBD, OBB8, LSDR, LSDF, TB4, and TB3 signals according to the logical equation:

$$MSRDT = LSDF\ OBB8 + OBD\ LSDR$$
$$+ DATAFLAG8\ (TB3 + TB4) \quad \quad (1\text{-}3) \ 476\text{-}1$$

Output Buffer Means 86 is used to temporarily store data until it is commanded to transfer it to the Interface Means 88. The data is right-shifted and sent directly as the OBB8 signal if the scan had been in a forward direction, and left-shifted, inverted, and sent as the OBD signal if the scan had been in the reverse direction. This corrects for the opposite direction and complementary value of the data read in a reverse direction scan. Output Buffer Means 86 is also used to store the control data bits and transfer the size code to Limit Register Counter 406 during data capture for a forward direction scan, after data capture, in the parity check and in the data transmit portions of operation.

After the first eight bits are in Input Buffer 276, the BOFF and OVHSHFT signals are both logic "1" for one character time from TB6 through TB5. This causes the OBSHR signal to become logic "1" from TB7 through TB6 (equations 462–1 and 462–2) and the OBHLD signal to become logic "0" during this same time (equations 464–1 and 464–2). The OVHSHFT signal also causes the contents of Input Buffer 276 to be shifted out as the IBB8 signal during time TB7 through TB6, as explained with reference to FIG. 14D.

At time TB7, the OVHSHFT, BOFF, and OBSHR signals are all logic "1," and the OBHLD and OBSHL signals are logic "0." Thus, at time TB8, the OBB1 signal becomes the value of the IBB8 signal at time TB7 (equations 444–1 and 444–2). During the next seven bit times, the remaining seven Input Buffer 276 bits are shifted into the Output Buffer 442 in the same manner, and the bits already stored by Output Buffer 442 are shifted to the next higher significant stage each bit time. Thus, after the OVHSHFT signal returns to logic "0," the first eight control bits are stored in Output Buffer 442.

The OVHSHFT and BOFF signals set the LLRL latch at time TB6 if a forward direction scan occurred ($\overline{DIRBIT}$ being logic "1"), and the LLRL latch is reset after the following TB5 time, thereby causing the LLRL signal to be logic "1" from time TB6 through the following TB5 (equation 372–1). The logic "1" LLRL signal causes the LLR latch to be set at time TB8, and it is reset at the following TB7 time (equation 474–1). The LLRL logic "1" signal also causes the OBSHL signal to become logic "1" from time TB7 through TB6 (equation 446–2), and this causes the eight bits stored in Output Buffer 442 to be circularly shifted left one time. During the time TB1 through TB4, the four size code bits will be appearing as the OBD signal in order of least significant to most significant bit. As previously explained, the size code is transferred to Limit Register Counter 406 in this manner. It should be recalled that the size code was read in the order of most significant to least significant bit with the bits complemented.

After the scanning of the tag is completed, the EOFF and OVHSHFT signals become logic "1" and cause the LLR latch to be set from TB8 through TB7 (equation 474–1). The logic "1" EOFF and OVHSHFT signals also cause the OBSHL signal to be logic "1" from time TB7 through TB6 (equations 466–1 and 466–2), which, in turn, causes the bits stored in Output Buffer 442 to be circularly left shifted one time during the time TB8 through TB7. Again, during time TB1 through TB4, the OBD signal reflects the size code least significant bit through most significant bit, and this is applied to Limit Register Counter 406.

During the parity check portion of operation, the NPYDTL signal becomes logic "1" one bit time after the SCPYDT signal becomes logic "1." During this time, both the IDLE and MBSL1 signals are logic "1." Thus, the MBDT signal reflects the MB10T signal, which is a serial version of the bits stored in Main Buffer A76 (equation 460–1). The logic "1" SCPYDT signal also causes the CHPLOT signal to become logic "1" for one character time, and this increments the count in Index Register Counter 378 to a conut of one. The RGIXCP signal then becomes logic "1" when the first eight control data bits are stored in the last eight stages of Main Buffer A76. The logic "1" RGIXCP and SCPYDT signals cause the OBSHR signal to become logic "1" from time TB2 through TB1 (equations 462–1 and 462–2), and this is the same time as the eight control data bits appear as the MBDT signal. Thus, these bits are shifted into Output Buffer 442.

The logic "1" RGIXCP and SCPYDT signals also set the SCDLY latch in Set LLR Latch logic 472, and the SCDLY signal becomes logic "1" during the TB1 through TB8 time following the time the RGIXCP signal became logic "1" (equation 472–2). The SCDLY signal sets the LLRL signal at time TB6 for one character time (equation 472–1), and the logic "1" LLRL signal causes the OBSHL signal to become logic "1" from TB7 through TB6 of the next character time (equations 466–1 and 466–2). The logic "1" LLRL signal also sets the LLR latch in Load L.R.C. Latch logic 474, and the LLR signal becomes logic "1" from TB8 through TB7 (equation 474–1). When the OBSHL signal is logic "1," the control data stored in Output Buffer 442 is shifted left, and the size code appears as the OBD signal during times TB1 through TB4. Thereafter, the parity of the data stored in Main Buffer A76 is checked. If a double field tag had been scanned, the MBSL2 signal would then become logic "1," and the first eight control data bits from Main Buffer B78 would be transferred to Output Buffer 442, and the size code applied as the OBD signal in the same manner as just described.

During the data transmit portion of operation, the SCPYDT signal again becomes logic "1," and the first eight control data bits are transferred from Main Buffer A76 to Output Buffer 442. Thereafter, the size code is caused to appear as the OBD signal in the manner described above with respect to the parity check portion of operation.

During the data transmit portion of operation, the DATAOT signal is logic "1," and this maintains the NPYDTL signal logic "1." For a forward direction scan, the count in Index Register Counter 378 becomes two, and, when the RGIXCP signal becomes logic "1," the OBSHR signal becomes logic "1" for one character time (equations 462–1 and 462–2). Then the second eight bits of data are transferred from Main Buffer A76 to Output Buffer 442. It should be noted that the MBSL1 and IDLE signals are both logic "1" during this time. At the next TB1 time, the RGIXCP and DATAOT logic "1" signals reset the IDLE latch and set the INREQ latch, denoting an input request to Interface Means 88. This results in Utilization Device 89 sending signals to Interface Means 88 causing the INDL latch to be set from TB6 through TB5 time. One character time later, this sets the DATALF latch in Data Shift Right logic 468 from TB6 through the following TB1 time (equation 468–1). The logic "1" DATALF signal causes the OBSHR signal to become logic "1" from time TB7 through TB2 (equations 462–1 and 462–2) and causes the LSDF signal to be logic "1" during this same time period (equation 468–2). The LSDF logic "1" signal allows the four data bits in the OBB5 through OBB8 stages 452, 454, 456, and 458 to be reflected as the MSRDT signal according to the LSDF OBB8 term of equation 476–1, while the OBSHR signal causes the data bits in these four states to appear as the OBB8 signal.

These four data bits are sent through Interface Means 88 to Utilization Device 89, and Interface Means 88 sends another input request signal. This same procedure is repeated for the second four data bits. The next RGIXCP signal loads eight more data bits into Output Buffer 442, and the transfer process is repeated for these bits. This continues until all data bits have been transferred to Utilization Device 89.

In the case of a reverse direction scan, the logic "1" INDL signal sets the DATALR latch in Data Shift Left Logic 470 from time TB7 through TB2 (equation 470–1). This causes the eight bits in Output Buffer to be shifted left. The DATALR logic "1" also causes the LSDR signal to be logic "1" (equation 470–2) and enables the MSRDT signal to reflect the complement of the data bits stored in Output Buffer 442 in opposite order, as seen from the OBD LSDR term of equation 476–1. This procedure continues until all of the data bits have been shifted to the utilization device.

It should be noted that during this time the data is being transferred to Utilization Device 89, the IDLE signal is logic "0," and the BUSY signal is logic "1." It should also be noted that the MSRDT signal is always logic "1" during times TB4 and TB5 after four bits of data are transferred, due to the

DATAFLAG8 (TB3+TB4)

term of equation 476–1. This allows an eight-bit character to be sent to Utilization Device 89 having the four most significant bits 0–0–1–1 and the four least significant bits as a B.C.D. data number.

Reference is now made to FIG. 14H, in which logic is shown relating to the first size code check, direction bit and data compare for double field tags, parity check control, end of data signal generation, and error type signal generation.

As previously mentioned, the first size code check is to compare the size code stored in Output Buffer 442 with the size code stored in Input Buffer 276 after the scan has been completed, but before the last scanned character has been transferred to Main Buffer Means 74. This is accomplished by Size Code Legal Check Logic 478 and IB & OB Size Code Compare logic 480. The size codes of zero and one have been selected to be illegal because tags having zero or two B.C.D. characters are impractical. Size Code Legal Check logic 478 provides a logic "1" BIGZERO signal at time TB5 whenever a legal size code is found in Input Buffer 276. The BIGZERO signal is provided in response to the $\overline{TB8}$, TB2, TB3, TB4, and IBB8 (from FIG. 14D) signals according to the logic equation:

BIGZERO=$\overline{TB8}$ ((TB4+TB3+TB2) IBB8
  +BIGZERO) ------------------ (1–3) 478–1

The IBB8 signal represents the true value of the size code stored in Input Buffer 278 during time TB1 through TB4 least significant bit first. For a size code to be other than zero or one, it is necessary that at least one of the three most significant bits thereof be logic "1"; that is, that the IBB8 signal be logic "1" during at least one of the TB2, TB3, or TB4 times. As seen from equation 478–1, if the IBB8 signal is logic "1" during one of these times, the BIGZERO latch is set, and the BIGZERO signal becomes logic "1." The BIGZERO latch is reset by the logic "0" $\overline{TB8}$ signal. Thus, at time TB5, the BIGZERO signal will be logic "1" for all legal size codes.

IB & OB Size Code Compare logic 480 provides the NCOMP size code compare signal in response to the OBD (from FIG. 14G), OBB1 (from FIG. 14G), OVHSHFT (from FIG. 14C), IBB8 (from FIG. 14D), EOFF (from FIG. 14C), BIGZERO, TB5, TB8, and $\overline{TB8}$ signals according to the logical equations:

$\overline{IBB8}$=$\overline{(IBB8)}$ ---------------------- (4) 480–1
NCOMP=NCOMPL TB5 BIGZERO ---- (1–3) 480–2
NCOMPL=NCOMPL $\overline{TB8}$ (OBB1
 $\overline{IBB8}$+IBB8 OBD)+TB8 OVHSHFT
 EOFF ------------------------ (1–3) 480–3

When the OVHSHFT and EOFF signals are both logic "1," the NCOMPL latch is set at time TB1 according to the TB8 OVHSHFT EOFF term of equation 480–3. The NCOMPL latch is reset by the first instance in which the OBB1 and $\overline{IBB8}$ or the OBD and IBB8 signals are not identical, or by the logic "0" $\overline{TB8}$ signal, which ever occurs first. If the NCOMPL latch is not reset by time TB5, then the size codes properly compare, since the size codes are provided as the OBB1 or OBD and the IBB8 signals, least significant bit first during times TB1 through TB4. If the NCOMPL signal and the BIGZERO signal are logic "1" at time TB5, then the NCOMP signal becomes logic "1" during time TB6 (equation 480–2), indicating a successful first size code check. Thereafter, the second size code check is made as explained with respect to Size Code logic 326 in FIG. 14E, and, if this check is successful, the RG10K signal becomes logic "1." If the tag being scanned is a double field tag, the same procedure is followed for the second scanned field, and the RG20K signal becomes logic "1."

Size Code Indicator logic 482 renders one of five signals logic "1" to indicate the results of the two size code checks, and these five signals and their meanings are GSCSFT (Good Size Code For a Single Field Tag), GSCDFT (Good Size Code For a Double Field Tag), F1DINB1 (First Field Size Code Valid), F2DINB1 (Second Field Size Code Valid), and NOVF (No Valid Field Size Code). These five signals are provided in response to the $\overline{IDLSB}$, IDMSBAR, IDLSB, IDMSB, RG10K, RG20K, $\overline{RG20K}$, and RG10KBAR signals, all from FIG. 14E, and the EOD signal according to the logical equations:

$$\text{GSCDFT} = \text{RG20K EOD} \quad\quad\quad (1\text{-}3)\ 482\text{-}1$$
$$\text{GSCSFT} = \text{RG10K EOD } \overline{\text{IDLSB}} \quad\quad (1\text{-}3)\ 482\text{-}2$$
$$\text{F1DINB1} = \text{RG10K EOD } \overline{\text{RG20K}} \text{ IDLSB IDMSBAR} \quad\quad (1\text{-}3)\ 482\text{-}3$$
$$\text{F2DINB1} = \text{RG10K EOD } \overline{\text{RG20K}} \text{ IDMSB IDLSB} \quad\quad (1\text{-}3)\ 482\text{-}4$$
$$\text{NOVF} = \text{RG10KBAR EOD } \overline{\text{RG20K}} \quad (1\text{-}3)\ 482\text{-}5$$

Each of these signals is provided one bit time after the logic "1" EOD signal is provided. For a single field tag, the least significant bit of the I.D. code is logic "0," and, thus, the $\overline{\text{IDLSB}}$ signal is logic "1." Thus, when $\overline{\text{IDLSB}}$ and RG10K are both logic "1," a valid size code for a single field tag exists, and the GSCFT signal becomes logic "1" one bit time after the EOD signal becomes logic "1" (equation 482-2). The GSCSFT signal remains logic "1" until either the EOD, the $\overline{\text{IDLSB}}$, or the RG10K signal becomes logic "0." In the case of a double field tag, a valid size code check is indicated by a logic "1" RG20K signal, since this cannot occur unless a logic "1" RG10K signal first occurs to set the LDM2 signal to logic "1." Thus, where the EOD and RG20K signals are both logic "1," the GSCDFT signal becomes logic "1" and remains logic "1" until either the EOD signal or the RG20K signal returns to logic "0."

If a double field tag is scanned in the forward direction and the size code of the first scanned field is found valid, but the size code of the second scanned field is found invalid, the F1DINB1 signal becomes logic "1." For a forward direction scan of a double field tag, the IDLSB and IDMSBAR signals are logic "1," so, if the RG10K and $\overline{\text{RG20K}}$ signals are logic "1" when the EOD signal becomes logic "1," the F1DINB1 signal becomes logic "1" (equation 428-3). If a double field tag is scanned in the reverse direction and the size code of the first scanned field is valid but the size code of the second scanned field is invalid, the F2DINB1 signal becomes logic "1." For a reverse direction scan of a double field tag, both the IDLSB and IDMSB signals are logic "1," so, if the RG10K and $\overline{\text{RG20K}}$ signals are logic "1" when the EOD signal becomes logic "1," the F2DINB1 signal becomes logic "1" (equation 482-4). Finally, where both the RG10KBAR and $\overline{\text{RG20K}}$ signals are logic "1" when the EOD signal becomes logic "1," the NOVF signal becomes logic "1" (equation 482-5), indicating that the entire size code check has failed. This occurs where the size code check for a single field tag fails, the size code check fails for the first scanned field of a double field tag scanned in the forward direction, the size code check fails for the first scanned field of a double field tag scanned in the reverse direction, or the size code check fails for both fields of a tag scanned in either direction.

The EOD and $\overline{\text{EOD}}$ signals are provided by End of Data logic 484 in response to the PENUP, $\overline{\text{DIRBIT}}$, DIRBIT, RG10K, RG20K, IDLSB, $\overline{\text{IDLSB}}$, IDMSB, and IDMSBAR signals, all from FIG. 14E, according to the logical equations:

$$\text{EOD} = \text{PENUP} + \text{RG20K IDLSB} + \text{RG10K}$$
$$(\text{IDLSB} + \text{IDMSBAR DIRBIT} + \text{IDMSB}$$
$$\overline{\text{DIRBIT}}) \quad\quad\quad (1\text{-}3)\ 484\text{-}1$$
$$\overline{\text{EOD}} = \overline{(\text{EOD})} \quad\quad\quad (4)\ 484\text{-}2$$

The EOD signal becomes logic "1" one bit time after the size code checks are determined to be valid. For a single field tag in which the $\overline{\text{IDLSB}}$ signal is logic "1," the EOD signal becomes logic "1" at time TB2 after the RG10K signal became logic "1" at time TB1, as seen by the RG10K $\overline{\text{IDLSB}}$ term of equation 484-1, and becomes logic "0" after the RG10K latch is reset by the next $\overline{\text{INIT}}$ or TCIRBAR logic "0." For a double field tag, the IDLSB signal is logic "1" and the EOD signal becomes logic "1" at time TB2 after the RG20K signal became logic "1" at time TB1, as seen by the RG20K IDLSB term of equation 484-1. If the size code check fails, then the EOD signal becomes logic "1" at time TB3 one bit time after the PENUP signal becomes logic "1" at time TB2, which is one bit time after the GTO signal became logic "1" during time TB1.

Referring again to FIG. 2B, the proper forward direction scan would be to scan data field 22 from left to right and then data field 24 from left to right, and the proper reverse direction scan would be to scan data field 24 from right to left and then data field 22 from right to left. However, it is possible to begin a scan in the background area 25 between data fields 22 and 24 and scan either data field 22 from right to left or data field 24 from left to right. In either case, a valid first field size code check could be obtained, although an erroneous scan had occurred. To detect this situation, the valid size code will cause the EOD signal to become logic "1" immediately, and this will cause either the F1DINB1 or F2DINB1 signal to become logic "1." Where data field 22 is scanned from right to left prior to scanning data field 24, the DIRBIT signal will be logic "1," and the detected I.D. code will result in the IDLSB and IDMSBAR signals being logic "1." When the RG10K signal becomes logic "1," the EOD signal will become logic "1" according to the RG10K IDMSBAR DIRBIT term of equation 484-1. The logic "1" EOD signal will then enable the F1DINB1 signal to become logic "1," since the IDMSBAR and IDLSB signals are logic "1" (equation 482-3). Where data field 24 is scanned from left to right prior to scanning data field 22, the $\overline{\text{DIRBIT}}$ signal will be logic "1," and the detected I.D. code will result in the IDLSB and IDMSB signals being logic "1." When the RG10K signal becomes logic "1," the EOD signal will become logic "1" according to RG10K IDMSB $\overline{\text{DIRBIT}}$ term of equation 484-1. The logic "1" EOD signal will then enable the F2DINB1 signal to become logic "1," since the IDLSB and IDMSB signals are logic "1" (equation 482-4).

Referring again to FIG. 2B, it is also possible, when scanning a double field tag, to scan data field 22 from left to right and then scan data field 24 from right to left, or to scan either data field 22 from left to right and again from left to right, or to scan data field 24 from right to left and again from right to left, or to scan data field 22 from left to right and then from right to left, or to scan data field 24 from right to left and then from left to right. In each of these instances, the scan results in a valid size code check, but the second scan is invalid. The invalidity here can be detected by noting either that the direction bits of the two fields scanned differ, or that the data captured is identical. To detect this invalidity, Direction Bit Compare Logic 486 is provided and includes EXCP logic 488, $\overline{\text{EXCLOR}}$ logic 490, and TOER1 logic 492.

EXCP logic 488 provides the EXCP signal in response to the MB10T and MB20T signals, both from FIG. 14G, according to the logical equations:

$$\text{EXCP} = (\text{MB10 MB20T} + \overline{\text{MB10T}}$$
$$\overline{\text{MB20T}}) \quad\quad\quad (1\text{-}2\text{-}3)\ 488\text{-}1$$
$$\overline{\text{MB10T}} = \overline{(\text{MB10T})} \quad\quad (4)\ 488\text{-}2$$
$$\overline{\text{MB20T}} = \overline{(\text{MB20T})} \quad\quad (4)\ 488\text{-}3$$

The EXCP signal is logic "0" whenever the MB10T and MB20T signals are the same; that is, as long as corresponding stages of Main Buffer A76 and Main Buffer B78 contain equal value bits. When the MB10T and MB20T signals differ during any bit time, the EXCP signal becomes logic "1" (equation 488-1) during the next bit time.

The $\overline{\text{EXCLOR}}$ signal is provided from $\overline{\text{EXCLOR}}$ logic 490 in response to the EXCP, PYCKFF, RGIXCP (from FIG. 14F), and $\overline{\text{INIT}}$ signals according to the logical equations:

EXCLOR = (PYCKFF PXCMPD EXCP
    + EXCLOR) $\overline{\text{INIT}}$ _____ (1–3) 490–1
$\overline{\text{EXCLOR}}$ = $\overline{\text{(EXCLOR)}}$ _____ (4) 490–2
PXCMPD = RGIXCP _____ (1–3) 490–3

The EXCLOR latch is enabled during the time parity checking occurs; that is, when the PYCKFF and RGIXCP signals are logic "1" (this being the $N+2$ character long RGIXCP logic "1" signal). The RGIXCP signal is delayed one bit time to provide the PXCMPD signal, which becomes logic "1" at time TB2 (equation 490–3). The first logic "1" EXCP signal sets the EXCLOR latch, causing the $\overline{\text{EXCLOR}}$ signal to become logic "0" (equations 490–1 and 490–2). If the data stored in Main Buffer A76 and Main Buffer B78 is identical, the EXCP signal remains logic "0," and the EXCLOR latch will not be set, and the $\overline{\text{EXCLOR}}$ signal will remain logic "1."

TOER1 logic 492 provides the TOER1 signal in response to the PYCKFF, $\overline{\text{EXCLOR}}$, EXCP, GSCDFT, RGIXCP (from FIG. 14F), ENBCPY (from FIG. 14I), RGLRCP (from FIG. 14F), TB3, TB4, and $\overline{\text{INIT}}$ signals according to the logical equations:

$\overline{\text{ENBCPY}}$ = $\overline{\text{(ENBCPY)}}$ _____ (4) 492–1
PXCMPD = RGIXCP _____ (1–3) 492–2
TOER1 = PYCKFF PXCMPD $\overline{\text{INIT}}$ GSCDFT
    (TOER1 + $\overline{\text{EXCLOR}}$ RGLRCP TB4
    + EXCP TB3 + $\overline{\text{ENBCPY}}$ _____ (1–3) 492–3

The TOER1 latch is reset by a logic "0" $\overline{\text{INIT}}$ signal and is thereafter enabled to be set during the parity check portion of operation if the size code of a double field tag is found valid; that is, when the PYCKFF, PXCMPD, and GSCDFT signals are logic "1" (equation 492–3). The TOER1 latch is set if different first detection bits are stored in Main Buffer A76 and Main Buffer B78. These direction bits are applied to EXCP logic 488 during time TB2 (a dummy bit being applied during time TB1), and, if they are equal, the EXCP signal remains logic "0" during time TB3. During this time, the $\overline{\text{ENBCPY}}$ signal is logic "1." The EXCP TB3 $\overline{\text{ENBCPY}}$ term of equation 492–3 remains logic "0" as long as the EXCP signal is not logic "1" during this time TB3 time, and the TOER1 latch is not set. However, if the compared direction bits had differed, the EXCP signal would become logic "1" and cause the EXCP TB2 $\overline{\text{ENBCPY}}$ term of equation 492–3 to become logic "1" and set the TOER1 latch.

The TOER1 latch may also be set if the $\overline{\text{EXCLOR}}$ RGLRCP TB4 term of equation 492–3 becomes logic "1." This will occur only if the EXCLOR latch had not been set prior to the end of the parity check; that is, prior to the RGLRCP signal becoming logic "1." Thus, unless the data stored in Main Buffer A76 and Main Buffer B78 is identical, the $\overline{\text{EXCLOR}}$ signal will have become logic "0" by time TB4 during the logic "1" RGLRCP signal, and the TOER1 latch will not be set.

The leading edge of the logic "1" EOD signal is detected in Edge Detect logic 494, which provides the EDGDET signal in response to the EOD signal according the parity check in response to the F1DINB1, GSCDFT, BTEODY = $\overline{\text{(EOD)}}$ _____ (1–2–3) 494–1
EDGDET = EOD BTEODY _____ (1–3) 494–2

The EOD signal becomes logic "1" at time TB2 if the size code checks are valid, and, thus, the BTEODY signal becomes logic "0" at time TB3 (equation 494–1), since this is merely the EOD signal inverted and delayed one bit time. Thus, during time TB2, both the EOD and BTEODY signals are logic "1," so the EDGDET signal becomes logic "1" during the TB3 time (equation 494–2). In the event the EOD signal becomes logic "1" due to the PENUP latch being set by the GTO signal, the EOD signal becomes logic "1" at time TB3, and the EDGDET signal becomes logic "1" during the TB4 time. There is no significance to this time difference.

The parity check portion of operation is controlled by Parity Check Control logic 496, which includes Parity Sequence Latch 498, Load Size Code Logic 500, SCPMRY Logic 502, PTYMRY Logic 504, Parity Check Latch 506, and Reset Parity Logic 508. Parity Sequence Latch 498 provides the PTYSEQ signal in response to the $\overline{\text{INIT}}$, $\overline{\text{TCIR}}$, RTPSDT (from FIG. 14K), $\overline{\text{ERI}}$, F1DINB1, GSCDFT, GSCSFT, and EDGDET signals according to the logical equation:

PTYSEQ = EDGDET + PTYSEQ $\overline{\text{ERI}}$
    $\overline{\text{INIT}}$ $\overline{\text{TCIR}}$ (GSCSFT + GSCDFT
    + F1DINB1) RTPSDT _____ (1–3) 498–1

Load Size Code Logic 500 provides the SCPYOT and $\overline{\text{SCPYOT}}$ signals for controlling the loading of the size code into the Limit Register Counter 406 just prior to the parity check in response to the F1DINB1, GSCDFT, GSCSFT, SCPMRY, and $\overline{\text{PYCKFF}}$ signals according to the logical equations:

SCPYOT = SCPMRY (GSCSFT
    + GSCDFT + F1DINB1) $\overline{\text{PYCKFF}}$ ___ (1–3) 500–1

SCPMRY Logic 502 provides the SCPMRY and $\overline{\text{SCPMRY}}$ signals in response to the PTYSEQ, STPYMY (from FIG. 14F), EDGDET, and PYLOP2 signals according to the logical equations:

PLOOP1 = EDGDET _____ (1–3) 502–1
SCPMRY = PTYSEQ (PLOOP1 + SCPMRY
    + PYLOP2) $\overline{\text{STPYMY}}$ _____ (1–3) 502–2
$\overline{\text{SCPMRY}}$ = $\overline{\text{(SCPMRY)}}$ _____ (4) 502–3
$\overline{\text{STPYMY}}$ = $\overline{\text{(STPYMY)}}$ _____ (4) 502–4

PTYMRY logic 504 provides the PTYMRY signal in response to the RSPRTY, STPYMY (from FIG. 14F), and PTYSEQ signals according to the logical equations:

PTYMRY = PTYSEQ $\overline{\text{RSPRTY}}$ (PTYMRY
    + STPYMY) _____ (1–3) 504–1
$\overline{\text{RSPRTY}}$ = $\overline{\text{(RSPRTY)}}$ _____ (4) 504–2

Parity Check Latch 506 provides the PYCKFF and $\overline{\text{PYCKFF}}$ signals in response to the $\overline{\text{SCPYOT}}$, $\overline{\text{SCPMRY}}$, and PTYMRY signals according to the logical equations:

$\overline{\text{PYCKFF}}$ = $\overline{\text{(PYCKFF)}}$ _____ (4) 506–1
PYCKFF = $\overline{\text{(SCPYOT}}$ PTYMRY
    $\overline{\text{SCPMRY)}}$ _____ (1–3) 506–2

Reset Parity Logic 508 provides the PYCKPL, RSPRTY, and SMPYOK signals in response to the TOER1, RGIXCP (from FIG. 14F), RGLRCP (from FIG. 14F), and TB8 signals according to the logical equations:

PCKTB1 = TB8 $\overline{\text{TOER1}}$ RGLRCP
    RGIXCP _____ (1–3) 508–1
PYCKPL = PCKTB1 _____ (1–3) 508–2
RSPRTY = PYCKPL _____ (1–3) 508–3
SMPYOK = RSPRTY _____ (1–3) 508–4
$\overline{\text{TOER1}}$ = $\overline{\text{(TOER1)}}$ _____ (4) 508–5

If a valid size code check has occurred for at least the first scanned field, the $\overline{\text{ERI}}$ signal will be logic "1," and the logic "1" EDGDET signal occurring during time TB3 will set the PTYSEQ latch in Parity Sequence Latch 498 (equation 498–1). At this time, the $\overline{\text{INIT}}$, $\overline{\text{TCIR}}$, RTPSDT, and one of the GSCSFT, GSCDFT, or F1DINB1 signals are logic "1," thereby enabling the PTYSEQ latch. Thus, the PTYSEQ signal becomes logic "1" at time TB4. If the size code indicator signals indicated that the size code check failed, the $\overline{\text{ERI}}$ signal would be logic "0" and prevent the PTYSEQ latch from being set.

The EDGDET signal is also applied to SCPMRY logic 502 and causes the PLOOP1 signal to become logic "1" during time TB4 (equation 502–1). The PLOOP1 and PTYSEQ signals set the SCPMRY latch, causing the SCPMRY signal to become logic "1" at time TB5 and the $\overline{\text{SCPMRY}}$ signal to become logic "0" at time TB5 (equations 502–1 and 502–2). The logic "0" $\overline{\text{SCPMRY}}$ signal prevents the PYCKFF signal from becoming logic "1" at this time (equation 506–2). During this time, the $\overline{\text{STPYMY}}$ signal from ADDTWO logic 402 in FIG. 14F is logic "1," thereby enabling the SCPMRY latch. It will become logic "0" and reset the SCPMRY latch after the size code has been transferred to Limit Register Counter 406 and the ADDTWO signal adds two to the count in Limit Register Counter 406.

The logic "1" SCPMRY signal is applied to Load Size Code Logic 500 and sets the SCPYOT latch, causing the SCPYOT signal to become logic "1" at time TB6 and the $\overline{\text{SCPYOT}}$ signal to become logic "0" at time TB6 (equations 500–1 and 500–2). During this time, the $\overline{\text{PYCKFF}}$ signal and at least one of the GSCSFT, GSCDFT, or F1DINB1 signals are logic "1." When the $\overline{\text{PYCKFF}}$ signal becomes logic "0," it causes the SCPYOT latch to be reset. As will be explained hereinafter with respect to FIG. 14K, the logic "1" SCPYOT signal is delayed one bit time to become the logic "1" SCPYDT signal at time TB7. The logic "1" SCPYDT signal causes the CHPLOT signal to become logic "1" for one character time, and this sets the count in Index Register Counter 378 to one, as previously explained with respect to FIG. 14F. This is the first step in having the size code included in the first scanned control data bits transferred to Limit Register Counter 406 and adding two to the count thereof, as previously explained with respect to FIGS. 14F and 14G.

During the last bit time that the ADDTWO signal is logic "1," the STPYMY signal is logic "1," as explained with respect to FIG. 14F. The logic "1" STPYMY signal sets the PTYMRY latch in PTYMRY logic 504, which has previously been enabled by the PTYSEQ logic "1" signal (equation 504–1). This causes the PTYMRY signal to become logic "1" at time TB1. When the STPYMY signal is logic "1," the $\overline{\text{STPYMY}}$ signal is logic "0" (equation 502–4), and this resets the SCPMRY latch in SCPMRY logic 502, causing the SCPMRY signal to become logic "0" and the $\overline{\text{SCPMRY}}$ signal to become logic "1" at time TB1 (equations 502–2 and 502–3). The logic "0" SCPMRY signal resets the SCPYOT latch in Load Size Code logic 500, causing the SCPYOT signal to become logic "0" at time TB2 and the $\overline{\text{SCPYOT}}$ signal to become logic "1" at time TB2 (equations 500–1 and 500–2). The logic "1" $\overline{\text{SCPMRY}}$, PTYMRY, and $\overline{\text{SCPYOT}}$ signals applied to Parity Check Latch 506 cause the PYCKFF signal to become logic "1" and the $\overline{\text{PYCKFF}}$ signal to become logic "0" at time TB3 (equations 506–1 and 506–2). This results in the $N+2$ character long RGIXCP logic "1" signal allowing the B.C.C. and MOD3 parity of the data stored in Main Buffer A76 to be checked.

During the time the last character stored in Main Buffer A76 is checked for parity, the RGLRCP signal becomes logic "1." Assuming that that the TOER1 signal from TOER1 logic 482 had not become logic "1" during the parity check, the last bit time (during time TB8) of the logic "1" RGIXCP and RGLRCP signals applied to Reset Parity Logic 508 causes the PYCKPL signal to become logic "1" during the following TB2 time (equations 508–1 and 508–2), the RSPRTY signal to become logic "1" during the following TB3 time (equation 508–3), and the SMPYOK signal to become logic "1" during the following TB4 time (equation 508–4). If the TOER1 signal had become logic "1," these three signals would remain logic "0."

The logic "1" RSPRTY signal causes the $\overline{\text{RSPRTY}}$ signal to become logic "0" (equation 504–2), and this resets the PTYMRY latch, causing the PTYMRY signal to become logic "0" (equation 504–1). The logic "0" PTYMRY signal causes the PYCKFF signal to then become logic "0" (equation 506–2).

The validity or invalidity of the parity check is indicated by a logic "1" for one of the GF1PY (Good Parity of First scanned Field and of a Double Field Tag), GPSFIT (Good Parity for Single Field Tag or Good Parity of Field 1 (field 22 in FIG. 2B) of a double field tag scanned in the forward direction where field 2 (field 24 in FIG. 2B) had an invalid size code), GPYDFT (Good Parity for a Double Field Tag), GF12PY (Good Parity in Field 2 of a Double Field Tag), and GPF1DFT (Good Parity for Field 1 of a Double Field Tag with a valid size code for both fields) signals provided from Parity Indicator logic 510. In addition, the PYLOP2 signal is provided from Parity Indicator Logic 510. These signals are provided in response to the ER2, $\overline{\text{ER2}}$, GSCSFT, GSCDFT, F1DINB1, SMPYOK, and PYOK (from FIG. 14I) signals according to the logical equations:

GF12PY=(GF12PY+PYOK) GF1PY __ (1–3) 510–1
$\overline{\text{GF12PY}}=\overline{(\text{GF12PY})}$ _____ (4) 510–2
GF1PY=(PYOK+GF1PY) GSCDFT ___ (1–3) 510–3
GPF1DFT=ER2 GF1PY _____ (1–3) 510–4
GPSFIT=(GPSFIT+PYOK)
  F1DINB1+GSCSFT) _____ (1–3) 510–5
GPYDFT=GF12PY GF1PY _____ (1–3) 510–6
PYLOP2=$\overline{\text{GF12PY}}$ SMPYOK ER2
  GF1PY _____ (1–3) 510–7

The PYOK signal is logic "1" during time TB3 following a successful parity check of the data stored in one of Main Buffer A76 or Main Buffer B78.

If a size code, direction bit, field data compare, or parity error occurs, an error has been detected. If the error is detected in a single field tag or field 1 of a double field tag, the ER1 signal provided by Error Indicator logic 512 becomes logic "1." If the error is detected in field 2 of a double field tag, the ER2 signal provided by Error Indicator logic 512 becomes logic "1." Error Indicator logic 512 also provides the $\overline{\text{ER1}}$ and $\overline{\text{ER2}}$ signals. These signals are provided in response to the TOER1, $\overline{\text{INIT}}$, PYERRT (from FIG. 14I), GSCSFT, GSCDFT, F1DINB1, NOVF, and GF1PY signals according to the logical equations:

RE1=$\overline{\text{INIT}}$ ((PYERRT RSPRTY+ER1)
  ($\overline{\text{GF1PY}}$ GSCDFT+F1DINB1+
  GSCSFT)+TOER1+NOVF+
  F2DINB1) _____ (1–3) 512–1
$\overline{\text{ERI}}=\overline{(\text{ERI})}$ _____ (4) 512–2
ER2=$\overline{\text{ERI}}$ $\overline{\text{INIT}}$ ((PYERRT RSPRTY+
  ER2) GF1PY+F1DINB1) _____ (1–3) 512–2
$\overline{\text{ER2}}=\overline{(\text{ER2})}$ _____ (4) 512–4
$\overline{\text{GF1PY}}=\overline{(\text{GF1PY})}$ _____ (4) 512–5

The PYERRT signal remains logic "1" during time TB3 following an unsuccessful parity check of the data stored in one of Main Buffer A76 or Main Buffer B78; otherwise it becomes logic "0" during this TB3 time.

If a single field tag had been scanned and the size code check failed, the NOVF signal from Size Code Indicator 482 will become logic "1." This causes the ER1 latch in Error Indicator logic 512 to be set, resulting in the ER1 signal becoming logic "1" and the $\overline{\text{ERI}}$ signal becoming logic "0" according to the $\overline{\text{INIT}}$ NOVF term of equation 512–1. The logic "0" $\overline{\text{ERI}}$ signal prevents the parity check from then occurring by preventing the PTYSEQ latch in Parity Sequence Latch 498 from being set (equation 498–1).

If a single field tag is scanned and the size code check is valid, the GSCSFT signal becomes logic "1," and the parity check occurs. If this is successful, the PYOK signal becomes logic "1," and the GPSFIT latch in Parity Indicator Logic 510 is set (equation 510–5). If the parity check fails, the PYERRT signal remains logic "1" during time TB3 when the RSPRTY signal is logic "1," and this causes the ER1 latch to be set according to the $\overline{\text{INIT}}$ PYERRT RSPRTY GSCSFT term of equation 512–1.

If a double field tag is scanned and both size code checks fail or the size code check for the first scanned field fails, the NOVF signal becomes logic "1" and again causes the ER1 signal to become logic "1" and the $\overline{\text{ER1}}$ signal to become logic "0" according to the $\overline{\text{INIT}}$ NOVF term of equation 512–1. This again prevents any parity checking by disabling the PTYSEQ latch.

If a double field tag is scanned in the reverse direction and the size code check for the first scanned field (data field 24 in FIG. 2B) is valid, but the size code check for the second scanned field (data field 22 in FIG. 2B) fails, the F2DINB1 signal from Size Code Indicator logic 482 becomes logic "1." This sets the ER1 latch in Error Indicator logic 512, causing the ER1 signal to become logic "1" and the $\overline{\text{ER1}}$ signal to become logic "0" according to the $\overline{\text{INIT}}$ F2DINB1 term of equation 512–1. This prevents any parity checking by disabling the PTYSEQ latch.

If a double field tag is scanned in the forward direction and the size code check for the first scanned field (data field 22 in FIG. 2B) is valid but the size code check for the second scanned field (data field 24 in FIG. 2B) fails, the F1DINB1 signal becomes logic "1." This sets the ER2 latch in Error Indicator logic 512 according to the $\overline{\text{ER1}}$ $\overline{\text{INIT}}$ F1DINB1 term of equation 512–3, thereby causing the ER2 signal to become logic "1" and the $\overline{\text{ER2}}$ signal to become logic "0" (equations 512–3 and 512–4). Thereafter, the parity check of the data from the first scanned field, which is stored in Main Buffer A76, occurs.

Finally, if the size code checks for both fields of a double field tag are valid, the GSCDFT signal becomes logic "1," and neither the ER1 or ER2 latches in Error Indicator logic 512 are set. Then, the parity check of the data stored in Main Buffer A76 occurs, and, if a successful check occurs, the parity check of the data in Main Buffer B78 occurs.

Where either the GSCSFT or F1DINB1 signal from Size Code Indicator logic 482 is logic "1," the parity of the data stored in Main Buffer A76 is checked, and, if it is found to be valid, the PYOK signal becomes logic "1." This then causes the GPSFIT latch in Parity Indicator logic 510 to be set, and the GPSFIT signal becomes logic "1" (equation 510–5). If this parity is found to be bad, the PYERRT signal remains logic "1" during the time the RSPRTY signal is logic "1." This, then, causes the ER1 latch in Error Indicator Control 512 to be set and the ER1 signal to become logic "1" according to the $\overline{\text{INIT}}$ (F1DINB1+GSFDFT) (PYERRT RSPRTY) term of equation 512–1.

Where the GSCDFT signal from the Size Code Indicator logic 482 is logic "1," the parity of the data in Main Buffer A76 is checked, and, if it is found to be valid, the PYOK signal comes on. This sets the GF1PY latch in Parity Indicator logic 510, causing the GF1PY signal to become logic "1" (equation 510–3). The logic "1" GF1PY signal then causes the PYLOP2 signal to become logic "1" during TB5 time, since the $\overline{\text{GF12PY}}$, $\overline{\text{ER1}}$, and $\overline{\text{SMPYOK}}$ signals are all logic "1" during TB4 time (equation 510–7).

If the parity check of the data in Main Buffer A76 fails, the PYERRT signal remains logic "1" during the time the RSPRTY signal becomes logic "1." This causes the ER1 latch to be set according to the $\overline{\text{INIT}}$ PYERRT RSPRTY $\overline{\text{GF1PY}}$ GSCDFT term of equation 512–1. Thus, the ER1 signal becomes logic "1," and the $\overline{\text{ER1}}$ signal becomes logic "0." The logic "0" $\overline{\text{ER1}}$ signal inhibits the PTYSEQ latch from being set to initiate a parity check for the data in Main Buffer B78.

Where the parity check for the data in Main Buffer A76 was valid, the logic "1" PYLOP2 signal then sets the SCPMRY latch in SCPMRY logic 502 (equation 501–1), and the operation of Parity Check Control logic 496 continues as explained above from where the EDGDET signal set the SCPMRY latch. The logic "1" PYLOP2 signal causes the MBSL2 signal to become logic "1," and the parity of the data stored in Main Buffer B78 is then checked. If this parity check is successful, the PYOK signal becomes logic "1" and sets the G12PY latch, which had previously been enabled by the GF1PY logic "1" signal in Parity Indicator logic 510, causing the GF12PY signal to become logic "1" (equation 510–1) and the $\overline{\text{GF12PY}}$ signal to become logic "0" (equation 510–2). The logic "0" $\overline{\text{GF12PY}}$ signal inhibits the PYLOP2 gate, and the PYLOP2 signal cannot again become logic "1" (equation 510–7). When the GF12PY signal becomes logic "1," it and the logic "1" GF1PY signal cause the GPYDFT signal to become logic "1" (equation 510–6).

If the parity check for the data stored in Main Buffer B78 had failed, the PYERRT signal would remain logic "1" during the time the RSPRTY signal became logic "1." This, and the logic "1" GF1PY signal, set the ER2 latch, causing the ER2 signal to become logic "1" and the $\overline{\text{ER2}}$ signal to become logic "0" according to the $\overline{\text{ER1}}$ $\overline{\text{INIT}}$ PYERRT RSPRTY GF1PY term of equation 512–3. The logic "0" $\overline{\text{ER2}}$ signal inhibits the PYLOP2 gate, keeping the PYLOP2 signal at logic "0" (equation 510–7). The logic "1" ER2 and GF1PY signals cause the GPF1DFT signal to become logic "1" (equation 510–4).

If at any time during the parity loop the TOER1 signal had become logic "1," the ER1 latch would be set according to the $\overline{\text{INIT}}$ TOER1 term of equation 512–1. Also, the PYCKPL, RSPRTY, and SMPYOK signals are inhibited from becoming logic "1."

Referring now to FIG. 14I, there is shown the logic for performing the B.C.C. and MOD3 parity checks and for determining when the last character is ready for transfer to Interface Means 88.

As shown in FIGS. 3, 15A, and 15B, a two bit MOD3 parity code is included in the control data for each tag, and this code may contain two logic "0" bits, two logic "1" bits, or one logic "0" and one logic "1" bit. Its inclusion in the data field causes the remainder of the total number of logic "1" bits divided by three to equal the remainder of the total number of logic "0" bits divided by three. Although the primary function of including the MOD3 code in the data field is to cause the final bar of the data field to be black when the first bar is green, it also allows a parity check to be performed on the captured data. The MOD3 parity check is performed in MOD3 Parity Check Logic 514, which includes Enable "0" Counter logic 516, Bit Value Detector logic 518, a Module Three Logic "0" Bit Counter 519 having LBMODZ Latch 520, and MBMODZ Latch 522 and a Module Three Logic "1" Bit Counter 523 having MODLB1 Latch 524 and MODMB1 Latch 526.

Enable "0" Counter Logic 516 provides the CNLZRO and $\overline{\text{CNLZRO}}$ signals in response to the PYCKFF (from FIG. 14H) and RGIXCP (from FIG. 14F) signals according to the logical equations:

CNLZRO = PYCKFF RGIXCP _____ (1–3) 516–1

$\overline{\text{CNLZRO}} = \overline{\text{(CNLZRO)}}$ _____ (4) 516–2

Bit Value Detector 518 provides the ZEROCT and CNTONE signals in response to the PYCKFF (from FIG. 14H), RGIXCP (from FIG. 14F), MB10T (from FIG. 14G), MB20T (from FIG. 14G), MBSL1 (from FIG. 14K), and MBSL2 (from FIG. 14K) signals according to the logical equations:

$$CNTONE = \overline{(CNTONE\#1)} \qquad (3)\ 518\text{-}1$$
$$CNTONE\#1 = \overline{(PYCKFF\ RGIXCP} \\ \overline{(MBSL1\ MB10T + MBLS2\ MB20T))} \qquad (1)\ 518\text{-}2$$
$$MOD2 = \overline{(CNTONE\#1)} \qquad (2)\ 518\text{-}3$$
$$ZEROCT = \overline{(MOD2)} \qquad (3)\ 518\text{-}4$$

LBMODZ Latch 520 provides the LBMODZ and $\overline{LBMODZ}$ signals in response to the CNLZRO, PYCKFF (from FIG. 14H), $\overline{CNLZRO}$, ZEROCT, CNTONE, and $\overline{MBMODZ}$ signals according to the logical equations:

$$LBMODZ = PYCKFF\ ((CNTONE \\ + \overline{CNLZRO})\ LBMODZ + ZEROCT \\ CNLZRO\ \overline{MBMODZ}\ \overline{LBMODZ}) \qquad (1\text{-}3)\ 520\text{-}1$$
$$\overline{LBMODZ} = \overline{(LBMODZ)} \qquad (4)\ 520\text{-}2$$

MBMODZ Latch 522 provides the MBMODZ $\overline{MBMODZ}$ signals in response to the PYCKFF (from FIG. 14H), LBMODZ, CNLZRO, $\overline{CNLZRO}$, ZEROCT, and CNTONE signals according to the logical equations:

$$MBMODZ = PYCKFF\ ((CNTONE \\ + \overline{CNLZRO})\ MBMODZ + ZEROCT \\ CNLZRO\ LBMODZ) \qquad (1\text{-}3)\ 522\text{-}1$$
$$\overline{MBMODZ} = \overline{(MBMODZ)} \qquad (4)\ 522\text{-}2$$

MODLB1 Latch 524 provides the MODLB1 and $\overline{MODLB1}$ signals in response to the ZEROCT, CNTONE, PYCKFF (from FIG. 14H), and MODMB1 signals according to the logical equations:

$$MODLB1 = PYCKFF\ (ZEROCT \\ MODLB1 + CNTONE\ \overline{MODMB1} \\ \overline{MODLB1}) \qquad (1\text{-}3)\ 524\text{-}1$$
$$\overline{MODLB1} = \overline{(MODLB1)} \qquad (4)\ 524\text{-}2$$

MODMB1 Latch 526 provides the MODMB1 and $\overline{MODMB1}$ signals in response to the PYCKFF (from FIG. 14H), MODLB1, ZEROCT, and CNTONE signals according to the logical equations:

$$MODMB1 = PYCKFF\ (ZEROCT \\ MODMB1 + CNTONE\ MODLB1) \qquad (1\text{-}3)\ 526\text{-}1$$
$$\overline{MODMB1} = \overline{(MODMB1)} \qquad (4)\ 526\text{-}2$$

When the RGIXCP and PYCKFF signals both become logic "1," the CNLZRO signal becomes logic "1," and the $\overline{CNLZRO}$ signal becomes logic "0" (equations 516-1 and 516-2). The logic "1" CNLZRO signal enables both the LBMODZ and MBMODZ latches 520 and 522.

The logic "1" RGIXCP and PYCKFF signals also enable Bit Value Detector logic 518 to cause the CNTONE signal to reflect the actual value of the bits stored in Main Buffer Means 74 and the ZEROCT signal to reflect the complement of the bits stored in Main Buffer Means 74 (equations 518-1, 518-2, 518-3, and 518-4). The data stored in Main Buffer A76 becomes the CNTONE signal when the MBSL1 signal is logic "1," and the data stored in Main Buffer B78 becomes the CNTONE signal when the MBSL2 signal is logic "1".

The MOD3 parity test is accomplished by having the first logic "1" ZEROCT signal (logic "0" bit from Main Buffer Means 74) set the LBMODZ latch 520, the second logic "1" ZEROCT signal set the MBMODZ latch 522 and reset the LBMODZ latch 520, and the third logic "1" ZEROCT signal reset the MBMODZ latch 522 and thereafter repeating this sequence for each three logic "1" ZEROCT signals; and by having the first logic "1" CNTONE signal (logic "1" bit from Main Buffer Means 74) set the MODLB1 Latch 524, the second logic "1" CNTONE signal set the MODMB1 Latch 526 and reset the MODLB1 Latch 524, and the third logic "1" CNTONE signal reset the MODMB1 Latch 526 and thereafter repeating this sequence for each three logic "1" CNTONE signals. If the counts of the two counters 519 and 523 correspond after all of the bits stored in Main Buffer Means 74 have been applied to Bit Value Detector logic 518, a valid MOD3 parity check has occurred. It should be noted that the six dummy logic "0" bits will not affect the result, since they merely recycle the "0" Counter 519 two times. It should also be noted that, prior to the PYCKFF signal becoming logic "1," both counters 519 and 523 were reset to a zero count by the logic "0" PYCKFF signal.

Assuming that the MBSL1 signal is logic "1," the MB10 signal will be logic "0" at the time the RGIXCP signal becomes logic "1" at time TB1, since the first bit stored in Main Buffer A76 is a logic "0" dummy bit. One bit time later, the CNLZRO signal and the ZEROCT signal both become logic "1," and the $\overline{CNLZRO}$ and CNTONE signals both become logic "0." The logic "1" CNLZRO and ZEROCT signals set LBMODZ Latch 520, since it had previously been enabled by logic "1" $\overline{LBMODZ}$ and $\overline{MBMODZ}$ signals (equation 520-1). Then, the LBMODZ signal becomes logic "1" and the $\overline{LBMODZ}$ signal becomes logic "0," thereby disabling the LBMODZ Latch 520 from being set and enabling MBMODZ Latch 522 to be set by the next logic "1" ZEROCT signal. The second logic "1" ZEROCT signal and logic "0" CNTONE signal reset the LBMODZ Latch 520, since the $$CNTONE + \overline{CNLZRO}$$

term of equation 520-1 becomes logic "0" and the ZEROCT CNLZRO LBMODZ term of equation 522-1 becomes logic "1." This causes the $\overline{MBMODZ}$ signal to become logic "0," thereby maintaining the LBMODZ Latch 520 disabled and the LBMODZ signal to become logic "0," thereby disabling MBMODZ Latch 522. The third ZEROCT logic "1" signal and third CNTONE logic "0" signal causes the LBMODZ Latch 520 and MBMODZ Latch 522 to be reset, since the CNTONE+$\overline{CNLZRO}$ terms of equations 520-1 and 522-1 are logic "0." Each succeeding three logic "1" ZEROCT signals cause Counter 519 to again recycle, as just explained.

Counter 523 responds to logic "1" CNTONE and logic "0" ZEROCT signals in the same manner as the "0" Counter 519 responded to logic "0" CNTONE and logic "1" ZEROCT signals.

The B.C.C. parity is checked in B.C.C. Parity Check Logic 528, which includes Enable B.C.C. Check logic 530, Data Detector logic 532, Position 1 logic 534, Position 2 logic 536, Position 3 logic 538, Position 4 logic 540, and B.C.C. Parity Detector logic 542. The four bit B.C.C. code is so arranged that the sum of each logic "1" bit in corresponding significant positions of each B.C.D. data character and the B.C.C. Code is an even number (e.g., the total number of least significant logic "1" bits in each B.C.D. data character and the B.C.C. code character is an even number).

Enable B.C.C. Check logic 530 provides the ENBCPY signal in response to the RGIXCP (from FIG. 14F), PYCKFF (from FIG. 14H), and TB8 signals according to the logical equation:

$$ENBCPY = (TB8\ RGIXCP + ENBCPY) \\ PYCKFF \qquad (1\text{-}3)\ 530\text{-}1$$

The ENBCPY signal becomes logic "1" one character time after the $N+2$ character long RGIXCP signal becomes logic "1" and becomes logic "0" when the PYCKFF signal returns to logic "0" (equation 530-1). It is used to block the first eight control data bits stored in Main Buffer Means 74 from being checked for B.C.C. parity.

Data Detector logic 532 provides the IPUBCC signal in response to the MBSL1 (from FIG. 14K), MBSL2 (from FIG. 14K), MB10T (from FIG. 14G), MB20T (from FIG. 14G), RGIXCP (from FIG. 14F), RGLRCP (from FIG. 14F), and ENBCPY signals according to the logical equations:

IPUBCC=ENBCPY (MB20T MBSL2
+MB10T MBSL1) RGIXCP
$\overline{RGLRCP}$ ---------------------- (1–3) 532–1
$\overline{RGLRCP}=\overline{(RGLRCP)}$ ---------------- (4) 532–2

The IPUBCC signal reflects the B.C.C. code and B.C.D. data stored in Main Buffer A76 with a one bit time delay when the MBSL1 signal is logic "1," and the B.C.C. code and B.C.D. data in Main Buffer B78 with a one bit time delay when the MBSL2 signal is logic "1," according to the MB20T MBSL1+MB10T MBSL1 term of equation 531–2. The IPUBCC signal is logic "0" when either the ENBCPY or $\overline{RGLRCP}$ signals are logic "0," so the first and last eight control data bits are not reflected by the IPUBCC signal; that is, only the B.C.D. character and B.C.C. code bits are so reflected.

Position 1 Logic 534 provides the BCHONE signal in response to the TB2, TB6, PYCKFF (from FIG. 14H), and IPUBCC signals according to the logical equations:

BCC1=(TB2+TB6) IPUBCC -------- (1–3) 534–1
BCC2=$\overline{(BCC1)}$ ---------------------- (2) 534–2
BCCONE=$\overline{(BCC1)}$ ------------------- (3) 534–3
BCHONE=(ONEBAR BCHONE
 +BCCONE $\overline{BCHONE}$) ---------- (1–3) 534–4
$\overline{BCHONE}=\overline{(BCHONE)}$ -------------- (4) 534–5
ONEBAR=$\overline{(BCC2)}$ ------------------ (3) 534–6

Position 2 Logic 536 provides the BCHTWO signal in response to the TB3, TB7, PYCKFF (from FIG. 14H), and IPUBCC signals according to the logical equations:

BCC11=(TB3+TB7) IPUBCC -------- (1–3) 536–1
BCC21=$\overline{(BCC11)}$ -------------------- (2) 536–2
BCCTWO=$\overline{(BCC11)}$ ------------------ (3) 536–3
BCHTWO=(BCCTWO $\overline{BCHTWO}$
 +TWOBAR BCHTWO) PYCKFF ---- (1–3) 536–4
$\overline{BCHTWO}=\overline{(BCHTWO)}$ -------------- (4) 536–5
TWOBAR=$\overline{(BCC21)}$ ------------------ (3) 536–6

Position 3 Logic 538 provides the BCHTRE signal in response to the TB4, TB8, PYCKFF (from FIG. 14H), and IPUBCC signals according to the logical equations:

BCC12=(TB4+TB8) IPUBCC -------- (1–3) 538–1
BCC22=$\overline{(BCC12)}$ -------------------- (2) 538–2
BCCTRE=$\overline{(BCC12)}$ ------------------ (3) 538–3
BCHTRE=(BCCTRE $\overline{BCHTRE}$+TREBAR
 BCHTRE) PYCKFF -------------- (1–3) 538–4
$\overline{BCHTRE}=\overline{(BCHTRE)}$ --------------- (4) 538–5
TREBAR=$\overline{(BCC22)}$ ------------------ (3) 538–6

Position 4 Logic 540 provides the BCHFOR signal in response to the TB1, TB5, PYCKFF (from FIG. 14H), and IPUBCC signals according to the logical equations:

BCC13=(TB1+TB5) IPUBCC -------- (1–3) 540–1
BCC23=$\overline{(BCC13)}$ -------------------- (2) 540–2
BCCFOR=$\overline{(BCC13)}$ ------------------ (3) 540–3
BCHFOR=(BCCFOR $\overline{BCHFOR}$
 +BCHFOR FORBAR) PYCKFF ----- (1–3) 540–4
$\overline{BCHFOR}=\overline{(BCHFOR)}$ -------------- (4) 540–5
FORBAR=$\overline{(BCC23)}$ ------------------ (3) 540–6

B.C.C. Parity Detector 542 provides the DAMNIT signal in response to the DIRBIT (from FIG. 14E), BCHONE, BCHTWO, BCHTRE, and BCHFOR signals according to the logical equations:

BCC41=$\overline{(BCHTWO+BCHFOR}$
 $\overline{+BCHONE+BCHTRE)}$ -------------- (4) 542–1
DAMNIT=$\overline{(DAMNIT\#1\ DAMNIT\#2)}$ -- (3) 542–2
DAMNIT#1=(BCC41 $\overline{DIRBIT}$) -------- (1) 542–3
DAMNIT#2= $\overline{(DIRBIT\ BCHFOR}$
 $\overline{BCHONE\ BCHTWO\ BCHTRE)}$ ------ (1) 542–4
$\overline{DIRBIT}=\overline{(DIRBIT)}$ ------------------ (4) 542–5

The first position, or least significant, bit of each B.C.D. character appears as the MB10T or MB20T signal during either time TB1 or time TB5. Thus, it appears as the IPUBCC signal during time TB2 or time TB6. Similarly, the second position bit appears as the IPUBCC signal during times TB3 and TB7, the third position bit appears as the IPUBCC signal during times TB4 and TB8, and the fourth position, or most significant, bit appears as the IPUBCC signal during times TB5 and TB1. Each first position bit is applied to Position 1 Logic 534 by having the TB2 and TB6 signals enable the BCC1 gate included therein (equation 534–1). If the first position bit is logic "1," the BCCONE signal becomes logic "1" (equation 534–3), and, if the first position bit is logic "0," the ONEBAR signal becomes logic "1" (equations 534–2 and 534–6). The PYCKFF logic "1" signal enabled the previously reset BCHONE latch in Position 1 Logic 534, and this latch is set by the first logic "1" BCCONE signal and reset by the second logic "1" BCCONE signal, and this continues so that after an odd number of logic "1" first position bits occur, the BCHONE signal is logic "1," and after an even number of logic "1" first position bits occur, the BCHONE signal is logic "0." The first logic "1" BCCONE signal sets the BCHONE latch because the BCCONE $\overline{BCHONE}$ term of equation 534–4 is logic "1." This causes the BCHONE signal to become logic "1" and the $\overline{BCHONE}$ signal to become logic "0." After the BCCONE signal returns to logic "0," the ONEBAR signal is logic "1," and the ONEBAR BCHONE term of equation 534–4 keeps BCHONE latch set. The next logic "1" IPUBCC signal during either time TB2 or TB6 causes the BCCONE signal to become logic "1" and the ONEBAR signal to become logic "0." Since the BCHONE signal is still logic "1" and the $\overline{BCHONE}$ signal is still logic "0," the ONEBAR BCHONE+BCCONE $\overline{BCHONE}$ term of equation 534–4 is logic "0," and the BCHONE latch is reset. The next logic "1" IPUBCC signal occurring during time TB2 or TB6 will then set the BCHONE latch as previously explained.

The operation of Position 2 Logic 536, Position 3 Logic 538 and Position 4 Logic 540 is similar to the operation of Position "1" logic for the second, third, and fourth position bits, respectively.

It should be noted that logic "0" IPUBCC signals do not affect the BCHONE, BCHTWO, BCHTRE, or BCHFOR latch; therefore the four logic "0" dummy bits do not affect the B.C.C. parity.

In the event of a forward direction scan, there should be an even number of logic "1" bits for each position, so, after all the bits have been checked, each of the BCHONE, BCHTWO, BCHTRE, and BCHFOR signals should be logic "0." If this is the case, the BCC41 signal in B.C.C. Parity Detector 542 will be logic "1" (equation 542–1), and a logic "1" $\overline{DIRBIT}$ signal, indicating a forward direction scan, causes the DAMNIT signal to become logic "1" (equations 542–3 and 542–2). If a reverse direction scan had occurred, there will be an odd number of logic "1" bits for each position due to complementing the four logic "0" dummy bits, and, therefore, if proper B.C.C. parity is present, each of the BCHONE, BCHTWO, BCHTRE, and BCHFOR signals will be logic "1." For the reverse direction scan, the DIRBIT signal is logic "1," and, thus, a proper parity is shown by the DAMNIT#2 signal becoming logic "0" (equation 542–4) and thereby causing the DAMNIT signal to become logic "1" (equation 542–2).

Final Parity Check Logic 544 provides the PYOK and PYERRT signals in response to the PYCKPL (from FIG. 14H), MBMODZ, $\overline{MBMODZ}$, LBMODZ, $\overline{LBMODZ}$, MODLB1, $\overline{\text{MODLB1}}$, MODMB1, $\overline{\text{MODMB1}}$, and DAMNIT signals according to the logical equations:

BCC14=PYCKPL ($\overline{\text{MODMB1}}$ $\overline{\text{MODLB1}}$
$\overline{\text{MBMODZ}}$ $\overline{\text{LBMODZ}}$+MODLB1
LBMODZ+MBMODZ MODMB1)
DAMNIT _____ (1–3) 544–1
BCC24=$\overline{\text{(BCC14)}}$ _____ (2) 544–2
PYERRT=$\overline{\text{(BCC24)}}$ _____ (3) 544–3
PYOK=$\overline{\text{(BCC14)}}$ _____ (3) 544–4

The PYOK signal becomes logic "1" one bit time after the PYCKPL signal becomes logic "1" during time TB3 (this being the same time as the RSTRPY signal in FIG. 14H becomes logic "1") if a valid MOD3 and B.C.C. parity check has occurred. The PYERRT signal is the complement of the PYOK signal. The MOD3 parity is valid if both Counters 519 and 523 have the same count when the PYCKPL signal becomes logic "1"; that is, if both the MBMODZ and MODMB1 signals are logic "1," or if both the LBMODZ and MODLB1 signals are logic "1," or if all four of the $\overline{\text{MBMODZ}}$, $\overline{\text{LBMODZ}}$, $\overline{\text{MODMB1}}$, and $\overline{\text{MODLB1}}$ signals are logic "1." If the DAMNIT signal is also logic "1" when the PYCKPL signal becomes logic "1" during time TB2, a good B.C.C. parity occurs, and during time TB3 the PYOK signal becomes logic "1" (equations 544–1 and 544–4) and the PYERRT signal becomes logic "0" (equations 544–2 and 544–3). If one or both of the MOD3 and B.C.C. parity checks fail, the PYOK signal remains logic "0," and the PYERRT signal remains logic "1."

The Last Character Logic and Data Loop Field Control Logic 546 is also shown in FIG. 14I. This will be discussed hereinafter, as will Interface Means 88, shown in FIG. 14J.

Referring now to FIG. 14K, there are shown Main Buffer Select Logic 548, Character Pulse Generator Logic 116, and Data Loop Control Logic 552. Main Buffer Select Logic 548 includes MBMRY1 Logic 554, MBMRY2 Logic 556, Reset Parity and Set Data Loops Logic 558, Main Buffer A Select Logic 560, and Main Buffer B Select Logic 562.

MBMRY1 logic provides the MBMRY1 and $\overline{\text{MBMRY1}}$ signals in response to the MBSL1, $\overline{\text{RETRAN}}$ (from FIG. 14J), GSCDFT (from FIG. 14H), PTYSEQ (from FIG. 14H), $\overline{\text{DIRBIT}}$ (from FIG. 14E), PYLOP2 (from FIG. 14H), GOTOLP2 (from FIG. 14J), DATSEQ, and RTPSDT signals according to the logical equations:

MBMRY1=(MBSL1 $\overline{\text{DIRBIT}}$ GSCDFT
(PYLOP2+GOTOLP2)+MBMRY1)
$\overline{\text{RETRAN}}$ (DATSEQ+PTYSEQ)
RTPSDT _____ (1–3) 554–1
$\overline{\text{MBMRY1}}$=$\overline{\text{(MBMRY1)}}$ _____ (4) 554–2

MBMRY2 logic provides the MBMRY2 and $\overline{\text{MBMRY2}}$ signals in response to the RTPSDT, DATSEQ, GOTOLP2 (from FIG. 14J), PYLOP2 (from FIG. 14H), DIRBIT (from FIG. 14E), PTYSEQ (from FIG. 14H), GSCFT (from FIG. 14H), $\overline{\text{RETRAN}}$ (from FIG. 14J), and MBSL2 signals according to the logical equations:

MBMRY2=(MBSL2 DIRBIT GSCDFT
PYLOP2+GOTOLP2)+MBMRY2)
$\overline{\text{RETRAN}}$ (PTYSEQ+DATSEQ)
RTPSDT _____ (1–3) 556–1
$\overline{\text{MBMRY2}}$=$\overline{\text{(MBMRY2)}}$ _____ (4) 556–2

The $\overline{\text{RETRAN}}$ signal is logic "1" unless Utilization Device 89 instructs Interface Means 88 that a retransmission of the data is necessary. The GOTOLP2 signal becomes logic "1" after data for data field 22, shown in FIG. 2B, has been transferred to Utilization Device 89. The DATSEQ signal is logic "1" during the data transfer portion of operation.

Reset Parity and Set Data Loops logic 558 provides the RTPSDT and SETDTQ signals in response to the GPSFIT, GF1PY, GF12PY, ER2, and SMPYOK signals, all from FIG. 14H, in response to the logical equations:

RTPSDT=$\overline{\text{(RTPY2)}}$ _____ (3) 558–1
RTPY1=SMPYOK (GF1PY (GF12PY+
ER2)+GPSFIT) _____ (1) 558–2
RTPY2=$\overline{\text{(RTPY1)}}$ _____ (2) 558–3
RTPY3=$\overline{\text{(RTPY1)}}$ _____ (3) 558–4
SETDTQ=RTPY3 _____ (1–3) 558–5

Main Buffer A Select logic 560 provides the MBSL1 signal in response to the $\overline{\text{DIRBIT}}$ (from FIG. 14E), F1DINB1 (from FIG. 14H), GSCDFT (from FIG. 14H), GSCSFT (from FIG. 14H), $\overline{\text{MBMRY1}}$, and MBMRY2 signals according to the logical equation:

MBSL1=($\overline{\text{DIRBIT}}$ GSCDFT+
F1DINB1+GSCSFT+MBMRY2)
$\overline{\text{MBMRY1}}$ _____ (1–3) 560–1

Main Buffer B Select logic 562 provides the MBSL2 signal in response to the DIRBIT (from FIG. 14E), GSCDFT (from FIG. 14H), MBMRY1, and $\overline{\text{MBMRY2}}$ signals according to the logical equation:

MBSL2=(DIRBIT GSCDFT+MBMRY1)
$\overline{\text{MBMRY2}}$ _____ (1–3) 562–1

In either the data transmit or parity check portions of operation, data is first transferred from Main Buffer A76 when one of the GSCSFT or F1DINB1 signals is logic "1," or when both of the $\overline{\text{DIRBIT}}$ and GSCDFT signals are logic "1," and data is transferred from Main Buffer B when both of the DIRBIT and GSCDFT signals are logic "1." When the GSCDFT signal is logic "1," the data is transferred from the other one of Main Buffers A and B76 and 78 after it is transferred from the first one.

Prior to any data transfer, the MBSL1, MBSL2, MBMRY1, and MBMRY2 signals are logic "0," and the $\overline{\text{MBMRY1}}$ and $\overline{\text{MBMRY2}}$ signals are logic "1." When either one of the GSCSFT or F1DINB1 signals, or both of the GSCDFT and $\overline{\text{DIRBIT}}$ signals, become logic "1," the MBSL1 signal becomes logic "1" one bit time later (equation 560–1). If one of the GSCSFT or F1DINB1 signals is logic "1" and the parity is found valid, the RTPSDT signal becomes logic "0" (equations 558–1, 558–2, and 558–3). This resets the PTYSEQ latch in FIG. 14H, thereby ending the parity check portion of operation. If the GSCDFT and $\overline{\text{DIRBIT}}$ signals are logic "1," the MBMRY1 latch is set after the data transfer for Main Buffer A76 is complete (equation 554–1). If the data transfer is for parity checking, this occurs when the PYLOP2 signal becomes logic "1" according to the (MBSL1 $\overline{\text{DIRBIT}}$ GSCDFT PYLOP2+MBMRY1) $\overline{\text{RETRAN}}$ PTYSEQ RTPSDT term of equation 554–1, and, if the data transfer is for the data transmit portion of operation, this occurs when GOTOLP2 signal becomes logic "1" according to the (MBSL1 $\overline{\text{DIRBIT}}$ GSCDFT GOTOLP2+MBMRY1) $\overline{\text{RETRAN}}$ DATSEQ RTPSDT term of equation 554–1. When the MBMRY1 latch is set, the MBMRY1 signal becomes logic "0" and causes the MBSL1 signal to become logic "0" (equation 560–1). Also, when the MBMRY1 latch is set, the MBMRY1 signal becomes logic "1," and this causes the MBSL2 signal to become logic "1" according to the MBMRY1 $\overline{\text{MBMRY2}}$ term of equation 562–1.

If the parity check portion of operation is occurring and the parity is found valid, both the GF1PY and GF12PY signals will be logic "1," and this will cause the RTPSDT signal to become logic "0" (equations 558–1, 558–2, and 558–3). This, in turn, causes the MBMRY1 latch to be reset (equation 554–1), which causes the MBSL2 signal to return to logic "0" (equation 560–1). If the data transfer had been in the data transmit portion of operation, the DATSEQ signal would become logic "0" after the data had all been transmitted and cause the MBMRY1 latch to be reset (equation 554–1), which would cause the MBSL2 signal to become logic "0." It should be noted that, whenever the RTPSDT signal becomes logic "0," the SETDTQ signal becomes logic "1" one bit time later (equations 558–2, 558–4, and 558–5). It should also be noted that, if the parity check for the second field fails, the ER2 signal becomes logic "1," and this and the GP1FY logic "1" signal cause the RTPSDT signal to become logic "0" and the SETDTQ signal to become logic "1."

Where the GSCDFT and DIRBIT signals are logic "1," the MBSL2 signal becomes logic "1" (equation 562–1), and the MBMRY2 latch is set by either the PYLOP2 or GOTOLP2 signals (equation 556–1). This then causes the MBSL1 signal to become logic "1" (equation 560–1) and the MBSL2 signal to become logic "0" (equation 562–1). After a good parity check, the logic "0" RTPSDT signal resets the MBMRY2 latch (equation 556–1), which causes the MBSL1 signal to return to logic "0," and, after all of the data is transmitted, the DATSEQ signal returns to logic "0" and resets the MBMRY2 latch, which causes the MBSL1 signal to become logic "0."

The data transmit portion of operation, in which the data stored in Main Buffer Means 74 is transferred to Utilization Device 89, is controlled by Data Loop Control Logic 552, which includes Data Sequence Latch 564, SCDTMY Logic 566, Load Size Code logic 568, Enable Data Transmit logic 570, DSTMRY logic 572, and O.B. Control logic 574. The data transmit portion of operation is further controlled by the Last Character Logic and Data Loop Field Control Logic 546 in FIG. 14I, which includes Reset Data Control logic 576, Last Character Latch 568, ENDF1D logic 580, SMPFTW logic 582, and GOTOF2 logic 584.

Data Squence Latch 564 provides the DATSEQ and $\overline{\text{DATSEQ}}$ signals in response to the SETDTQ, $\overline{\text{INIT}}$, $\overline{\text{TCIR}}$, $\overline{\text{ER1}}$ (from FIG. 14H), and $\overline{\text{PTYSEQ}}$ (from FIG. 14H) signals according to the logical equations:

DATSEQ = $\overline{\text{TCIR}}$ $\overline{\text{INIT}}$ $\overline{\text{ER1}}$ $\overline{\text{PTYSEQ}}$
 (SETDTQ+DATSEQ) _____ (1–3) 564–1
$\overline{\text{DATSEQ}} = \overline{(\text{DATSEQ})}$ _____ (4) 564–2
$\overline{\text{PTYSEQ}} = \overline{(\text{PTYSEQ})}$ _____ (4) 564–3

SCDTMY logic 566 provides the SCDTMY and $\overline{\text{SCDTMY}}$ signals in response to the SETDTQ, DATSEQ, GOTOLP2 (from FIG. 14J), RETRAN (from FIG. 14J), and SETDMY (from FIG. 14F) signals according to the logical equations:

DATLP1 = SETDTQ _____ (1–3) 566–1
SCDTMY = (SCDTMY+RETRAN
 +DATLP1+GOTOLP2) $\overline{\text{SETDMY}}$
 DATSEQ _____ (1–3) 566–2
$\overline{\text{SCDTMY}} = \overline{(\text{SCDTMY})}$ _____ (4) 566–3
$\overline{\text{SETDMY}} = \overline{(\text{SETDMY})}$ _____ (4) 566–4

The Load Size Code logic 568 provides the SCDTOT and $\overline{\text{SCDTOT}}$ signals in response to the SCDTMY, GPSFIT (from FIG. 14H), GPF1DFT (from FIG. 14H), GPYDFT (from FIG. 14H), and $\overline{\text{DATAOT}}$ signals according to the logical equations:

SCDTOT = SCDTMY $\overline{\text{DATAOT}}$
 (GPSFIT+GPF1DFT+GPYDFT) ___ (1–3) 568–1
$\overline{\text{SCDTOT}} = \overline{(\text{SCDTOT})}$ _____ (4) 568–2

Enable Data Transmit logic 570 provides the DATAOT and $\overline{\text{DATAOT}}$ signals in response to the $\overline{\text{SCDTMY}}$, $\overline{\text{SCDTOT}}$, and DTSMRY signals according to the logical equations:

$\overline{\text{DATAOT}} = \overline{(\text{DATAOT})}$ _____ (4) 570–1

DATAOT = DTSMRY $\overline{\text{SCDTOT}}$
 $\overline{\text{SCDTMY}}$ _____ (1–3) 570–2

The DTSMRY signal is provided by DTSMRY logic 572 in response to the DATSEQ, SETDMY (from FIG. 14F), and RSTDAT (from FIG. 14I) signals according to the logical equation:

DTSMRY = (DTSMRY+SETDMY)
 $\overline{\text{RSTDAT}}$ DATSEQ _____ (1–3) 572–1

The SCPYDT and NPYDLT signals are provided by O.B. Control logic 574 in response to the SCPYOT (from FIG. 14H), SCDTOT, and DATAOT signals according to the logical equations:

NPYDLT = DATAOT+SCPYDT _____ (1–3) 574–1
SCPYDT = SCPTOT+SCPYOT _____ (1–3) 574–2

In Last Character Logic and Data Loop Field Control Logic 546 in FIG. 14I, the RSTDAT signal is provided by Reset Data Control logic 576 in response to the RGIXCP (from FIG. 14F), LRIXCP (from FIG. 14F), DATAOT (from FIG. 14K), and TB6 signals according to the logical equation:

RSTDAT = RGIXCP DATAOT LRIXCP
 TB6 _____ (1–3) 576–1

Last Character Latch 578 provides the LTCHLH and $\overline{\text{LTCHLH}}$ signals in response to the ENDFID, GPSFIT (from FIG. 14H), GPF1DFT (from FIG. 14H), $\overline{\text{RETRAN}}$ (from FIG. 14J), and RSTDAT signals according to the logical equations:

LTCHLH = (LTCHLH+RSTDAT)
 (GPSF1T+GPF1DFT+ENDF1D)
 $\overline{\text{RETRAN}}$ _____ (1–3) 578–1
$\overline{\text{LTCHLH}} = \overline{(\text{LTCHLH})}$ _____ (4) 578–2

The ENDF1D signal is provided from ENDF1D logic 580 in response to the $\overline{\text{RETRAN}}$ (from FIG. 14J), GPYDFT (from FIG. 14H), and RSTDAT signals according to the logical equation:

ENDF1D = (RSTDAT+ENDF1D)
 $\overline{\text{RETRAN}}$ GYPDFT _____ (1–3) 580–1

The SMPFTW signal is provided from SMPFTW logic 582 in response to the RSTDAT signal according to the logical equation:

SMPFTW = RSTDAT _____ (1–3) 582–1

The GOTOF2 signal is provided from GOTOF2 logic 584 in response to the $\overline{\text{LTCHLH}}$ and SMPFTW signals according to the logical equation:

GOTOF2 = $\overline{\text{LTCHLH}}$ SMPFTW _____ (1–3) 584–1

After the parity check has been performed and there is data ready for transfer to Utilization Device 89, the SETDTQ signal from Reset Parity and Set Data Loops logic 558 become logic "1" during time TB6. The DATSEQ latch in Data Sequence Latch 564 is enabled by $\overline{\text{INIT}}$, $\overline{\text{TCIR}}$, $\overline{\text{ER1}}$, and $\overline{\text{PTYSEQ}}$ signals all being logic "1," and, when the logic "1" SETDTQ signal occurs, it becomes set, so that the DATSEQ signal becomes logic "1" and the $\overline{\text{DATSEQ}}$ signal becomes logic "0" (equations 564–1 and 564–2). The logic "1" DATSEQ signal and the logic "1" DATLP1 signal, which is the SETDTQ signal delayed one bit time (equation 566–1), set the SCDTMY latch in SCDTMY logic 566 and cause the SCDTMY signal to become logic "1" (equation 566–2) and the $\overline{\text{SCDTMY}}$ sigal to become logic "0" (equation 566–3).

Where there is at least one field of data ready for transfer to Utilization Device 89, one of the GPSFIT, GPF1DFT, or GPYDFT signals will be logic "1," and the logic "1" SCDTMY signal is applied to cause the SCDTOT signal provided by Load Size Code logic 568 to become logic "1" (equation 568–1) and the $\overline{\text{SCDTOT}}$ signal to become logic "0" at time TB1. One bit time after SCDTOT signal becomes logic "1," the SCPYDT signal provided from O.B. Control logic 574 becomes logic "1" (equation 574–1). The SCPYDT signal also becomes logic "1" one bit time after the SCPTOT signal from Parity Check Control Circuit 496 in FIG. 14H became logic "1" (equation 574–2). One bit time after the SCPYDT signal becomes logic "1," the NPYDLT signal becomes logic "1" (equation 574–1). The NPYDLT logic "1" signal allows the first character in Main Buffer A76 or Main Buffer B78, depending upon which of the MBSL1 or MBSL2 is logic "1," to be transferred to the Output Buffer 442, and the SCPYDT signal causes the LLR latch to be set, thereby causing the LLRBDY signal to become logic "1" from the following TB1 through TB8 time and the size code to be transferred to Limit Register Counter 406. As previously explained with respect to ADDTWO logic 402 in FIG. 14F, when the LLRBDY and SCDTOT signals are both logic "1" during time TB8, the SETDMY signal becomes logic "1" during the following TB1 time. Thus, the $\overline{\text{SETDMY}}$ signal becomes logic "0" during this time (equation 566–4), and this resets the SCDTMY latch (equation 566–2), causing the SCDTMY signal to again become logic "0," and the SCDTMY signal to again become logic "1." The logic "0" SCDTMY signal causes the SCDTOT signal to become logic "0" and the $\overline{\text{SCDTOT}}$ signal to become logic "1" (equations 568–1 and 568–2), as well as causing the SCPYDT and NPYDLT signals to become logic "0" (equations 574–1 and 574–2).

The logic "1" SETDMY signal, which is also applied to DSTMRY logic 572, sets the DSTMRY latch, as long as the DATSEQ signal is logic "1," causing the DSTMRY signal to become logic "1" (equation 572–1). The logic "1" $\overline{\text{SCDTMY}}$, $\overline{\text{SCDTOT}}$, and DSTMRY signals cause the DATAOT signal to then become logic "1" (equation 570–2) and the $\overline{\text{DATAOT}}$ signal to become logic "0" (equation 570–1). Thereafter, the data stored in one of the Main Buffers A or B76 or 78 is transferred through the Output Buffer 42 and Interface Means 88 to Utilization Device 89.

Referring now to Last Character Logic Data Loop Field Control Logic 546 in FIG. 14I, when the RGIXCP and LRIXCP signals both are logic "1," the last eight bit character of data is being transferred to Output Buffer 442. During time TB7 of this transfer, the RSTDAT signal becomes logic "1" (equation 576–1), and, one bit time later, the SMPFTW signal becomes logic "1" (equation 582–1). The RSTDAT logic "1" signal is applied to DSTMRY logic 572 in FIG. 14K and resets the DSTMRY signal to logic "0" (equation 572–1). The logic "0" DSTMRY signal causes the DATAOT signal to become logic "0" one bit time later (equation 570–2).

In the case where there is data in both Main Buffer A76 and Main Buffer B78 ready for transfer, the GPYDFT signal is logic "1," and the RSTDAT logic "1" signal sets the ENDF1D latch in ENDF1D logic 580, causing the ENDF1D signal to become logic "1" (equation 580–1), assuming that the $\overline{\text{RETRAN}}$ signal is logic "0," indicating that no retransmission of data is necessary.

The LTCHLH latch in Last Character Latch 578 is set by one of the GPSFIT, GPF1DFT, or ENDF1D signals being logic "1" when the RSTDAT signal becomes logic "1," and this causes the LTCHLH signal to become logic "1" and the $\overline{\text{LTCHLH}}$ signal to become logic "0" (equations 578–1 and 578–2). Thus, for a single field tag, or a double field tage with valid data only in field 22 shown in FIG. 2A, the LTCHLH signal becomes logic "1" after the first RSTDAT logic "1" signal. However, for a double field tag with valid data for both fields, the LTCHLH signal does not become logic "1" until the RSTDAT signal becomes logic "1" a second time; that is, until after the data in the second field is transferred. In the case of a double field stage with valid data for both fields, the logic "1" SMPFTW and $\overline{\text{LTCHLH}}$ signals occuring one bit time after the first RSTDAT logic "1" signal cause the GOTOF2 signal to become "1" (equation 584–1). This signal is applied to Interface Means 88 to cause a logic "1" GOTOLP2 signal to be provided to again set the SCDTMY latch in SCDTMY logic 566 and initiate the transfer of data as explained above. Also, a logic "1" RETRAN signal causes the SCDTMY latch to be set to initiate a new data transfer.

Character Pulse Generator logic 550 is used in the parity check and data transmit portion of operation and includes PYFBK7 logic 586, CPGENO logic 590, FBFLT7 logic 592 $\overline{\text{CPGENT}}$ logic 594, and Character Pulse logic 596. PYFBK7 logic 586 provides the PYFBK7 signal in response to the PYCKFF (from FIG. 14H), $\overline{\text{PYCKFF}}$ (from FIG. 14H), SCPYOT (from FIG. 14H), $\overline{\text{SCPYOT}}$ (from FIG. 14H), SCDTOT, CPGENO, and DATAOT signals according to the logical equation:

PYFBK7 = $\overline{\text{CPGENO}}$ (SCDTOT $\overline{\text{DATAOT}}$

+ SCPYOT $\overline{\text{PYCKFF}}$ + PYCKFF $\overline{\text{SCPYOT}}$) _____ (1–3) 586–1

CPGENO logic 590 provides the CPGENO and $\overline{\text{CPGENO}}$ signals in response to the SCDTOT, DATAOT, TB5, SCPYOT (from FIG. 14H), $\overline{\text{DIRBIT}}$ (from FIG. 14E), PYCKFF (from FIG. 14H), and CHPLOT signals according to the logical equations:

CPGENO = (DATAOT $\overline{\text{DIRBIT}}$

+ PYCKFF + SCPYOT + SCDTOT)

(CHPLOT TB5 + CPGENO) _____ (1–3) 590–1

$\overline{\text{CPGENO}} = \overline{\text{(CPGENO)}}$ _____ (4) 590–2

FBFLT7 logic 592 provides the FBFLT7 signal in response to the $\overline{\text{DIRBIT}}$ (from FIG. 14E), DIRBIT (from FIG. 14E), FDBKDOT (from FIG. 14L), $\overline{\text{CPGENT}}$, SCDTOT, and DATAOT signals according to the logical equation:

FBFLT7 = DATAOT $\overline{\text{SCDTOT}}$ (FDBKDOT

DIRBIT + $\overline{\text{DIRBIT}}$ $\overline{\text{CPGENT}}$) _____ (1–3) 592–1

$\overline{\text{CPGENT}}$ logic 594 provides the $\overline{\text{CPGENT}}$ signal in response to the DATAOT, CPGENO, $\overline{\text{DIRBIT}}$ (from FIG. 14E), and TB5 signals according to the logical equations:

CPGENT = DATAOT $\overline{\text{DIRBIT}}$ (CPGENO TB5 + CPGENT) _____ (1–3) 594–1

$\overline{\text{CPGENT}} = \overline{\text{(CPGENT)}}$ _____ (4) 594–2

Character Pulse logic 596 provides CHPLOT signal in response to the FBFLT7, PYFBK7, and TB7 signals according to the logical equation:

CHPLOT = (PYFBK7 + FBFLT7)

(TB7 + CHPLOT) _____ (1–3) 596–1

As has been stated previously, when the SCPYDT signal becomes logic "1" as a result of the SCPYOT or SCDTOT signals becoming logic "1" or when the PYCKFF signal becomes logic "1," the count in Index Register Counter 378 is incremented to one by a logic "1" one character long CHPLOT signal. This is accomplished by having either the SCDTOT and $\overline{\text{DATAOT}}$, the SCPYOT and $\overline{\text{PYCKFF}}$, or the PYCKFF and $\overline{\text{SCPYOT}}$ signals cause the PYFBK7 signal to become logic "1" as long as the $\overline{\text{CPGENO}}$ signal is logic "1" (equation 386–1). The logic "1" PYFBK7 signal will set the CHPLOT latch in Character Pulse logic 596 at time TB7, causing the CHPLOT signal to become logic "1" at time TB8 (equation 596–1). The logic "1" CHPLOT signal enables the CPGENO logic 590 to be set at the next TB5 time as long as one of the SCPYOT, SCDTOT, or PYCKFF signals or both of the DATAOT and $\overline{\text{DIRBIT}}$ signals are logic "1" (equation 590–1), thereby causing the CPGENO signal to become logic "1" at time TB6 and the $\overline{\text{CPGENO}}$ signal to become logic "0" at time TB6 (equation 590–2).

The logic "0" $\overline{\text{CPGENO}}$ signal causes the PYFBK signal to return to logic "0" during time TB7 (equation 586–1), which in turn resets the CHPLOT latch after TB8 (equation 596–1). Thus, the CHPLOT signal is logic "1" from time TB8 through TB7 and can be used to increment Index Register Counter 378 by one.

When the DATAOT signal becomes logic "1," the first character of data is ready for transfer. If the tag had been scanned in the forward direction ($\overline{\text{DIRBIT}}$ being logic "1"), the first character of data is in position two of Main Buffer Means 74. Thus, it is necessary to set the count in Index Register Counter 378 to two. To do this, a two character long CHPLOT logic "1" signal is provided. The FBFLT7 signal becomes logic "1" when the DATAOT $\overline{\text{SCDTOT}}$ $\overline{\text{DIRBIT}}$ $\overline{\text{CPGENT}}$ term of equation 592–1 becomes logic "1," which is when the $\overline{\text{SCDTOT}}$ signal becomes logic "1." At the following TB7 time, the FBFLT7 signal sets the CHPLOT latch (equation 596–1), causing the CHPLOT signal to become logic "1" at time TB8. At the next TB5 time, the logic "1" CHPLOT signal sets the CPGENO latch, causing the CPGENO signal to become logic "1" at time TB6 (equation 590–1). The logic "1" CPGENO, DATAOT, and $\overline{\text{DIRBIT}}$ signals set the CPGENT latch at the following TB5 time, causing the $\overline{\text{CPGENT}}$ signal to become logic "0" at time TB6 (equations 594–1 and 594–2). The logic "0" $\overline{\text{CPGENT}}$ signal causes the FBFLT7 signal to return to logic "0" at time TB6 (equation 592–1). This, in turn, resets the CHPLOT latch, causing the CHPLOT signal to become logic "0" at time TB7 (equation 596–1). Thus, the CHPLOT signal is logic "1," in this instance, for two character times.

If the tag had been scanned in the reverse direction, it is necessary to provide an $N+1$ character long logic "1" CHPLOT signal, so that the count in Index Register Counter 378 can be incremented to $N+1$, where N is the size code. For this, a logic "1" FDBKDOT signal is provided from FIG. 14L which becomes logic "1" at time TB6 and returns to logic "0" at time TB5 and is $N+1$ characters long. The DATAOT $\overline{\text{SCDTOT}}$ FDBKDOT DIRBIT term of equation 592–1 causes the FBFLT7 signal to become logic "1" for $N+1$ character times from TB7 through TB6. This, in turn, causes the CHPLOT signal to become logic "1" for $N+1$ character times from TB8 through TB7 (equation 596–1).

Data-Status Gate 598 shown in FIG. 14K will be discussed hereinafter with respect to Interface Means 88 shown in FIG. 14J.

Figure 14L:
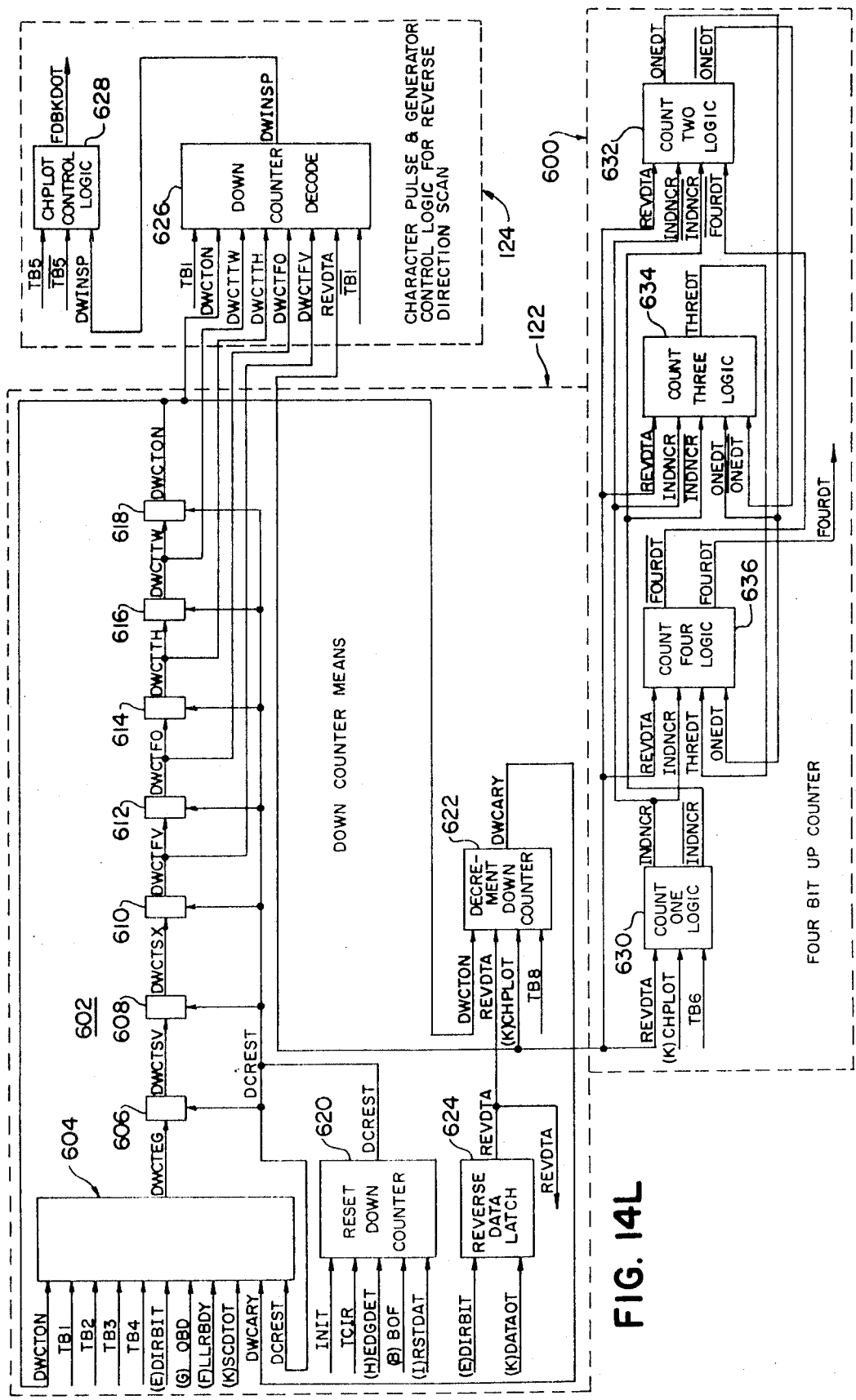

Reference is now made to FIG. 14L, where Down Counter Means 122, Character Pulse and Generator Control Logic for Reverse Direction Scan 124, and Four Bit Up Counter 600 are shown. This logic is used for providing the FDBKDOT signal to Character Pulse Generator Logic 116 in FIG. 14K to obtain the $N+1$ character long logic "1" CHPLOT signal used in the data transmit portion of operation for a reverse direction scan.

Down Counter Means 122 includes Down Counter 602 having most significant to least significant DWCTEG stage 604, DWCTSV stage 606, DWCTSX stage 608, DWCTFV stage 610, DECTFO stage 612, DWCTTH stage 614, DWCTTW stage 616, and DWCTON stage 618, which respectively provide the DWCTEG, DWCTSV, DWCTSX, DWCTFV, DWCTFO, DWCTTH, DWCTTW, and DWCTON signals. Each of these stages 606 to 618 (even numbers) is responsive to the signal provided by the stage next higher in significance thereto and to the DCREST signal. In addition, DWCTEG stage 604 is responsive to the DWCTON, TB1, TB2, TB3, TB4, DIRBIT (from FIG. 14E), OBD (from FIG. 14G), LLRBDY (from FIG. 14F), SCDTOT (from FIG. 14K), DWCARY, and DCREST signals. The logical equations for Down Counter 602 are:

DWCTEG=DCREST (DIRBIT SCDTOT LLRBDY ($\overline{\text{TB1}}$+$\overline{\text{TB2}}$+$\overline{\text{TB3}}$+$\overline{\text{TB4}}$) OBD+(DWCARY+DWCTON) DWCTEG#4 DWCTEG#41) _____ (1–3) 604–1

DWCTEG#41=$\overline{\text{(DIRBIT SCDTOT LLRBDY)}}$ _____ (4) 604–2

DWCTEG#4=$\overline{\text{(DWCTON DWCARY)}}$ __ (4) 604–3

DWCTFO=DCREST DWCTFV _____ (1–3) 612–1

DWCTFV=DCREST DWCTSX _____ (1–3) 610–1

DWCTON=DCREST DWCTTW _____ (1–3) 618–1

$\overline{\text{DWCTON}}$=$\overline{\text{(DWCTON)}}$ _____ (4) 618–2

DWCTSV=DCREST DWCTEG _____ (1–3) 606–1

DWCTSX=DCREST DWCTSV _____ (1–3) 608–1

DWCTTH=DCREST DWCTFO _____ (1–3) 614–1

DWCTTW=DCREST DWCTTH _____ (1–3) 616–1

The DCREST signal is provided by Reset Down Counter logic 620 in response to the INIT, TCIR, EDGDET (from FIG. 14H), BOF (from FIG. 14B), and RSTDAT (from FIG. 14I) signals according to the logical equation:

DCREST=$\overline{\text{(TCIR+INIT+EDGDET +BOF+RSTDAT)}}$ _____ (1–2–3) 620–1

The DWCARY signal is provided by Decrement Down Counter logic 622 in response to the DWCTON, REVDAT, CHPLOT (from FIG. 14K), and TB8 signals according to the logical equations:

DWCARY=REVDTA CHPLOT ($\overline{\text{DWCTON}}$ DWCARY+TB8) _____ (1–3) 622–1

$\overline{\text{DWCTON}}$=$\overline{\text{(DWCTON)}}$ _____ (4) 622–2

The REVDTA signal is provided from Reverse Data Latch 624 in response to the DIRBIT (from FIG. 14E) and DATAOT (from FIG. 14K) signals according to the logical equation:

REVDTA=DATAOT DIRBIT _____ (1–3) 624–1

Character Pulse and Generator Control logic for Reverse Direction Scan 124 includes Down Counter Decode logic 626 and CHPLOT Control logic 628. Down Counter Decode logic 626 provides the DWINSP signal in response to the TB1, DWCTON, DWCTTW, DWCTTH, DWCTFO, DWCFTV, REVDTA, and $\overline{\text{TB1}}$ signals according to the logical equation:

DWINSP=REVDTA (DWCTON +DWCTFO+DWCTTH+DWCTTW) TB1 $\overline{\text{DWCTFV}}$+DWINSP $\overline{\text{TB1}}$ _____ (1–3) 626–1

CHPLOT Control logic 628 provides the FDBKDOT signal in response to the TB5, $\overline{\text{TB5}}$, and DWINSP signals according to the logical equation:

FDBKDOT=FDBKDOT $\overline{\text{TB5}}$+TB5 DWINSP _____ (1–3) 628–1

Four Bit Up Counter 600 includes Count One stage 630, Count Two stage 632, Count Three stage 634, and Count Four stage 636. Count One stage 630 provides the INDNCR and $\overline{\text{INDNCR}}$ signals in response to the REVDTA, CHPLOT (from FIG. 14K), and TB6 signals according to the logical equations:

INDNCR=REVDTA CHPLOT TB6 ____ (1–3) 630–1

$\overline{\text{INDNCR}}$=$\overline{\text{(INDNCR)}}$ _____ (4) 630–2

Count Two stage 632 provides the ONEDT and $\overline{\text{ONEDT}}$ signals in response to the REVDTA, INDNCR, $\overline{\text{INDNCR}}$, and $\overline{\text{FOURDT}}$ signals according to the logical equations:

ONEDT=REVDTA (INDNCR $\overline{\text{FOURDT}}$ $\overline{\text{ONEDT}}$+$\overline{\text{INDNCR}}$ ONEDT) _____ (1–3) 632–1

$\overline{\text{ONEDT}}$=$\overline{\text{(ONEDT)}}$ _____ (4) 632–2

Count Three stage 634 provides provides the THREDT signal in response to the REVDTA, INDNCR, $\overline{\text{INDNCR}}$, ONEDT, and $\overline{\text{ONEDT}}$ signals according to the logical equations:

THRED = REVDTA (INDNCR (ONEDT $\overline{\text{THREDT}}$+THRERT $\overline{\text{ONEDT}}$)
+$\overline{\text{INDNCR}}$ THREDT) _____ (1–3) 634–1

$\overline{\text{THREDT}} = \overline{(\text{THREDT})}$ _____ (4) 634–2

Count Four stage 636 provides the FOURDT and $\overline{\text{FOURDT}}$ signals in response to the REVDTA, INDNCR, THREDT, and ONEDT signals according to the logical equations:

FOURDT = REVDTA (INDNCR ONEDT THREDT+FOURDT) _____ (1–3) 636–1

$\overline{\text{FOURDT}} = \overline{(\text{FOURDT})}$ _____ (4) 636–2

The DCREST signal, which is normaly logic "1," becomes logic "0" one bit time after any one of the TCIR, INIT, BOF, EDGDET, or RSTDAT signals become logic "1" (equation 620–1). The logic "0" DCREST signal causes the count in Down Counter 602 to become zero.

When the SCDTOT signal becomes logic "1" at the beginning of the data transmit portion of operation, the size code is transferred to Down Counter 602 according to the

DIRBIT SCDTOT LLRBDY (TB1+TB2+TB3+TB4)

OBD term of equation 604–1 in the same manner as previously explained with respect to Limit Register Counter 406 in FIG. 14F. Thus, when the SCDTOT signal returns to logic "0," the count in Down Counter 602 will be N, where N is the size code.

When the DATAOT signal then becomes logic "1," the REVDTA signal will be come logic "1" (equation 624–1). The logic "1" REVDTA signal enables the DWINSP latch in Down Count Decode logic 626 to become set after the following TB1 time, since this latch is set wherever a count between one and fifteen exists in Down Counter 602 at this time. At the next TB5 time, the logic "1" DWINSP signal sets the FDKBDOT latch in CHPLOT Control logic 628, causing the FDKBDOT signal to become logic "1" at time TB6 (equation 628–1). The DWINSP latch is reset when a logic "0" $\overline{\text{TB1}}$ signal occurs at the time a count of zero is in Down Counter 402 (equation 626–1). The FDKBDOT latch is reset during the time TB5 after the DWINSP signal returns to logic "0."

The logic "1" FDKBDOT signal causes the CHPLOT signal to become logic "1" at time TB8, as previously explained with respect to FIG. 14K. Each character time that the CHPLOT signal remains logic "1," a count of one is subtracted from the count in Down Counter 602. This is controlled by the (DWCARY+DWCTON) DWCTEG#4 term of equation 604–1. As long as both the CHPLOT and REVDTA signals are logic "1," the DWCARY latch in Decrement Down Counter logic 622 is set by every TB8 logic "1" signal and reset by the first logic "1" DWCTON signal (equation 622–1). Thus, the DWCARY signal becomes logic "1" at time TB1 and returns to logic "0" one bit time after a logic "1" DWCTON signal occurs. The DWCTEG#4 signal is logic "1" unless both the DWCARY and DWCTON signals are logic "1" (equation 604–3). Thus, if at time TB1, the DWCTON signal is logic "1," the DWCTEG#4 signal becomes logic "0," and a logic "0" is inserted as the DWCTEG signal at time TB2. Also, the DWCARY latch is reset, so no further action occurs. Thus, at the next TB1 time, the DWCTON signal is logic "0." If, at time TB1, the DWCTON signal was logic "0" and the DWCTTW signal was logic "1," the DWCTEG#4 signal would be logic "1" during time TB1, and the DWCARY latch would not be reset. Thus, a logic "1" DWCTEG signal would occur at time TB2. However, at time TB2, the DWCTEG#4 signal would become logic "0," and the DWCARY latch would be reset, so the DWCTEG signal would become logic "0" at time TB3. At the following time TB1, the DWCTTW signal would be logic "0," and the DWCTON signal would be logic "1." Thus, the count in Down Counter 602 would have been decremented from two to one.

Thus, N character times after the CHPLOT signal becomes logic "1," the count at TB1 time in Down Counter 602 is zero. This causes the DWINSP latch to be reset after time TB1, and the DWINSP signal becomes logic "0" after having been logic "1" for N+1 character times (it was logic "1" for a character time before the CHPLOT signal became logic "1"). The logic "0" DWINSP signal resets the FDBKDOT latch at the next TB5 time, causing the FDKBDOT signal to become logic "0." This causes the CHPLOT signal to become logic "0" following the next TB7 time. Thus, the CHPLOT signal had been logic "1" for N+1 character times.

Each character time that the CHPLOT signal is logic "1," a count of one will be added to Four Bit Up Counter 600, until the count thereof reaches four. Each character time that the CHPLOT signal is logic "1," the INDNCR signal from Count One logic 630 becomes logic "1" during time TB7, and the $\overline{\text{INDNCR}}$ signal becomes logic "0" during time TB7 (equations 630–1 and 630–2). This, of course, assumes that the REVDTA signal is logic "1."

The first INDNCR logic "1" signal sets the ONEDT latch in Count Two logic 632, since the REVDTA $\overline{\text{ONEDT}}$ and $\overline{\text{FOURDT}}$ signals are all logic "1" (equation 632–1). The second INDNCR logic "1" signal resets the ONEDT latch (equation 632–1) and sets the THREDT latch in Count Three logic 634, since the REVDTA, ONEDT, and $\overline{\text{THREDT}}$ signals are all logic "1" when it occurs (equation 634–1). The third INDNCR logic "1" signal sets the ONEDT latch in Count One logic 630, since the REVDTA, $\overline{\text{FOURDT}}$, and $\overline{\text{ONEDT}}$ signals are all logic "1" when it occurred. The fourth INDNCR signal will set the FOURDT latch in Count Four logic 636, since the REVDTA, ONEDT, and THREDT signals are all logic "1" when it occurs (equation 636–1) and will reset the ONEDT and THREDT latches. As previously explained, each character time that both the CHPLOT and FOURDT signals are logic "1," a count is subtracted from Limit Register Counter 406. Thus, when the CHPLOT signal returns to logic "0," a count of N+1 will be in Index Register Counter 378, and a count of three will be in Limit Register Counter 406, as is desired at the beginning of data transfer for a reverse direction scan.

Reference is now made to FIG. 14J and Data/Status Gate 598 in FIG. 14K, where Interface Means 88 is shown. Before this can be understood, it is necessary to understand the communication between Reader 60 and Utilization Device 89. Utilization Device 89 provides five signals to Interface Means 88, which are the TCDF, TCS, TCFF, TCTB8, and TCIR signals. The TCTB8 signal is logic "1" during each TB8 time and is used to synchronize the timing between Utilization Device 89 and Reader 60. The TCTB8 signal is applied to Timing Network 638, which provides the TB1, TB2, TB3, TB4, TB5, TB6, TB7, TB8, $\overline{\text{TB1}}$, $\overline{\text{TB2}}$, $\overline{\text{TB3}}$, $\overline{\text{TB4}}$, $\overline{\text{TB5}}$, $\overline{\text{TB6}}$, $\overline{\text{TB7}}$, and $\overline{\text{TB8}}$ timing signals in response thereto according to the logical equations:

TB8 = TB7 _____ (1–3) 638– 1
$\overline{\text{TB8}} = \overline{(\text{TB8})}$ _____ (4) 638– 2
TB7 = TB6 _____ (1–3) 638– 3
$\overline{\text{TB7}} = \overline{(\text{TB7})}$ _____ (4) 638– 4
TB6 = TB5 _____ (1–3) 638– 5
$\overline{\text{TB6}} = \overline{(\text{TB6})}$ _____ (4) 638– 6
TB5 = TB4 _____ (1–3) 638– 7
$\overline{\text{TB5}} = \overline{(\text{TB5})}$ _____ (4) 638– 8
TB4 = TB3 _____ (1–3) 638– 9

$\overline{TB4} = \overline{(TB4)}$ _____ (4) 638–10
TB3 = TB2 _____ (1–3) 638–11
$\overline{TB3} = \overline{(TB3)}$ _____ (4) 638–12
TB2 = TB1 _____ (1–3) 638–13
$\overline{TB2} = \overline{(TB2)}$ _____ (4) 638–14
TB1 = TCTB8 _____ (1–3) 638–15
$\overline{TB1} = \overline{(TB1)}$ _____ (4) 638–16

Each of the TB1 through TB8 signals is logic "1" during respective times TB1 through TB8 and logic "0" otherwise, and each of the $\overline{TB1}$ through $\overline{TB8}$ signals is logic "0" during respective times TB1 through TB8 and logic "1" otherwise.

The TCIR signal is a two character long logic "1" signal which occurs when the power to the system reaches the proper operating level. It causes the logic in Reader 60 to reset itself. The TCIR signal is applied to Terminal Reset Logic 640, which provides the TCIRBAR, $\overline{TCIR}$, and TCIR#4 signals in response thereto according to the logical equations:

$\overline{TCIR} = \overline{(TCIR)}$ _____ (4) 640–1
TCIR#4 = $\overline{(TCIRBAR)}$ _____ (4) 640–2
TCIRBAR = $\overline{(TCIR)}$ _____ (3) 640–3

The TCS signal is a strobe signal provided by Utilization Device 89 to inform Interface Means 88 that it is being communicated with. If it is not logic "1," Interface Means 88 will ignore the TCDF and TCFF signals. Hereinafter, it will be assumed to be logic "1."

The TCDF signal is an eight bit signal in which either data or function information can be sent to Interface Means 88. If the TCFF signal is logic "1," the information conveyed by the TCDF signal is function information which requires Reader 60 to perform some function, such as transmit data to Utilization Device 89. If the TCFF signal is logic "0," the information conveyed by the TCDF signal is data. In the case of Reader 60, the TCFF signal is always logic "1," since no data need be transferred to Reader 60. The TCDF signal can have three codes, which respectively are a logic "1" during either the TB5, TB6, or TB7 times, with logic "0" otherwise. In the event that the TCDF signal is logic "1" during time TB5, Utilization Device 89 is instructing Interface Means 88 to perform the Input Data function; that is, to send one B.C.D. character of data thereto. If the TCDF signal is logic "1," the information conveyed by the TCDF signal is function information which requires Reader 60 to perform some function, such as transmit data to Utilization Device 89. If the TCFF signal is logic "0," the information conveyed by the TCDF signal is data. In the case of Reader 60, the TCFF signal is always logic "1," since no data need be transferred to Reader 60. The TCDF signal can have three codes, which respectively are a logic "1" during either the TB5, TB6, or TB7 times, with logic "0" otherwise. In the event that the TCDF signal is logic "1" during time TB5, Utilization Device 89 is instructing Interface Means 88 to perform the Input Data function; that is, to send one B.C.D. character of data thereto. If the TCDF signal is logic "1" during time TB6, Utilization Device 89 is instructing Interface Means 88 to initialize Reader 60; that is, to clear the logic circuits therein, return to the IDLE status, and be ready to read a new tag. If the TCDF signal is logic "1" during time TB7, Utilization Device 89 is instructing Interface Means 88 to cause the data just transmitted to be retransmitted.

There are two signals which are set from Interface Means 88 to Utilization Device 89, and these are the UDF and UDS signals. The UDF signal is the data flag signal and is logic "1" when the UDS signal is sending data information, and logic "0" when the UDS signal is sending status information. The UDS signal sends an eight bit coded character of information representing either the status of Reader 60, or data being transmitted to Utilization Device 89. If the UDF signal is logic "1," the UDS signal will have the code shown by TABLE I most significant bit first below which have the indicated analog number meaning.

TABLE I

| Signal | Meaning | Signal | Meaning |
|---|---|---|---|
| 00110000 | 0 | 00110101 | 5 |
| 00110001 | 1 | 00110110 | 6 |
| 00110010 | 2 | 00110111 | 7 |
| 00110011 | 3 | 00111000 | 8 |
| 00110100 | 4 | 00111001 | 9 |

As can be seen from Table I, the four most significant bits of the UDS data signal are always 0–0–1–1, and the four least significant bits are the B.C.D. code for the numbers 0 through 9.

If the UDF signal is logic "0," the UDS signal represents status information. There are six possible status states which Reader 60 can assume, and these are Busy, Idle, Input Request, Last Character, Error 1, and Error 2. The Busy status means that the next character is being loaded into Output Buffer 442. The Idle status means that no data is ready for transfer. The Input Request status means that data is ready for transfer. The Last Character status means that the last character has been transferred. The Error 1 status means that no data will be transferred, and the tag must be rescanned in its entirety. The Error 2 status means that there is an error in the second field (field 24 in FIG. 2B) of a double field tag, but the data in the first field (field 22 in FIG. 2B) is ready for transfer. The UDS signal code most significant bit first for each of these status conditions is shown in Table II, below:

TABLE II

| Status name: | UDS Code |
|---|---|
| Busy | 00100000 |
| Idle | 00010000 |
| Input Request | 10000000 |
| Last Character | 11000000 |
| Error 1 | 00110000 |
| Error 2 | 10100000 |

As can be seen from Table II, the status code is contained in the four most significant bits, and the four least significant bits are logic "0."

In addition to Data/Status Gate 598 in FIG. 14K, Interface Means 88 includes Retransmit Logic 642, Input Data Latch 644, Idle Status Logic 646, Error 2 Status Set 648, Error 2 Status Logic 650, FLAGOT Logic 652, Transmit Field 2 Logic 654, Last Character Status Logic 656, Data/Function Logic 658, Input Request Status Logic 660, Busy Status Logic 662, Increment I.X.R. Logic 664, Second B.C.D. Character Latch 666, WTOUT Logic 668, and Initiate Logic 670.

Retransmit Logic 642 provides the RETRAN and $\overline{RETRAN}$ signals in response to the TCDF, TCS, TCFF, TB7, and LCH signals according to the logical equations:

RETRAN = TCS TCFF TB7 TCDF
LCH _____ (1–3) 642–1
$\overline{RETRAN} = \overline{(RETRAN)}$ _____ (4) 642–2

Input Data Latch 644 provides the INDL, DLS7, and $\overline{DLS8}$ signals in response to the $\overline{TB5}$, TB5, TCS, TCFF, TCDF, INREQ, and E22 signals according to the logical equations:

DLS7 = DLS _____ (1–3) 644–1
DLS8 = DLS7 _____ (1–3) 644–2
$\overline{DLS8} = \overline{(DLS8)}$ _____ (4) 644–3
DLS = TB5 INDL _____ (1–3) 644–4
INDL = TCS TCFF TB5 (INREQ+E22)
TCDF+$\overline{TB5}$ INDL _____ (1–3) 644–5

Idle Status Logic 646 provides the IDLE signal in response to the TB8, TCIR, INITD3, INITDBAR, ER1 (from FIG. 14H), DATAOT (from FIG. 14K), RGIXCP (from FIG. 14F), RETRAN, and $\overline{E28}$ signals according to the logical equations:

$$IDLE1 = \overline{(TCIR + INITD3 + RETRAN} \\ + IDLE\ \overline{E28}\ \overline{ER1})\ \ \ \ \ \ \ \ \ \ \ \ \ \ \ \ (1)\ \ 646-1$$

$$IDLE2 = \overline{(DATAOT\ RGIXCP\ INITDBAR} \\ \overline{TB8})\ \ \ \ \ \ \ \ \ \ \ \ \ \ \ \ \ \ \ \ \ \ \ \ \ \ \ \ \ (1)\ \ 646-2$$

$$IDLE3 = \overline{(IDLE2)}\ \ \ \ \ \ \ \ \ \ \ \ \ \ \ \ \ \ \ (2)\ \ 646-3$$

$$IDLE = \overline{(IDLE3 + IDLE1)}\ \ \ \ \ \ \ \ \ \ \ (3)\ \ 646-4$$

Error 2 Status Set logic 648 provides the E28 and $\overline{E28}$ signals in response to the IDLE, DATAOT (from FIG. 14K), RGIXCP (from FIG. 14F), ER2 (from FIG. 14H), and TB2 signals according to the logical equations:

$$E28 = IDLE\ ER2\ DATAOT\ RGISCP \\ TB7\ \ \ \ \ \ \ \ \ \ \ \ \ \ \ \ \ \ \ \ \ \ \ \ \ \ \ \ \ \ \ \ \ \ (1-3)\ \ 648-1$$

$$\overline{E28} = \overline{(E28)}\ \ \ \ \ \ \ \ \ \ \ \ \ \ \ \ \ \ \ \ \ (4)\ \ 648-2$$

Error Status logic 650 provides the E22 signal in response to the E28, $\overline{DLS8}$, TCIRBAR, and INITDBAR signals according to the logical equation:

$$E22 = E22\ TCIRBAR\ INITDBAR\ \overline{DLS8} \\ + E28\ \ \ \ \ \ \ \ \ \ \ \ \ \ \ \ \ \ \ \ \ \ \ \ \ \ \ \ \ \ \ (1-3)\ \ 650-1$$

FLAGOT logic 652 provides the FLAGOT and $\overline{FLAGOT}$ signals in response to the DATAFLAG and TB5 signals according to the logical equations:

$$FLAGOT = DATAFLAG\ TB5\ \ \ \ \ \ \ \ \ (1-3)\ \ 652-1$$

$$\overline{FLAGOT} = \overline{(FLAGOT)}\ \ \ \ \ \ \ \ \ \ \ (4)\ \ 652-2$$

Transmit Field 2 logic 654 provides the GOTOLP2 signal in response to the WTOUT, DATAFLAG, CH2LCHBAR, and TB8 signals according to the logical equation:

$$GOTOLP2 = WTOUT\ CH2LCHBAR \\ DATAFLAG\ TB8\ \ \ \ \ \ \ \ \ \ \ \ \ \ \ \ (1-3)\ \ 654-1$$

Last Character Status logic 656 provides the LCH signal in response to the TB8, LTCHLH (from FIG. 14I), TCIRBAR, INITDBAR, CH2LCHBAR, $\overline{RETRAN}$, and DATAFLAG signals according to the logical equation:

$$LCH = LCH\ TCIRBAR\ \overline{RETRAN} \\ INITDBAR + LTCHLH\ CH2LCHBAR \\ DATAFLAG\ TB8\ \ \ \ \ \ \ \ \ \ \ \ \ \ \ \ \ (1-3)\ \ 656-1$$

Data/Function logic 658 provides the DATAFLAG and DATAFLAG8 signals in response to the TCIRBAR, INITDBAR, $\overline{TB7}$, and DLS7 signals according to the logical equations:

$$DATAFLAG8 = DATAFLAG8\ TCIRBAR \\ INITDBAR\ \overline{TB7} + DLS7\ \ \ \ \ \ \ \ (1-3)\ \ 658-1$$

$$DATAFLAG = DATAFLAG8\ \ \ \ \ \ \ (1-3)\ \ 658-2$$

Input Request Status logic 660 provides the INREQ signal in response to the BUSY, IDLE, DATAFLAG, $\overline{DLS8}$, CH2LCH, TCIRBAR, INITDBAR, RGISCP (from FIG. 14F), DATAOT (from FIG. 14K), TB8, and $\overline{ER2}$ (from FIG. 14H) signals according to the logical equation:

$$INREQ = (IDLS\ \overline{ER2} + BUSY)\ DATAOT \\ RGIXCP\ TB8 + TCIRBAR\ INITDBAR \\ INREQ\ \overline{DLS8} + CH2LCH\ DATAFLAG \\ TB8\ \ \ \ \ \ \ \ \ \ \ \ \ \ \ \ \ \ \ \ \ \ \ \ \ \ \ \ \ \ \ \ \ \ \ \ (1-3)\ \ 660-1$$

Busy Status logic 662 provides the BUSY signal in response to the TD8, TB1, LTCHLH (from FIG. 14I), INITDBAR, CH2LCHBAR, DATAFLAG, and INREQ signals according to the logical equations:

$$BUSY = CH2LCHBAR\ DATAFLAG \\ LTCHLH\ TB8 + BUSY\ INITDBAR \\ BUSY\ \#4\ \ \ \ \ \ \ \ \ \ \ \ \ \ \ \ \ \ \ \ \ \ \ \ \ \ (1-3)\ \ 662-1$$

$$BUSY\#4 = \overline{(INREQ\ TB1)}\ \ \ \ \ \ \ \ \ (4)\ \ 662-2$$

Increment I.X.R. logic 664 provides the ADD1 signal in response to the $\overline{TB7}$, LTCHLH (FIG. 14I), INITDBAR, $\overline{WTOUT}$, CH2LCHBAR, and CH2LCHO signals according to the logical equation:

$$ADD1 = CH2LCHO\ CH2LCHBAR \\ LTCHLH\ \overline{WTOUT} + INITDBAR \\ ADD1\ \overline{TB7}\ \ \ \ \ \ \ \ \ \ \ \ \ \ \ \ \ \ \ \ \ \ \ \ (1-3)\ \ 664-1$$

Second B.C.D. Character Latch 666 provides the CH2LCHO, CH2LCH, and CH2LCHBAR signals in response to the TCIRBAR, INITD2, FLAGOT, and $\overline{FLAGOT}$ signals according to the logical equations:

$$CH2LCH = \overline{(INITD2 + CH2LCH\#1)}\ \ \ \ (3)\ \ 666-1$$

$$CH2LCHBAR = \overline{(CH2LCHBAR\#2)}\ \ \ \ (3)\ \ 666-2$$

$$CH2LCHBAR\#2 = CH2LCH\#1\ \ \ \ \ \ \ \ (2)\ \ 666-3$$

$$CH2LCHO = CH2LCH\ \ \ \ \ \ \ \ \ \ \ \ \ \ \ (1-3)\ \ 666-4$$

$$CH2LCH\#1 = \overline{(FLAGOT\ CH2LCHBAR} \\ + CH2LCH\ TCIRBAR\ \overline{FLAGOT})\ \ \ (1)\ \ 666-5$$

WTOUT logic 668 provides the WTOUT and $\overline{WTOUT}$ signals in response to the CH2LCHBAR, DATAFLAG, TB8, TCIRBAR, INITDBAR, and GOTOF2 (from FIG. 14I) signals according to the logical equations:

$$WTOUT = WTOUT\ TCIRBAR\ INITDBAR \\ WTOUT\#4 + GOTOF2\ \ \ \ \ \ \ \ \ \ \ \ (1-3)\ \ 668-1$$

$$\overline{WTOUT} = \overline{(WTOUT)}\ \ \ \ \ \ \ \ \ \ \ \ \ \ (4)\ \ 668-2$$

$$WTOUT\#4 = \overline{(CH2LCHBAR\ TB8} \\ \overline{DATAFLAG)}\ \ \ \ \ \ \ \ \ \ \ \ \ \ \ \ \ \ \ \ \ \ (4)\ \ 668-3$$

Initiate logic 670 provides the $\overline{INIT}$, INIT, INITDBAR, INITD2, INITD1, and INITD3 signals in response to the TCDF, TCFF, TCS, and TB6 signals according to the logical equations:

$$INID1 = INITD\ \ \ \ \ \ \ \ \ \ \ \ \ \ \ \ \ \ \ \ \ \ (1-3)\ \ 670-1$$

$$INID2 = INID1\ \ \ \ \ \ \ \ \ \ \ \ \ \ \ \ \ \ \ \ \ \ (1-3)\ \ 670-2$$

$$INID3 = INID2\ \ \ \ \ \ \ \ \ \ \ \ \ \ \ \ \ \ \ \ \ \ (1-3)\ \ 670-3$$

$$INITD2 = \overline{(INITD\#1)}\ \ \ \ \ \ \ \ \ \ \ \ \ \ (2)\ \ 670-4$$

$$INITD = \overline{(INIDTD\#1)}\ \ \ \ \ \ \ \ \ \ \ \ (3)\ \ 670-5$$

$$INITDBAR = \overline{(INITD2)}\ \ \ \ \ \ \ \ \ \ \ (3)\ \ 670-6$$

$$INITD\#1 = \overline{(INIT)}\ \ \ \ \ \ \ \ \ \ \ \ \ \ \ \ (1)\ \ 670-7$$

$$INIT = (TCS\ TCFF\ TCDF\ TB6)\ \ \ \ \ \ (1)\ \ 670-8$$

$$\overline{INIT} = \overline{(INIT)}\ \ \ \ \ \ \ \ \ \ \ \ \ \ \ \ \ \ \ \ (4)\ \ 670-9$$

Data/Status Gate 598 in FIG. 14K provides the MSRDS signal in response to the TB4, TB5, TB6, TB7, E22 (from FIG. 14J), ER1 (from FIG. 14H), LCH (from FIG. 14J), BUSY (from FIG. 14J), DATAFLAG8 (from FIG. 14J), MSRDT (from FIG. 14G), INREQ (from FIG. 14J), and IDLE (from FIG. 14J) signals according to the logical equation:

$$MSRDS = (IDLE\ TB4 + TB7 + TB6)\ LCH \\ + INREQ\ TB7 + (TB5 + TB7)\ E22 + TB5 \\ + TB4\ ER1 + TB5\ BUSY + MSRDT \\ DATAFLAG8\ \ \ \ \ \ \ \ \ \ \ \ \ \ \ \ \ \ \ \ \ \ \ (1-3)\ \ 598-1$$

During the time the tag is being scanned and the size code and parity checks occur, the IDLE latch in Idle Status logic 646 is set so that the IDLE signal is logic "1." Further, during this time, the DATAFLAG8 latch in Data/Function logic 658 is reset, causing the DATAFLAG8 signal to be logic "0." Thus, during this time the MSRDS, and hence the UDS, signal is 0-0-0-1-0-0-0 during each TB1-TB8 character time according to the IDLE TB4 term of equation 598-1, and the UDF signal is logic "0," indicating that the UDS signal is a status signal. If at any time the ER1 signal becomes logic "1," indicating an Error 1 status, the IDLE latch is reset (equation 646-1), and the MSRDS signal becomes 0-0-1-1-0-0-0-0 during each TB1-TB8 character time according to the (TB5+TB4) ER1 term of equation 598-1. Once the IDLE latch is reset, it will only be set again by the INITD3, TCIR, or RETRAN signals becoming logic "1."

If there exists data which is ready for transfer to Utilization Device 89, the RGIXCP and DATAOT signals will both be logic "1" and allow the first eight bits of data to be shifted into Output Buffer 442. The logic "1" RGIXCP and DATAOT signals also reset the IDLE latch at time TB8, causing the IDLE signal to become logic "0" at time TB1 as the RGIXCP signal returned to logic "0" (equation 646–2). The logic "1" RGIXCP and DATAOT signals also set the INREQ latch in Input Request Status logic 660 at time TB8 as long as the IDLE and $\overline{ER2}$ signals are both logic "1" at this time (equation 660–1), causing the INREQ signal to become logic "1" at time TB1. The logic "1" INREQ signal is applied to Data/Status Gate 598 and causes the MSRDS, and hence the UDS, signal to become 1–0–0–0–0–0–0–0 according to the INREQ TB7 term of equation 598–1. If an Error 2 condition existed, the $\overline{ER2}$ signal would be logic "0" and prevent the INREQ latch from being set. However, the logic "1" ER2, DATAOT, RGIXCIP, and IDLE signals at time TB7 would cause the E28 signal from Error 2 Status Set logic 648 to become logic "1" during time TB8 (equation 648–1). The logic "1" E28 signal is applied to Error E Status logic 650 and sets the E22 latch, causing the E22 signal to become logic "1" at time TB1 (equation 650–1). The E22 signal is applied to Data/Status Gate 58 and causes the MSRDS, and hence the UDS, signal to become 1–0–1–0–0–0–0–0 during each TB1–TB8 character time according to the (TB5+TB7) E22 term of equation 598–1.

Utilization Device 89 responds to either the INREQ or E22 status signals by sending an 0–0–0–1–0–0–0–0 signal during character time TB1–TB8 on the TCDF line while the TCS and TCFF signals are logic "1." This results in the INDL latch in Input Data Latch 644 being set at time TB5, causing the INDL signal to become logic "1" at time TB6 (equation 644–5). During the next TB6 time, the DLS signal becomes logic "1" (equation 644–4). One bit time later during time TB7, the DLS7 signal becomes logic "1" (equation 644–1), and, during time TB8, the $\overline{DLS8}$ signal becomes logic "0" (equations 344–2 and 344–3). The DLS7 logic "1" signal sets the DATAFLAG8 lach in Data/Function Logic 658, causing the DATAFLAG8 signal to become logic "1" at time TB8 (equation 658–1). The DTAFLAG8 latch is reset by the following $\overline{TB7}$ logic "0" signal (equation 658–1), so the DATAFLAG8 signal is logic "1" from time TB8 through TB7. The DATAFLAG signal is the DATAFLAG8 signal delayed one bit time (equation 658–2) and thus is logic "1" from time TB1 through TB8. After being amplified by amplifier 672, this becomes the logic "1" UDF signal, thereby indicating that the next eight UDS bits sent to Utilization Device 89 will be data. The $\overline{DLS8}$ signal resets the INREQ latch in Input Request Status Logic 660 (equation 660–1) or the E22 latch in Error 2 Status Logic 650 (equation 650–1), thereby causing either the INREQ or E22 signal to return to logic "0."

As previously explained with respect to FIG. 14G, the INDL logic "1" signal causes one of the LSDF or LSDR signals to become logic "1" from time TB7 through TB2, during which time the first four data bits in Output Buffer 442 are shifted through Output Buffer Data Signal Logic 476 to become the MSRDT signal during time TB8 through TB3. During this time, the DATAFLAG8 signal is logic "1," and, as seen from the MSRDT DATAFLAG8 term of equation 598–1, the MSRDS signal reflects the first four bits of data during time TB1 through TB4 and is 0–0–0–0 from time TB5 through TB8. The MSRDS signal is amplified by amplifier 674 to become the UDS signal, which is sent to Utilization Device 89 during this time.

The DATAFLAG and TB5 signals cause the FLAGOT signal to become logic "1" and the $\overline{FLAGOT}$ signal to become logic "0" during time TB6 (equations 652–1 and 652–2). The logic "1" FLAGOT signal sets the CH2LCH latch in second B.C.D. Character Latch 666 (equations 666–1 and 666–5), thereby causing the CH2LCH signal to become logic "1" at time TB7, the CH2LCHBAR signal to become logic "0" at time TB7 (equations 666–2 and 666–3), and the CH2LCHO signal to become logic "1" at time TB8 (equation 666–4).

Thereafter, at time TB8, the DATAFLAG and CH2LCH logic "1" signals set the INREQ latch in Input Request Status Logic 660, causing the INREQ signal to become logic "1" at the following TB1 time (equation 660–1). This causes the MSRDS signal to become 1–0–0–0–0–0–0–0 during the next character time, and since the DATAFLAG signal and hence the UDF signal return to logic "0" at time TB1, this MSRDS signal, when amplified to be the UDS signal, is thus interpreted by Utilization Device 89 as an Input Request Status. Utilization Device 89 responds by causing the TCS and TCFF signals to become logic "1" and sending a 0–0–0–0–1–0–0–0–0 TCDF signal to Interface Means 88. This causes the INDL signal to become logic "1" from TB6 through TB5, the DLS7 signal to be logic "1" during the following time TB7, and the $\overline{DLS8}$ signal to be logic "1" at the next TB8 time, as previously explained. The $\overline{DLS8}$ signal resets the INREQ latch. The DLS7 signal sets the DATAFLAG8 and DATAFLAG signals, and the remaining four bits of data in Input Buffer 442 are sent to Utilization Device 89, as explained previously.

At time TB6, while DATAFLAG is logic "1," the FLAGOT signal again becomes logic "1," and the $\overline{FLAGOT}$ signal again becomes logic "0" (equations 652–1 and 652–2). Now, the logic "0" FLAGOT signal resets the CH2LCH latch (equations 666–1 and 666–5), causing the CH2LCH and CH2LCHO signals to become logic "0" and the CH2LCHBAR signal to become logic "1." At time TB8, the logic "1" CH2LCHBAR, DATAFLAG, and LTCHLH signals set the BUSY latch in BUSY Status logic 662, causing the BUSY signal to become logic "1" (equations 662–1 and 662–2). This causes the MSRDS signal to become 0–0–1–0–0–0–0–0 because of the TB5 BUSY term of equation 598–1.

Since the CH2LCHO signal is delayed by one bit time from the CH2LCHBAR signal, these signals will both be logic "1" during time TB7. This will set the ADD1 latch in Increment I.X.R. Logic 664, causing the ADD1 signal to become logic "1" at time TB8 (equation 664–1). The ADD1 latch will be set after the following TB7 time (equation 664–1). During the time TB8 through TB7 the ADD1 signal is logic "1," it increments Index Register Counter 378 by one if a forward direction scan occurred and decrements Index Register Counter 378 by one if a reverse direction scan occurred. The next RGIXCP logic "1" signal, along with the DATAOT logic "1" signal, sets the INREQ latch, and two more B.C.D. characters are sent to Utilization Device 89.

If a double field tag had been scanned and the size code check of both fields and parity check of the first field are valid, the GOTOF2 signal from FIG. 14I will become logic "1." This sets the WTOUT latch, causing the WTOUT signal to become logic "1" (equation 668–1) and the $\overline{WTOUT}$ signal to become logic "0." After the last character from the first field is sent to Utilization Device 89, the logic "1" WTOUT, DATAFLAG, and CH2LCHBAR signals at time TB8 cause the GOTOLP2 signal in Transmit Field 2 Logic 654 to become logic "1" (equation 654–1). This causes the data in the other one Main Buffers A or B 76 or 78 to be sent to Utilization Device 89, as explained previously. The logic "0" $\overline{WTOUT}$ signal prevents the ADD1 signal from becoming logic "1" at this time, as it is necessary to reset the count in Index Register Counter 378 to zero.

After the last character has been sent to Utilization Device 89, the LTCHLH signal from FIG. 14I is logic "1." The logic "1" LTCHLH, DATAFLAG, and CH2LCHBAR signals at time TB8 cause the LCH latch in Last Character Status Logic 656 to be set, causing the LCH signal to become logic "1" at time TB1. This causes the MSRDS signal and UDS signal to be 1–1–0–0–0–0–0–0 during the next TB1 through TB8 character time, indicating the last character status. Utilization Device 89 responds to this by sending either an Initialize function signal by causing the TCDF signal to be 0–0–1–0–0–0–0–0 while the TCFF and TCS signals are logic "1," or a Retransmit function signal by causing the TCDF signal to be 0–1–0–0–0–0–0–0 while the TCFF and TCS signals are logic "1."

If the Retransmit function is sent, the RETRAN latch in Retransmit Logic 642 is set (equation 642–1), and the above-described data transfer is repeated. If the Initialize function is sent, the INIT signal becomes logic "1" during time TB7 (equation 670–8), the INIT signal becomes logic "0" during time TB7 (equation 670–9), the INITD-BAR signal becomes logic "0" during time TB8 (equations 670–4, 670–5, and 670–6), the INITD1 signal becomes logic "1" during time TB1 (equation 670–1), the INITD2 signal becomes logic "1" during time TB2 (equation 670–2), and the INITD3 signal becomes logic "1" during time TB3. The INIT family of signals is applied throughout the logic in Reader 60 to clear previously set latches. Now a new tag is ready to be scanned.

What is claimed is:

1. A code reading system for reading a medium having a code thereon comprising:
   detecting means for providing a series of bits, one at a time, in response to said code, each successive M bits provided constituting a character of bits;
   bit counting means responsive to the occurrence of each bit of said series for providing a first signal after each character of bits occur;
   input buffer means responsive to the application thereto of said series of bits for storing the bits applied thereto until a character of bits is stored thereby;
   position counting means for continually counting from one to L;
   index counting means responsive to said first signal for being incremented each time said first signal occurs;
   comparing means for providing a second signal whenever the counts of said position counting means and said index counting means are equal; and
   main storage means for storing a character of bits applied thereto in a position thereof defined by the count existing in said index counting means, at the time said character of bits is applied thereto, said character of bits applied to said main storage means being applied from said input buffer means upon command of said second signal.

2. The invention according to claim 1 wherein said detecting means provides a load signal each time a bit of said series is provided and said bit counting means incrementing its count by one in response to each load signal, said bit counting means including means responsive to the count thereof for resetting the count of said bit counting means to zero whenever the count of said bit counting means becomes M.

3. The invention according to claim 2 wherein said first signal is provided whenever the count of said bit counting means becomes M.

4. The invention according to claim 1;
   wherein said detecting means includes means for reading the code of said medium and for providing a signal manifesting the bits of said code; and
   wherein said detecting means includes dummy bit means for adding dummy bits to the bits of said code to cause said series of bits to contain a multiple of M bits.

5. The invention according to claim 4;
   wherein said system further includes a limit register which is set to a certain count and second comparing means for providing a signal whenever the counts of said index counting means and said limit register are equal; and
   wherein said dummy bit means adds said dummy bits in response to said second comparing means signal.

6. Input control logic for a code reading system in which a binary code existing on a medium is read and stored, said code including, when read from front to back in a forward reading direction, a front direction bit, four bits forming a front size code, two bits forming a first code, an even number of four bit binary coded decimal characters, six bits forming second and third codes, four bits forming a back size code, and a back direction bit, said front and back direction bits being the same binary value, said front and back size codes manifesting the same number which is related to the number of binary coded decimal characters, said code further being capable of being read in a reverse reading direction in which event the bits are in reverse order and complementary to those read in the forward direction, said input control logic comprising:
   detecting means for recoding the code on said medium and for providing a signal indicating the bits read;
   direction signal means responsive to the first bit read by said detecting means for providing a direction signal indicating whether said medium was read in the forward reading direction or the reverse reading direction;
   input signal providing means responsive to said detecting means signal and a dummy bit signal for providing an input signal which manifests each of the bits read by said detecting means and a sufficient number of dummy bits to cause there to be an integral number multiple of eight bits manifested by said input signal;
   an eight stage input buffer responsive to the application thereto of said input signal for providing, on command of a load signal, a signal manifesting eight bits;
   bit counting means responsive to the occurrence of each bit of said input signal for providing a full signal after each successive eight bits of said input signal have occurred,
   position counter means for counting between one and a given number equal to or greater than said integral number,
   index register means for counting between zero and at least said integral number and being incremented by one each time said full signal occurs;
   limit register means for being set to a number related to said integral number in response to the size code manifestation of said input signal in the event said direction signal indicates a forward direction reading occurs;
   first comparing means for providing said load signal when the counts of said position counter means and said index register means are equal;
   second comparing means for providing a second compare signal whenever the counts of said index register means and said limit register means are equal;
   dummy bits means for providing said dummy bit signal to cause dummy bits to exist in said input signal as the first and last bits manifested thereby and to cause dummy bits to be provided during the reading of said second and third codes, said back size code and said back direction bit, said dummy bit means being responsive to said second compare signal in the event said direction signal indicates a forward direction reading occurs; and
   memory means for storing each eight bit input buffer signal provided in a unique location determined by the time occurrence of said load signal.

7. The invention according to claim 6:
   wherein said memory means is a recirculating shift register having a certain number of stages; and
   wherein said given number of to which said position counter means counts is one eight of said certain number.

8. The invention according to claim 7:
wherein eight bits are circulated in said main memory during the occurrence of each load signal; and
wherein the bits manifested by the signal provided by said input buffer replace the eight bits being circulated during the then occurring load signal.

9. The invention according to claim 8 wherein the unique location where the bits manifested by each input buffer signal are stored is determined by the then existing count in said index register means.

10. The invention according to claim 6:
wherein said dummy bit means includes means for causing four dummy bits to be inserted in the next to last eight bits of said input signal when a forward reading occurs and in the second eight bits of said input signal when a reverse reading occurs.

References Cited

UNITED STATES PATENTS

| | | | |
|---|---|---|---|
| 3,663,801 | 5/1972 | Wahli | 240—146.3 B |
| 2,900,132 | 8/1959 | Burns | 340—174.1 J |
| 3,671,722 | 6/1972 | Christie | 340—146.3 K |

MAYNARD R. FILBUR, Primary Examiner

R. F. GNUSE, Assistant Examiner

U.S. Cl. X.R.

340—146.3 B, 146.3 K, 174.1 J

UNITED STATES PATENT OFFICE
CERTIFICATE OF CORRECTION

Patent No. 3,717,750      Dated February 20, 1973

Inventor(s) Robert C. Gilberg, James P. Donohue & Ramesh S. Patel

It is certified that error appears in the above-identified patent and that said Letters Patent are hereby corrected as shown below:

Column 3, line 25, "3,686,367" should be -- 3,686,637 --.
Column 6, line 17, after "Haney et al." insert
     -- now United States Patent Number 3,702,988 --.
Column 19, line 1, delete "236 and" and substitute
     -- 236. The output logic for BOF counter
     means 90 further includes --.
Column 21, line 61, delete "&" and substitute -- + --.
Column 26, line 20, insert -- ( -- before "RGPSCN".
Column 26, line 22, after "TB6)" insert -- ) --.
Column 29, line 66, after "TBD" insert -- ) --.
Column 32, line 2, delete "n" and substitute -- 72 --.
Column 35, line 21, delete "valve" and substitute -- value --.
Column 39, line 44, delete "GTO@%¢D" and substitute
     -- GTO256D --.
Column 42, line 35, after "CHPLOT", insert -- ) --.
Column 49, line 25 delete "N-15" and substitute -- N=15 --.
Column 55, line 30, before "OVHSHFT", insert -- ( --.
Column 81, line 50, delete "If the TCFF signal is logic
     "0," the in-".
Column 81, delete lines 51-59, inclusive.
Column 81, line 60, delete "thereto.".
Column 84, line 44, delete "(".
Column 84, line 44, delete ")".
Column 84, line 63, delete "0-0-0-1-0-0-0" and substitute
     -- 0-0-0-1-0-0-0-0 --.

Signed and sealed this 25th day of December 1973.

(SEAL)
Attest:

EDWARD M. FLETCHER, JR.
Attesting Officer

RENE D. TEGTMEYER
Acting Commissioner of Patents